(12) United States Patent
Hattori et al.

(10) Patent No.: US 7,734,893 B2
(45) Date of Patent: Jun. 8, 2010

(54) METHOD FOR SPEEDING UP PAGE TABLE ADDRESS UPDATE ON VIRTUAL MACHINE

(75) Inventors: Naoya Hattori, Hachioji (JP); Toshiomi Moriki, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 11/621,609

(22) Filed: Jan. 10, 2007

(65) Prior Publication Data

US 2007/0162683 A1  Jul. 12, 2007

(30) Foreign Application Priority Data

Jan. 11, 2006 (JP) ............................. 2006-003143

(51) Int. Cl.
*G06F 12/00* (2006.01)
(52) U.S. Cl. .................... 711/209; 711/212; 711/220
(58) Field of Classification Search .................. 711/209, 711/212, 220
See application file for complete search history.

(56) References Cited

U.S. PATENT DOCUMENTS

| | | | | | |
|---|---|---|---|---|---|
| 4,835,734 | A | * | 5/1989 | Kodaira et al. | 711/209 |
| 5,390,309 | A | * | 2/1995 | Onodera | 718/100 |
| 6,119,219 | A | * | 9/2000 | Webb et al. | 712/227 |
| 6,606,697 | B1 | | 8/2003 | Kawahara | 711/207 |
| 6,996,698 | B2 | * | 2/2006 | Slegel et al. | 711/220 |
| 7,020,761 | B2 | * | 3/2006 | Siegel et al. | 711/202 |
| 7,225,287 | B2 | * | 5/2007 | Wooten | 710/309 |
| 7,284,100 | B2 | * | 10/2007 | Slegel et al. | 711/156 |
| 7,299,337 | B2 | | 11/2007 | Traut et al. | |
| 2002/0082824 | A1 | | 6/2002 | Neiger | 704/2 |
| 2004/0230749 | A1 | * | 11/2004 | Slegel et al. | 711/144 |
| 2004/0230976 | A1 | * | 11/2004 | Slegel et al. | 718/100 |

OTHER PUBLICATIONS

"z/Architecture Principles of Operations," IBM Publication No. SA22-7832-00, Dec. 2000, Chapter 3 pp. 1-40, Chapter 10, pp. 18=19 and 29-30.*

* cited by examiner

*Primary Examiner*—Reba I Elmore
(74) *Attorney, Agent, or Firm*—Brundidge & Stanger, P.C.

(57) ABSTRACT

A method is provided which eliminates redundancy from the shadow PT operation performed by the virtual machine monitor (VMM) when the guest operating system running on a virtual machine updates a guest page table (PT) address. The VMM associates a plurality of shadow PTs with guest PTs and allocates their relation in memory. When it detects the update of a guest PT address, the VMM searches for a shadow PT corresponding to the updated guest PT. If the associated shadow PT exists, the VMM omits rewriting the shadow PT and registers the address of the shadow PT with the central processing unit (CPU). If the associated shadow PT does not exist, the VMM allocates a memory, creates a shadow PT, registers an address of the created shadow PT with the CPU, and records a relationship between the updated guest PT and the generated shadow PT.

19 Claims, 40 Drawing Sheets

FIG.8

1101 PML4

| XD | AVAILABLE FOR USE | Reserved | START ADDRESS OF PDP TABLE | AVAILABLE FOR USE | Reserved | A | PCD | PWT | U/S | R/W | P |

1102 PDP

| XD | AVAILABLE FOR USE | Reserved | START ADDRESS OF PDP TABLE | AVAILABLE FOR USE | Reserved | A | PCD | PWT | U/S | R/W | P |

1103-0 PDE(CR4.PSE == or PS == 0)

| XD | Reserved | AVAILABLE FOR USE | Reserved | START ADDRESS OF PTE TABLE | AVAILABLE FOR USE | RES | PS | RES | A | PCD | PWT | U/S | R/W | P |

1104 PTE

| XD | Reserved | AVAILABLE FOR USE | Reserved | START ADDRESS OF PAGE | AVAILABLE FOR USE | G | PAT | D | A | PCD | PWT | U/S | R/W | P |

1103-1 PDE(CR4.PSE ==1 and PS == 1)

| XD | Reserved | AVAILABLE FOR USE | Reserved | START ADDRESS OF PAGE | Reserved | PAT | AVAILABLE FOR USE | G | PS | D | A | PCD | PWT | U/S | R/W | P |

FIG.9

|  | Valid | GUEST PT ADDRESS | SHADOW PT ADDRESS |
|---|---|---|---|
| #0 | 1 | 0x000040000 | 0x10004000 |
| #1 | 1 | 0x000000000 | 0x10000000 |
| : | 0 | — | — |

| | 1801 Valid | 1852 GUEST PT FORMAT | 1803 GUEST PT ADDRESS | 1804 SHADOW PT ADDRESS |
|---|---|---|---|---|
| #0 | 1 | ( INTEL 64 , PSE = 1 ) | 0x000040000 | 0x10004000 |
| #1 | 1 | (Page Disable) | 0x000000000 | 0x10000000 |
| : | 0 | — | — | — |

| | 2001 | 2002 | |
|---|---|---|---|
| | VALID | PT ENTRY NUMBER | ~557 |
| #0 | 1 | 01 | |
| #1 | 1 | 05 | |
| : | 0 | — | |

_US 7,734,893 B2_

METHOD FOR SPEEDING UP PAGE TABLE ADDRESS UPDATE ON VIRTUAL MACHINE

INCORPORATION BY REFERENCE

The present application claims priority from Japanese application JP2006-003143 filed on Jan. 11, 2006, the content of which is hereby incorporated by reference into this application.

BACKGROUND OF THE INVENTION

The present invention relates to a virtual computer system and more particularly to a technology for speeding up a switching of address translation tables in a guest operating system (guest OS).

As the number of servers employed increases, a server operation becomes increasingly complicated, giving rise to an operation cost. As one technology to reduce the server operation cost, a server integration that integrates a plurality of servers into a single server is drawing attention. Among technologies for realizing the server integration, a virtual machine technique is known which logically divides one computer with an arbitrary ratio. In the virtual machine technique, firmware (or middleware) such as hypervisor divides a physical computer into a plurality of logical partitions (LPAR: Logical PARtition) and allocates computer resources (computer processing unit (CPU), main memory and input/output device (I/O)) to each LPAR to allow individual operating systems to run on their associated LPARs. Alternatively, the virtual machine technique involves running a host operating system (the operating system that directly uses the physical machine) on a single server and causing the hypervisor on the host operating system (host OS) to perform the similar dividing operation to allow a plurality of guest operating systems (the operating systems that run on the host operating system) to run on their associated LPARs. The virtual machine technique enables a plurality of operating systems that conventionally run on a plurality of servers and software running on these operating systems to run on a single server, thus realizing a server integration.

The virtual machine technique, which has conventionally been used in large computers such as main frame computers, are finding its use also in low-end servers and personal computers as the performance of microprocessors has improved in recent years.

Computers such as servers that employ the virtual machine technique have a plurality of virtual machines to run guests (generally referring to guest OSs and software running on the guest OSs) and a virtual machine monitor (VMM) that controls the virtual machines.

In realizing the server integration by the virtual machine technique, a plurality of guests to be integrated need to be provided with independent memory spaces. Shown in FIG. 2 is an example of address translation setting that the VMM performs on the physical machine to allow the guest OSs to make settings on the virtual machine and to use independent memory spaces.

The VMM divides a physical memory space (host physical memory space 215) in the host to create memory spaces, from memory space 217 for guest 0 to memory space 218 for guest n, and allocates the divided memory spaces to the respective guests. While, as shown in the memory space 217 for guest 0, the host physical memory spaces allocated to the guests may not necessarily have an address 0 as a start point, the guest OSs are created by assuming that the address 0 is a start point. So, the VMM needs to generate a memory space (guest physical memory space 205) that sets an address 0 used by each guest as a start point and to transform an address of the guest physical memory space 205 into an address of the host physical memory space 215.

As for the address conversion, a CPU (10-v, 10-p) generally has, as a mechanism for high-speed address conversion, a page table (PT) pointer register (60-v, 60-p) that holds a position of PT defining a correspondence between a pre-conversion address and a post-conversion address, and a TLB (Translation Lookaside Buffer) (50-v, 50-p) holding a part copy of the PT. The CPU (10-v, 10-p) performs high-speed address conversion using information in the TLB (50-v, 50-p). The guest OS uses this mechanism to realize a virtual memory.

The guest OS generates a guest PT-a (70-a) defining the correspondence between an address of guest virtual memory space 201 and an address of guest physical memory a (206) and registers an address of the guest PT-a (70-a) with the PT pointer register (60-v) in the CPU (10-v) of the virtual machine. Then, the guest OS and a process running on the guest OS perform memory operations by specifying addresses in the guest virtual memory space 201. When the guest OS wants to access the guest physical memory space 205, it specifies an identical transformation to the guest PT-a (70-a) to access the guest virtual memory space 201.

To have a TLB (50-p) of the CPU (10-p) perform the address conversion required for the operation of the guest, the VMM takes advantage of what has been described above, i.e., creates a shadow PT-a (80-a) defining the correspondence between the address of the guest virtual memory space 201 and the address of the host physical memory a (216) and registers the address of the shadow PT-a (80-a) with the PT pointer register (60-p) in accordance with the content of the guest PT-a (70-a) that the guest OS was going to register with the PT pointer register (60-v) of the virtual machine.

The guest OS generally prepares a guest virtual memory space for each process running on the guest OS. Thus, the guest OS creates a guest PT corresponding to each process. In switching processes, the guest OS registers an address of the guest PT corresponding to a switched process with the PT pointer register.

Since the content of the shadow PT depends on the content of the guest PT, when the guest OS updates a guest PT address, the VMM needs to operate the shadow PT to have the CPU perform an appropriate address conversion.

An example of the address translation setting in the physical machine for a guest PT after a process switching is shown in FIG. 3. Since the guest substituted a guest PT-b (70-b) for the PT pointer register (60-v), changing the correspondence between the guest virtual memory space 201 and a guest physical memory b (306), the VMM prepares a shadow PT-b (80-b) defining the correspondence between the guest virtual memory space 201 and a host physical memory b (316) and registers an address of the shadow PT-b (80-b) with the PT pointer register (60-p).

As a method for preparing the shadow PT-b (80-b), U.S. Pat. No. 6,606,697 discloses a method in which, each time the updating of the guest PT address is detected, the VMM refers to the guest PT-b (70-b) after process switching and rewrites all the settings of the shadow PT-a (80-a) to create the shadow PT-b (80-b).

U.S. 2002/0082824 discloses a method that reduces the number of entries of shadow PTs to be rewritten. In this method, each time it detects the updating of the guest PT address, the VMM disables all entries of the shadow PT-a (80-a) and makes them a temporary shadow PT-b (80-b). When it is necessary to enable the entries of the shadow PT-b (80-b) for continued operation of the guest, the CPU (10-p) generates an exception and the VMM, using this exception as a trigger, selectively creates only an entry of the shadow PT-b (80-b) required for the memory operation of the guest.

In these existing methods, the VMM rewrites the shadow PT each time it detects the updating of the guest PT address. So, if the same guest PT is used many times as when two guest PTs are alternately used, the processing of the VMM becomes redundant. Generally, since the guest PT is often used repetitively many times, this redundancy will result in an increased time required to update the guest PT address.

In light of the above problems, the present invention is intended to shorten the time it takes to update the guest PT address, i.e., to enhance the speed of the update processing.

SUMMARY OF THE INVENTION

A characteristic configuration of this invention according to one aspect is that the VMM creates a shadow PT on memory that corresponds to the guest PT the operating system has created on memory, and records the correspondence or relation between the guest PT and the shadow PT in a PT correspondence table. If the operating system has a plurality of guest PTs, the VMM has a plurality of shadow PTs.

When the operating system updates the PT pointer register to change the address of the guest PT used for address conversion, the VMM refers to the PT correspondence table and searches for a shadow PT that is already created and which corresponds to the guest PT to be used after the PT pointer register is updated. If the corresponding shadow PT exists, the address of the shadow PT is substituted into the PT pointer register. If the corresponding shadow PT does not exist, a memory to hold a shadow PT is allocated, a shadow PT corresponding to the guest PT is created, and the guest PT and the shadow PT are recorded in the PT correspondence table. If allocating the memory for holding the shadow PT should fail, a shadow PT that is not used is discarded to free memory resources.

As a means to ensure that the content of the shadow PT held matches the content of the guest PT, the entry updating of the guest PT is detected. To detect the entry updating of the guest PT involves setting a write inhibit attribute in a memory area where the guest PT entry exists. There are three different methods available to be executed when the guest PT entry is updated. Any of them may be used. The first method updates the corresponding shadow PT entry with the updating of the guest PT entry as a trigger. The second method disables the corresponding shadow PT upon the updating of the guest PT entry. The third method involves recording an identifier of the corresponding shadow PT entry upon the updating of the guest PT entry and, when the shadow PT entry with its identifier recorded is loaded into the TLB, updating the shadow PT.

The PT correspondence table is recorded with the address of the guest PT and the address of the shadow PT. In finding a shadow PT corresponding to the guest PT, an entry including the address of the guest PT is searched to identify the shadow PT.

In this invention, when a previously used guest PT is specified by the updating of the guest PT address, the guest PT address update operation is speeded up by only searching the already created shadow PT corresponding to the guest PT and updating the PT pointer register.

Other objects, features and advantages of the invention will become apparent from the following description of the embodiments of the invention taken in conjunction with the accompanying drawings.

BRIEF DESCRIPTION OF THE DRAWINGS

FIG. 8 illustrates a PT entry format in IA-32 (or Intel(R) 64).

FIG. 9 illustrates a structure of a PT correspondence table holding a correspondence between a guest PT and a shadow PT in embodiment 1, 3, 5 and 7.

FIG. 15 illustrates a structure of a PT correspondence table showing a correspondence between a guest PT and a shadow PT in embodiment 2, 4, 6 and 8.

FIG. 23 illustrates a structure of a separation table that holds a separation state of shadow PT entries and guest PT entries in embodiment 5, 6, 7, 8 and 10.

DESCRIPTION OF THE EMBODIMENTS

Embodiment 1

<1. Hardware Configuration>

Figure 4:
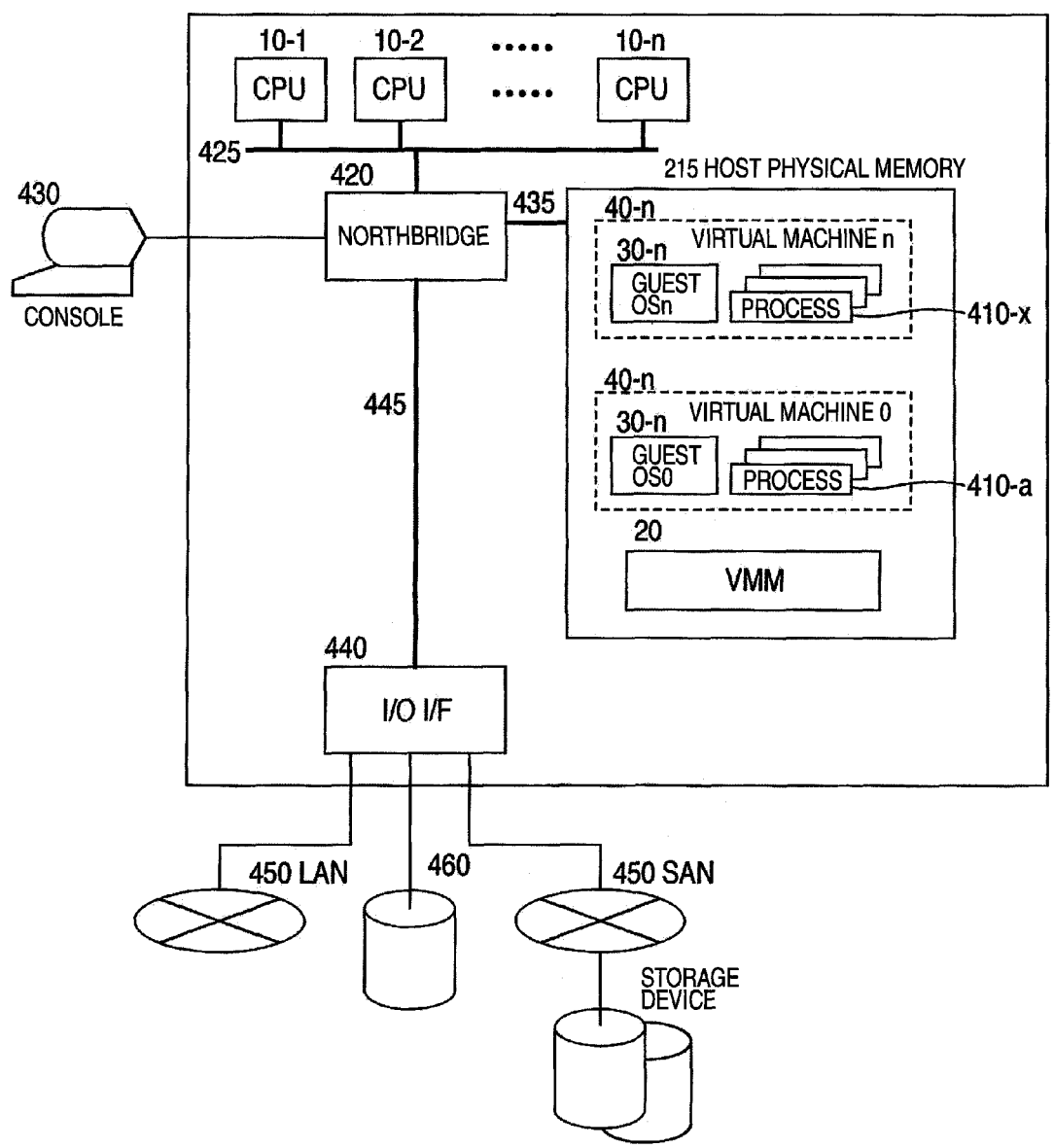
FIG. 4 is a block diagram of a physical machine that operates a virtual machine system in embodiment 1 to 10.

FIG. 4 shows a configuration of a physical machine that operates a virtual machine system of the first embodiment (embodiment 1) according to this invention. The physical machine has one or more CPUs (10-0 to 10-n) which are connected to a northbridge 420 (or memory controller) through a front side bus 425.

The northbridge 420 is connected with the host physical memory 215 through a memory bus 435 and with an I/O interface 440 through a bus 445. The I/O interface 440 comprises a network adapter connected to LAN 450, a SCSI adapter connected to a disk device 460, and a fiber channel adapter connected to a SAN 470 (Storage Area Network), and is connected to individual I/O devices.

The CPU (10-0 to 10-n) accesses the memory through the northbridge 420 and, from the northbridge, makes access to the I/O devices through the I/O interface 440 for desired processing.

The northbridge 420 controls the host physical memory 215 and includes a graphic controller connected to a console 430 that displays images.

The host physical memory 215 is loaded with a VMM (Virtual Machine Monitor) 20 and a virtual machine VM0-VMn (40-0 to 40-n) implemented by the VMM 20 executes each guest OS0-OSn (30-0 to 30-n). Each guest OS (30-0 to 30-n) executes an arbitrary number of processes 410 on the virtual machine VM0-VMn (40-0 to 40-n).

<2. Software Configuration>

Figure 5:
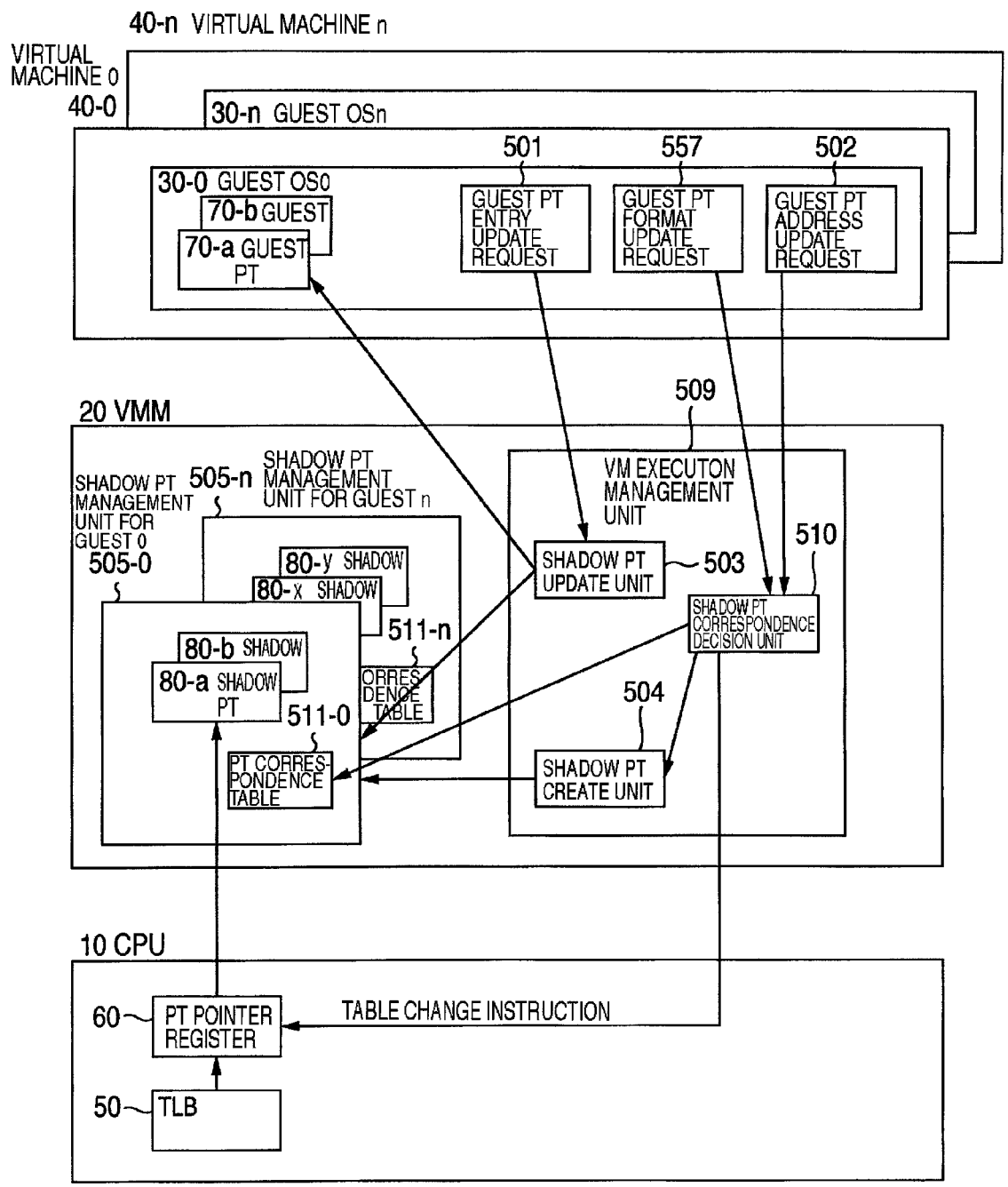
FIG. 5 is a block diagram showing essential portions of software and hardware of the virtual machine in embodiment 1, 2 and 9.

FIG. 5 shows an essential portion of the software configuration of the virtual machines VM0-VMn (40-0 to 40-n) implemented on the physical machine of the embodiment 1 of FIG. 5.

In FIG. 5, a VMM 20 that manages a plurality of guest OSs (30-0 to 30-n) is running on the physical machine. The VMM 20 is control software that manages the allocation of computer resources accessed by the guest OSs (30-0 to 30-n) and guest processes. The VMM 20 provides the guest OSs (30-0 to 30-n) with a part of physical machine resources and has shadow PT management units (505-0 to 505-n) that holds data related to address conversion of each of the guest OSs (30-0 to 30-n) and also a virtual machine execution management unit (hereinafter referred to as a VM execution management unit 509) that manages the execution of the guest OSs (30-0 to 30-n).

The shadow PT management unit (505-0 to 505-n) is provided for each of the guest OSs (30-0 to 30-n). Each of the guest OSs has a plurality of shadow PTs (80-a to 80-y) and a single PT correspondence table (511-0 to 511-n). The shadow PT 80 is a table defining the correspondence between the address of the guest virtual memory space and the address of the host physical memory space. Each shadow PT (80-a to 80-y) correspond one-to-one to the guest PT (70-a to 70-y) held in the guest OS (30-0 to 30-n). The PT correspondence table 511 is a table defining the correspondence between the guest PTs (70-a to 70-y) and the shadow PTs (80-a to 80-y).

A VM execution management unit 509 allocates memory areas to the virtual machines VM0-VMn (40-0 to 40-n) and also allocates a memory area for the execution of the VMM 20 itself. The VM execution management unit 509 includes a shadow PT correspondence decision unit 510, a shadow PT update unit 503 and a shadow PT generation unit 504. The shadow PT correspondence decision unit 510 selects an appropriate shadow PT (80-b in the example of FIG. 3) from among the shadow PTs (80-a to 80-y) generated in the shadow PT management unit (505-0 to 505-n) of the guest OS and registers the address of the selected shadow PT (80-b in the case of FIG. 3) with a PT pointer register 60 of the CPU 10, causing the CPU 10 to execute the address conversion necessary for each virtual machine VM0-VMn (40-0 to 40-n). The shadow PT update unit 503 performs updating in a consistent manner so as not to destroy the correspondence between the guest PTs (70-a to 70-y) and the shadow PTs (80-a to 80-y). The shadow PT generation unit 504 generates a shadow PT (80-b in the example of FIG. 3) corresponding to the guest PT (70-b in the example of FIG. 3) that the guest OS (30-0 to 30-n) uses.

In the virtual machine VM0-VMn (40-0 to 40-n) the associated guest OS (30-0 to 30-n) runs. Each of the guest OSs (30-0 to 30-n) has one or more guest PTs 70 that match the guest virtual address space to the guest physical memory space. The CPU 10 that runs the VMM 20 and each guest OS (30-0 to 30-n) has a high-speed address conversion function using the TLB 50. The CPU 10 also has a PT pointer register 60 storing a memory address of the PT defining the content of address conversion.

For example, if the CPU 10 employs IA-32 which is an Intel's 32-bit CPU (or INTEL(R)64 which is an expanded 64-bit CPU), the CPU 10 includes privileged registers CR0, CR3, CR4, IA32_EFER, etc. The PT pointer register 60 is equivalent to the privileged register CR3 in the IA-32 (or Intel(R)64).

Figure 3:
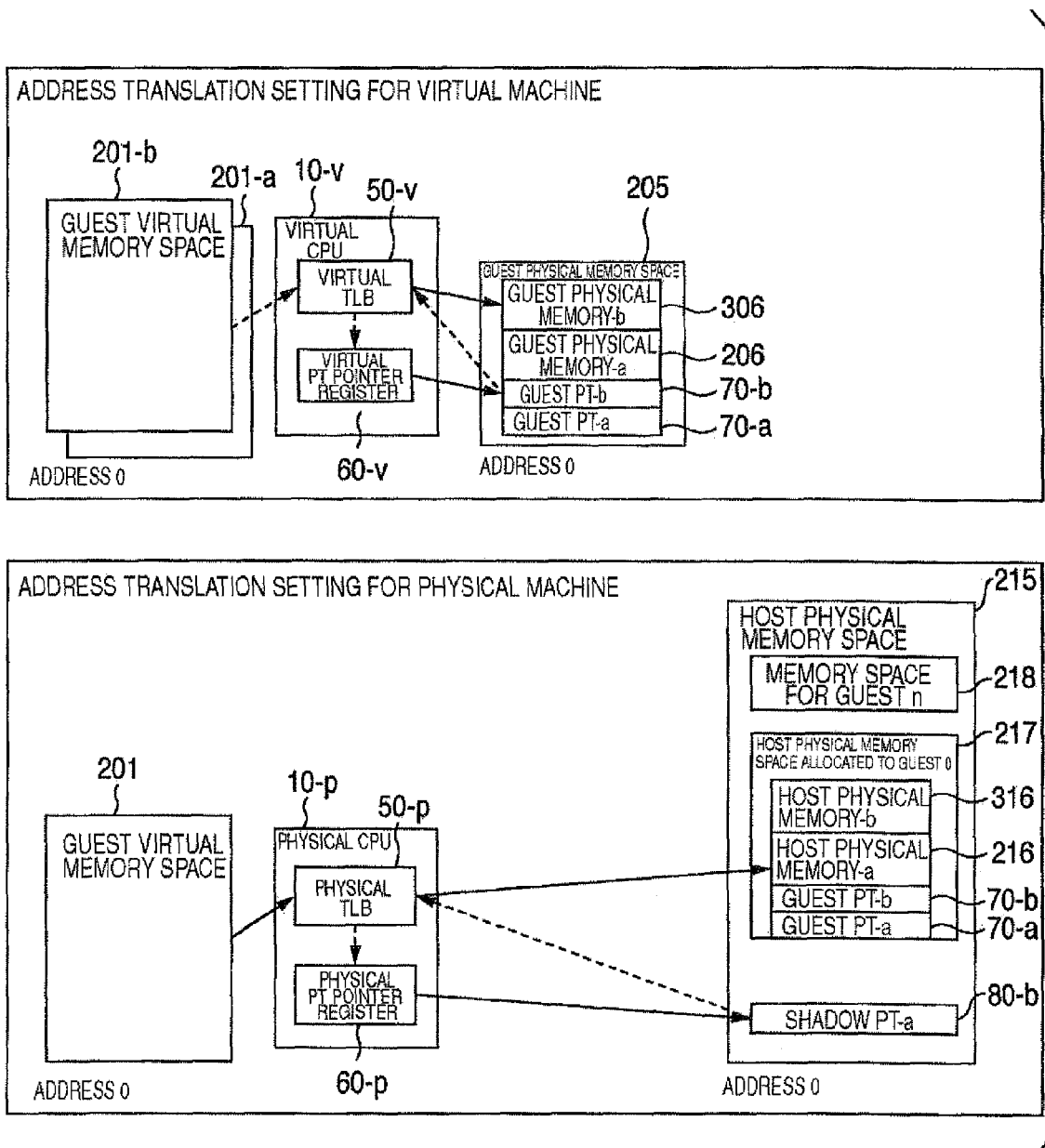
FIG. 3 is a conceptual diagram showing an address translation setting in a physical machine when an address translation setting in a virtual machine is changed.

When the guest OS (30-0 to 30-n) produces a guest PT address update request 502, the shadow PT correspondence decision unit 510 in the VM execution management unit 509 refers to the PT correspondence table (511-0 to 511-n) holding the correspondence relation between the guest PTs 70 and the shadow PTs 80 and searches through the shadow PTs (80-*a* to 80-*y*) generated in the shadow PT management unit 505 to find a shadow PT (80-*b* in the example of FIG. 3) corresponding to the updated guest PT (70-*b* in the example of FIG. 3). If the shadow PT of interest (80-*b* in the example of FIG. 3) exists, the VMM 20 sends a table switching command to the PT pointer register 60 to set an address of the selected shadow PT (80-*b* in the example of FIG. 3) in the PT pointer register 60. If the shadow PT of interest (80-*b* in the example of FIG. 3) does not exist, the shadow PT generation unit 504 generates a shadow PT (80-*b* in the example of FIG. 3) in the shadow PT management unit 505, registers the correspondence relation between the generated shadow PT (80-*b* in the example of FIG. 3) and the guest PT (70-*b* in the example of FIG. 3) with the PT correspondence table 511, and sets an address of the shadow PT (80-*b* in the example of FIG. 3) in the PT pointer register 60. In subsequent operations, the CPU 10 according to the shadow PT (80-*b* in the example of FIG. 3) set in the PT pointer register 60 converts the address of the guest virtual memory space into the address of the host memory space allocated to the guest.

When the guest OS (30-0 to 30-n) produces a guest PT entry update request 501, the shadow PT update unit 503 in the VM execution management unit 509 updates the guest PT 70 of interest, identifies a shadow PT 80 corresponding to the guest PT 70 by looking up the PT correspondence table 511 and updates the identified shadow PT 80 according to the setting of the guest PT 70 of interest.

As described later, the VMM 20 generates a first shadow PT 80 by starting to execute the guest OSs (30-0 to 30-n) and frees all the shadow PTs 80 generated when the execution of the guest OSs (30-0 to 30-n) is completed.

Figure 6:
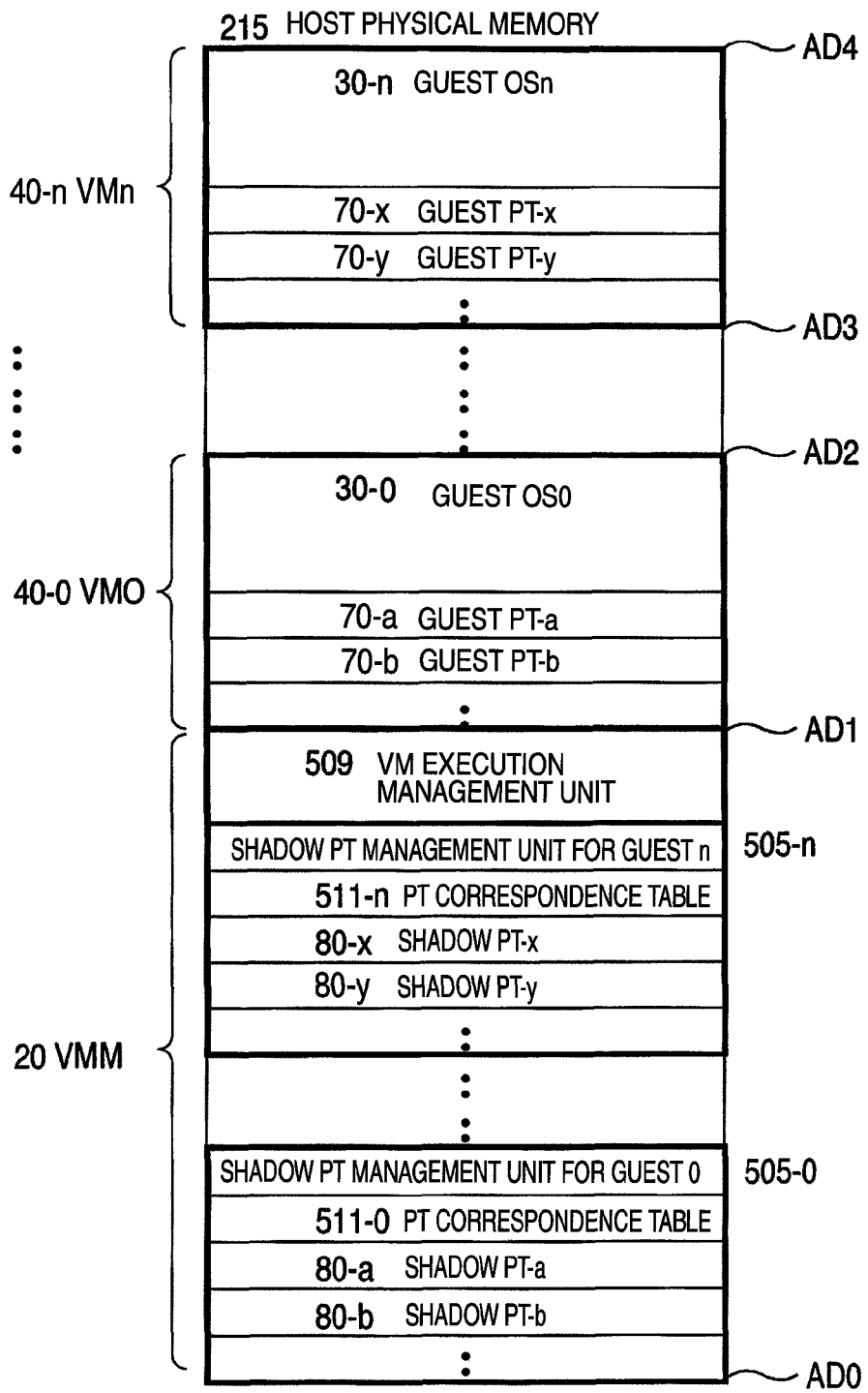
FIG. 6 is a memory area map in embodiment 1, 2, 3, 4 and 9.

FIG. 6 shows an example of the host physical memory space 215 managed by the VMM 20.

The VMM 20 allocates on the host physical memory 215 a memory area in which the VMM itself resides and also memory areas for use by the virtual machines VM0-VMn (40-0 to 40-n). For example, as shown in FIG. 6, the VMM 20 allocates an area AD0-AD1 to itself, an area AD1-AD2 to the virtual machine VM0 and an area AD3-AD4 to the virtual machine VMn. The memory areas for the virtual machines VM0-VMn (40-0 to 40-n) each include the guest PTs 70 generated by each of the guest OSs (30-0 to 30-n). The memory area used by the VMM 20 is assigned to the VM execution management unit 509 and the shadow PT management unit 505. The shadow PT management unit 505 is prepared for each virtual machine VM0-VMn (40-0 to 40-n), and each of the shadow PT management units 505 holds the PT correspondence table 511 and one or more shadow PTs 80.

Figure 7:
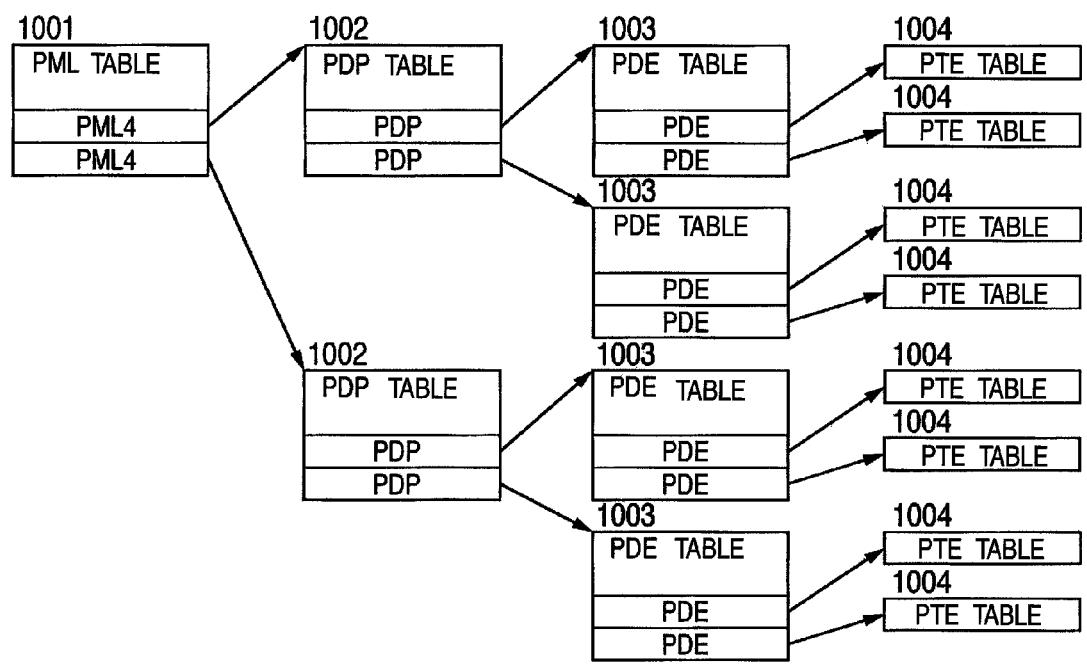
FIG. 7 is a block diagram showing a PT structure of IA-32 (or Intel(R)64).

The structures of the shadow PTs 80 and the guest PTs 70 are the same and, if the CPU 10 is Intel(R)64, they are configured as shown in FIG. 7. The PT has a configuration in which four kinds of table—PML4 (Page Map Level 4) table 1001, PDP (Page Directory Pointer) table 1002, PDE (Page Directory Entry) table 1003, and PTE (Page Table Entry) table 1004—are connected by pointers. In the page conversion layer that performs address conversion between the virtual address space and the physical address space, the PML4 table 1001 is situated at a higher level than the PDP table 1002, with each entry in the PML4 table pointing to the associated PDP table 1002. The PDP table 1002 is situated at a hierarchically upper level than the PDE table 1003, with each entry in the PDP table pointing to the associated PDE table 1003. Entries in the PDE table 1003 point to the associated PTE table 1004. Then the PTE table 1004 has entries pointing to pages of the physical memory. If the PSE (Page Size Extension) function is used by using the privileged register CR4.PSE, setting a PS bit in the entry (PDE) of the PDE table 1003 causes the PDE to directly point to a page of the physical memory.

A format of each entry associated with the PT of INTEL (R)64 is shown in FIG. 8. In each entry there is an address field (1111, 1112, 1113, 1114, 1115) pointing to a head of a lower-level table or page. Further, each entry has a P bit (1116, 1117, 1118, 1119, 1120) defining a validity (valid/invalid state) of the entry. Setting the P bit to 0 causes an exception to occur when information of the entry of interest is read into the TLB. The PML4 (11101), PDP (1102) and PTE (1104) have only one kind of format. As for the PDE (1103), there are two kinds of format (1103-0, 1103-1) according to a combination of the privileged register CR4.PSE and the PS bit (1121, 1122). As for the PT of IA-32 also, a format similar to that of FIG. 8 is defined.

For the CPU 10 that supports IA-32 (or Intel(R)64), four kinds of PT structure (referred to as a PT format) are defined. With the PT format of FIG. 7 taken as a reference, the four formats are: (1) a PT format of FIG. 7 whose PT pointer register 60 points to the PML4 table 1001, (2) a simplified PT format of FIG. 7 whose PT pointer register 60 points to the PDP table 1002, (3) a simplified PT format of FIG. 7 whose PT pointer register 60 points to the PDE table 1003, and (4) a PT format in which the relation of virtual address=physical address always holds irrespective of the set value of the PT point register. The PT formats of (1) to (4) are defined by the combinations of the privileged register CR0.PG, CR4.PAE and IA32_EFER.LME.

The setting of the shadow PT 80 differs from that of the guest PT 70 only in the address field and P bit. The VMM 20 sets the address field of the shadow PT 80 according to the memory space allocated to the virtual machines (40-0 to 40-n). In order to detect an access by guest to the entry of the guest PT 70 associated with the shadow PT 80, the VMM 20 sets the P bit of the shadow PT 80 used in accessing the guest PT entry to 0 for write protect. Using many write protects leads to a reduced execution speed and thus unnecessary write protects are not performed.

In the PT of IA-32 (or Intel(R)64), if PML4 (1101), PDP (1102) and PDE (1103) have their P bit=0 (invalid), the lower level table pointed to by the entry of interest is not referenced, which means the lower level table is not necessary. To hold as many shadow PTs 80 in the shadow PT management unit 505 as possible, the VMM saves the amount of memory for the shadow PTs 80 by not generating unnecessary lower-level tables in the shadow PTs 80. When a guest updates the P bit in PML4 (1101), PDP (1102) and PDE (1103) in the guest PT 70, the VMM 20 checks the necessity of a lower-level table and, if found necessary, adds the lower-level table to the shadow PT or removes it from the shadow PT when it becomes unnecessary.

A structure of the PT correspondence table 511 that records the correspondence between the guest PT 70 and the shadow PT 80 is shown in FIG. 9. Recorded in each entry of the PT correspondence table 511 are a valid bit 1801 representing the validity of the entry, a guest PT address 1803 that the guest specifies in the PT pointer register (60-*v*), and a shadow PT address 1804 that the VMM 20 specifies in the PT pointer register (60-*p*). When the guest updates a guest PT address, the VMM 20 searches through the PT correspondence table 511 for a shadow PT address corresponding to the updated guest PT address.

<3. Operation of Shadow PT by VMM>

Next, an example of shadow PT operation by the VMM in accordance with actions of a guest will be explained by referring to a flowchart.

<3.1. Overview of Shadow PT Operation by VMM>

Figure 10:
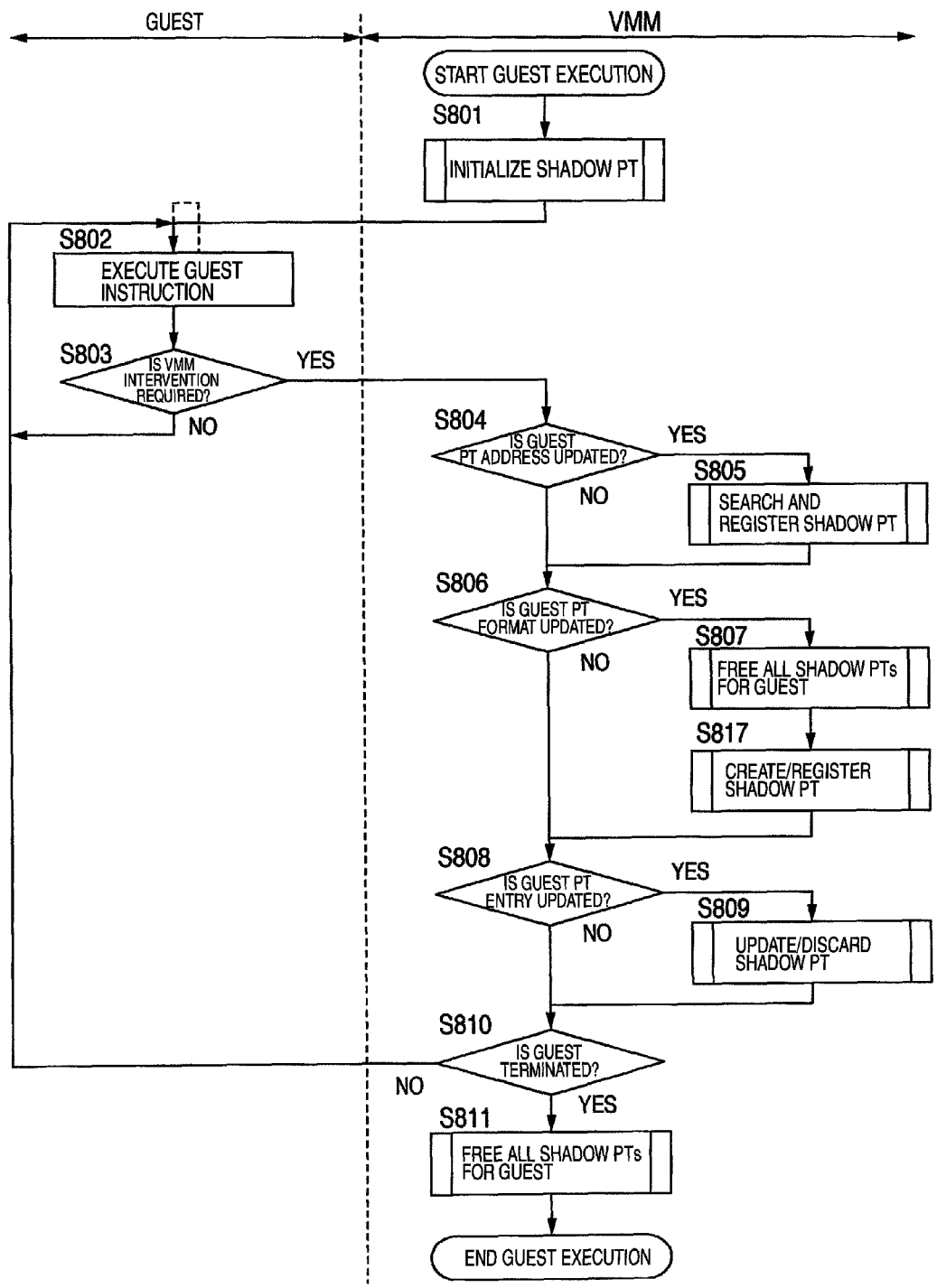
FIG. 10 is a flowchart showing an outline of actions of a guest and of a shadow PT operation performed by VMM in embodiment 1 and 3.

FIG. 10 is a flowchart showing overall processing when a guest is executed on the VMM 20, with the processing on the right side of a dashed line performed by the VMM 20 and the processing on the left side performed by the guest.

In step S801, when it accepts an execution request from a guest, the VMM 20 generates in its shadow PT management unit 505 a shadow PT 80 conforming to the initial state of the virtual machine to be operated, as shown in FIG. 6. Then, the VMM 20, after writing the address of the shadow PT into the PT pointer register 60 of the CPU 10, passes the control to the guest OS. If the CPU 10 is IA-32 (or Intel(R)64), since the CPU in its initial state uses no PT (PT is in an invalid state), the VMM 20 generates a shadow PT 80 conforming to the PT invalid state and registers it with the PT pointer register 60.

In S802, the CPU 10 executes the guest.

In S803, the guest checks if an event has occurred that requires an intervention of the VMM 20. That is, if there is any event that requires an intervention of the VMM 20, such as an interrupt, an exceptional event and a termination of guest, the processing moves to S804 where it returns the control to the VMM 20. If there is no need for the intervention of the VMM 20, the processing returns to S802 where it executes the guest side processing.

In S804, the VMM 20 checks if the guest PT address has been updated. This check involves running the guest at a non-privileged level and using an exception that occurs when the guest running at the non-privileged level writes into the PT pointer register, a privileged register. When it detects this exception, the VMM 20 refers to the privilege level of the virtual machine, checks the validity of the updating of the privileged register and, only when it is found valid, proceeds to S805.

In S805, upon receiving a request for changing the guest PT address, the VMM searches through the PT correspondence table 511 held in the VMM 20 for a shadow PT 80 that corresponds to the changed guest PT 70. If the target shadow PT 80 exists, the VMM registers an address of the shadow PT 80 with the PT pointer register 60. If the corresponding shadow PT 80 does not exist, the VMM generates a shadow PT 80 corresponding to the changed guest PT 70, records a relation between the generated shadow PT 80 and the changed guest PT 70 in the PT correspondence table 511, and registers an address of the generated shadow PT 80 with the PT pointer register 60.

Next, in S806, the VMM 20 checks if the guest PT format has been updated. Since the register defining the PT format (PT format register) is a privileged register, this detection is done by running the guest at a non-privileged level and using an exception that occurs when the guest running at the non-privileged level writes into the PT format register, a privileged register. When it detects this exception, the VMM 20 refers to the privilege level of the virtual machine, checks the validity of the updating of the privileged register and, only when it is found valid, moves to S807.

In S807, upon receiving a request for changing the guest PT format, the VMM 20 frees all shadow PTs 80 that it holds for the guest of interest. Next in S817, the VMM 20 generates a shadow PT 80 that conforms to the changed guest PT format, records a relation between the generated shadow PT 80 and the changed guest PT 70 in the PT correspondence table 511, and registers an address of the generated shadow PT 80 with the PT pointer register 60. Next in S808, the VMM 20 checks if the set value of the guest PT entry has been changed. This detection utilizes an exception which, because of the write protection the guest PT 70 has, occurs when the guest writes into the guest PT 70 in the memory. When it detects this exception, the VMM refers to the setting of the guest PT 70 to determine the validity of the writing and, only when it is found valid, proceeds to S809. Since there is a possibility of the guest PT 70 being changed by the DMA (Direct Memory Access) transfer by an I/O device, the VMM 20 checks for a DMA transfer request the guest makes to the I/O device. If a DMA transfer request is detected, the MVV moves to S809.

In S809, upon receiving a request for changing a guest PT entry, the VMM 20 identifies a shadow PT entry that is affected by the updating of the guest PT entry of interest and updates the associated shadow PT entry. It is noted, however, that when the entry of a guest PT 70 which is deregistered from the PT pointer register 60 (guest PT on standby) is updated, the corresponding shadow PT 80 itself may be disabled by invalidating its entry in the PT correspondence table 511 without updating the entry of the corresponding shadow PT 80.

Next in S810, the VMM 20 checks if there is a request from the guest to shut down the virtual machine (termination of the guest). If the guest is terminated, the processing proceeds to S811. If the guest's termination request is not produced, the processing proceeds to S802. In S811, the VMM frees all the shadow PTs 80 it holds for the guest, before stopping the virtual machine (termination of guest execution).

With the above processing, the VMM 20 can continue to hold the shadow PT 80 corresponding to the guest PT 70 in a CPU registered state for a duration from the start of guest execution to the termination, allowing the CPU 10 to perform the address conversion necessary for the guest.

<3.2. Initialization of Shadow PT>

An initialization of shadow PT as performed in S801 of FIG. 10 will be explained by referring to FIG. 11.

In S901, the PT correspondence table 511 allocated to the guest of interest is initialized. More specifically, a valid bit is reset for all entries in the PT correspondence table 511. In S902, the VMM 20 allocates from the shadow PT management unit 505 for each guest a memory in which to hold the shadow PT 80 at the start of the guest. In S903, the VMM generates a shadow PT 80 corresponding to the guest PT 70 at the start of the guest. If the CPU 10 is IA-32 (or Intel(R)64), the CPU 10 immediately following the turn-on of power has a PT invalid state in which the guest PT 70 is disabled. The CPU 10 with the PT invalidated performs the same operation as when the address conversion by the guest PT 70 is set to a non-conversion state (in which the guest virtual address is set equal to the guest physical address). The VMM 20 therefore generates a shadow PT 80 that corresponds to the guest PT 70 with the non-conversion setting. In S904, the VMM 20 enables the CPU 10 address conversion based on the shadow PT 80 by substituting the address of the generated shadow PT 80 into the PT pointer register 60 of the CPU 10. It also records the address of the generated shadow PT 80 and the address of the guest PT 70 in the PT correspondence table 511.

<3.3. Search and Registration of Shadow PT>

The shadow PT search and registration performed in FIG. 10 will be explained by referring to FIG. 1.

In S101, in response to the updating of the guest PT address, the VMM searches through the PT correspondence table 511 for a valid entry including the updated guest PT address. In S102, if the search finds the entry of interest, the VMM moves to step S109; and if not, it moves to step S103. The step S109 substitutes the address of the shadow PT 80 recorded in the entry of interest into the PT pointer register 60 of the CPU 10 to cause the CPU 10 to perform the address conversion based on the updated guest PT 70. In S103, the VMM attempts to allocate from the shadow PT management unit 505 for the guest a memory in which to hold the new shadow PT 80. In S104, if the memory is successfully allocated, the VMM moves to S107; and if not, it moves to S105. In S105, the VMM selects a shadow PT 80 that is not registered with any CPU (10-0 to 10-n), i.e., a shadow PT 80 which has not been referenced by any PT pointer register 60. The step S106 resets a valid bit in the entry of the selected shadow PT 80 in the PT correspondence table to disable and free the shadow PT to increase the available memory. Then, in step S103, the VMM again attempts to allocate a memory. The step 107 generates a shadow PT 80 corresponding to the updated guest PT 70 and records the address of the updated guest PT and the address of the generated shadow PT 80 in the PT correspondence table 511. The VMM then substitutes the address of the generated shadow PT 80 into the PT pointer register 60 of the CPU 10 to have the CPU 10 perform the address conversion based on the updated guest PT 70.

<3.4. Generation of Shadow PT>

The generation of shadow PT as performed in the step S107 of FIG. 1 and in step S902 of FIG. 11 will be explained by referring to FIG. 12.

Step S1301 sets a shadow PT entry in the memory allocated for the shadow PT 80. The shadow PT entry is so set as to match an address of the guest virtual memory space to an address of the host physical memory space by referring to the correspondence relation defined in the guest PT 70 between the address of the guest virtual memory space and the address of the guest physical memory space. If the CPU 10 is IA-32 (or Intel(R)64), the guest PT 70 is a collection of multi-tiered tables connected by a pointer. Thus, the shadow PT 80 is also a collection of multi-tiered tables connected by a pointer. If the guest is in a PT invalid state, the VMM 20 generates a shadow PT 80 corresponding to the non-conversion guest PT in order to cause the CPU 10 to perform the same operation as when the guest PT 70 has an address non-conversion setting.

In S1302 the VMM records the correspondence between the guest PT 70 and the generated shadow PT 80 in the PT correspondence table 511. More specifically, a valid bit is set and the address of the generated shadow PT 80 and the address of the guest PT 70 are recorded. It is noted, however, that if the guest is in the PT invalid state, "0" is recorded instead of the guest PT address.

In S1303, a check is made as to whether the guest is in the PT invalid state or not. Only when the guest is found in a PT valid state (not in the PT invalid state), does the VMM moves to S1304.

In S1304, to detect the guest writing into a guest PT entry, all the guest PT entries are write-protected. More specifically, the guest is prohibited from writing into a guest PT entry by the VMM20 resetting the P bit in the shadow PT entry. With this setting, whenever the guest attempts to write into a guest PT entry, an exception occurs, allowing the VMM 20, that has received the exception, to detect the updating of the guest PT entry.

Step S1305 substitutes the address of the generated shadow PT 80 into the PT pointer register 60 of the CPU 10 to make the CPU 10 execute the address conversion based on the guest PT 70.

<3.5. Freeing Shadow PT>

The process of freeing a shadow PT as performed by step S105 of FIG. 1 will be explained by referring to FIG. 13.

Step S1401 checks whether the shadow PT BO to be freed is the one for a PT valid state. Only when the shadow PT 80 is for the PT valid state, does the VMM proceed to S1402. If the CPU 10 is IA-32 (or Intel(R)64), this check is made by referring to a guest set value for a PG bit in the privileged register CR0. The PT is valid only when the set value is 1.

Step S1402 determines a guest PT 70 that corresponds to the shadow PT 80 to be freed and disables the unwanted write protect set on a page including the guest PT 70 of interest. The unwanted write protect is one that is neither (1) a write protect specified by the guest PT nor (2) a write protect set on a page including an entry of the guest PT corresponding to the shadow PT held by the VMM. Only if the guest does not set the write protect on any of the pages that include the entry of the guest PT 70 corresponding to the shadow PT 80 to be freed and if these pages do not include other guest PT entries than the guest PT entry of interest, does the VMM 20 set a shadow PT entry write enable flag for these pages, resetting the unwanted write protect.

In S1403, the VMM disables the entry of the PT correspondence table 511 holding the address of the shadow PT to be freed, thereby preventing a possible reuse of the freed shadow PT 80.

In S1404, the VMM frees the memory area used by the shadow PT 80 to be freed, allowing the memory area of interest to be reused for holding a shadow PT of the guest.

<3.6. Updating of Shadow PT Entry>

The updating of the shadow PT entry as performed by S809 of FIG. 10 will be explained by referring to FIG. 14.

Step S1601 identifies a shadow PT entry corresponding to the guest PT entry to be updated.

Step 1602 checks if the shadow PT containing the shadow PT entry of interest is set in the PT pointer register 60 of the CPU 10. If so, the VMM moves to step S1603. If not, it proceeds to step S1611.

Step S1603 checks if a guest PT entry is added. If the CPU 10 is IA-32 (or Intel(R)64), this step checks for an increase in the number of guest PT entries resulting from a change of P bit and PS bit. When the P bit in the guest PML4 (1101), guest PDP (1102) or guest PDE (1103) changes from 0 to 1, a lower-level table pointed by each entry becomes valid and thus the number of guest PT entries increases. Further, if the CR4.PSE is 1, when the PS bit in the PDE (1103) changes from 1 to 0, the PDE (1103) points to the PTE table (1004), thus increasing the number of guest PT entries.

Step 1620 attempts to allocate from the shadow PT management unit 505 for the guest a memory for use in adding an entry to the shadow PT 80.

Figure 1:
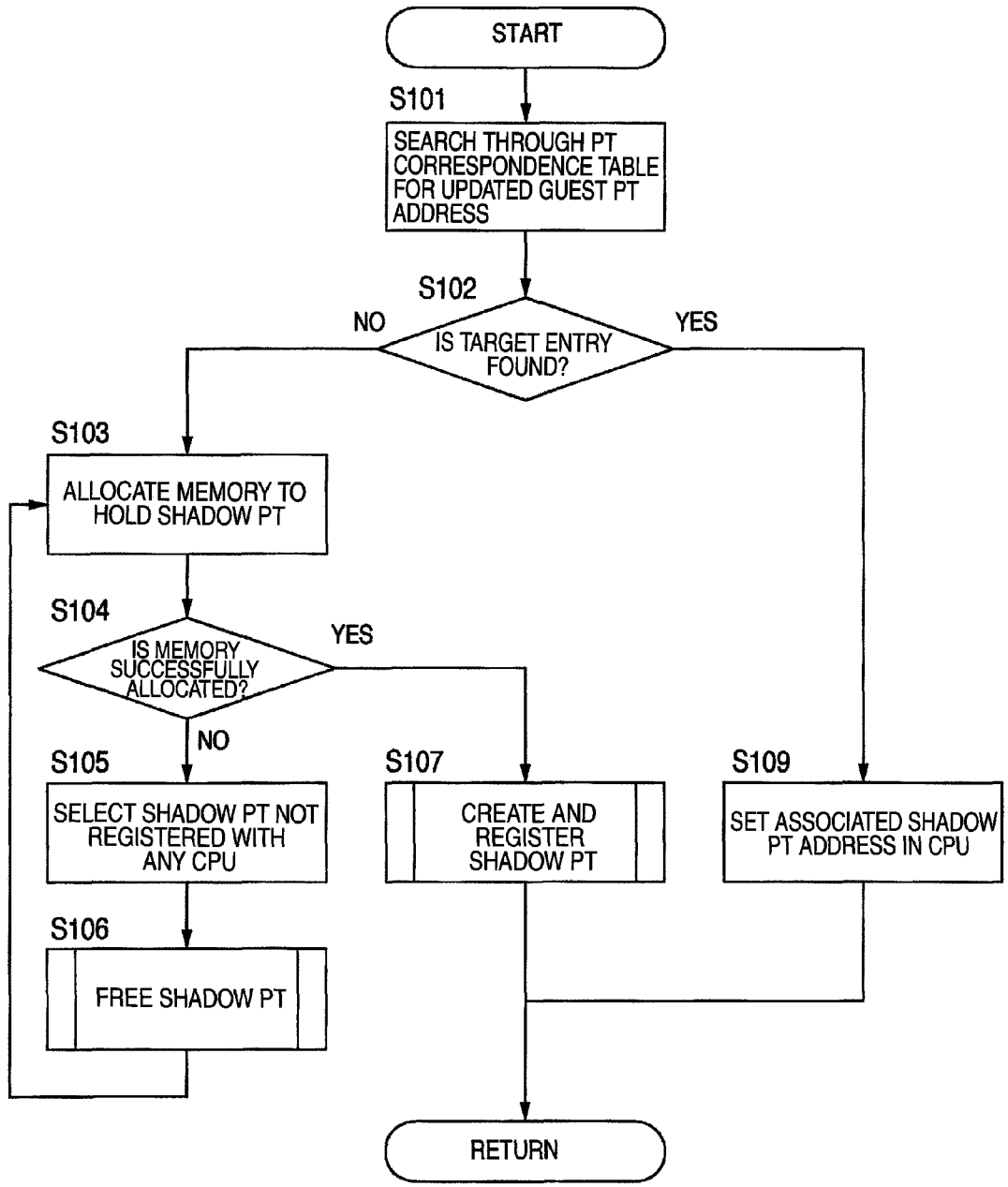
FIG. 1 is a flowchart showing a shadow PT search and registration operation in embodiment 1, 3, 5 and 7.
Figure 2:
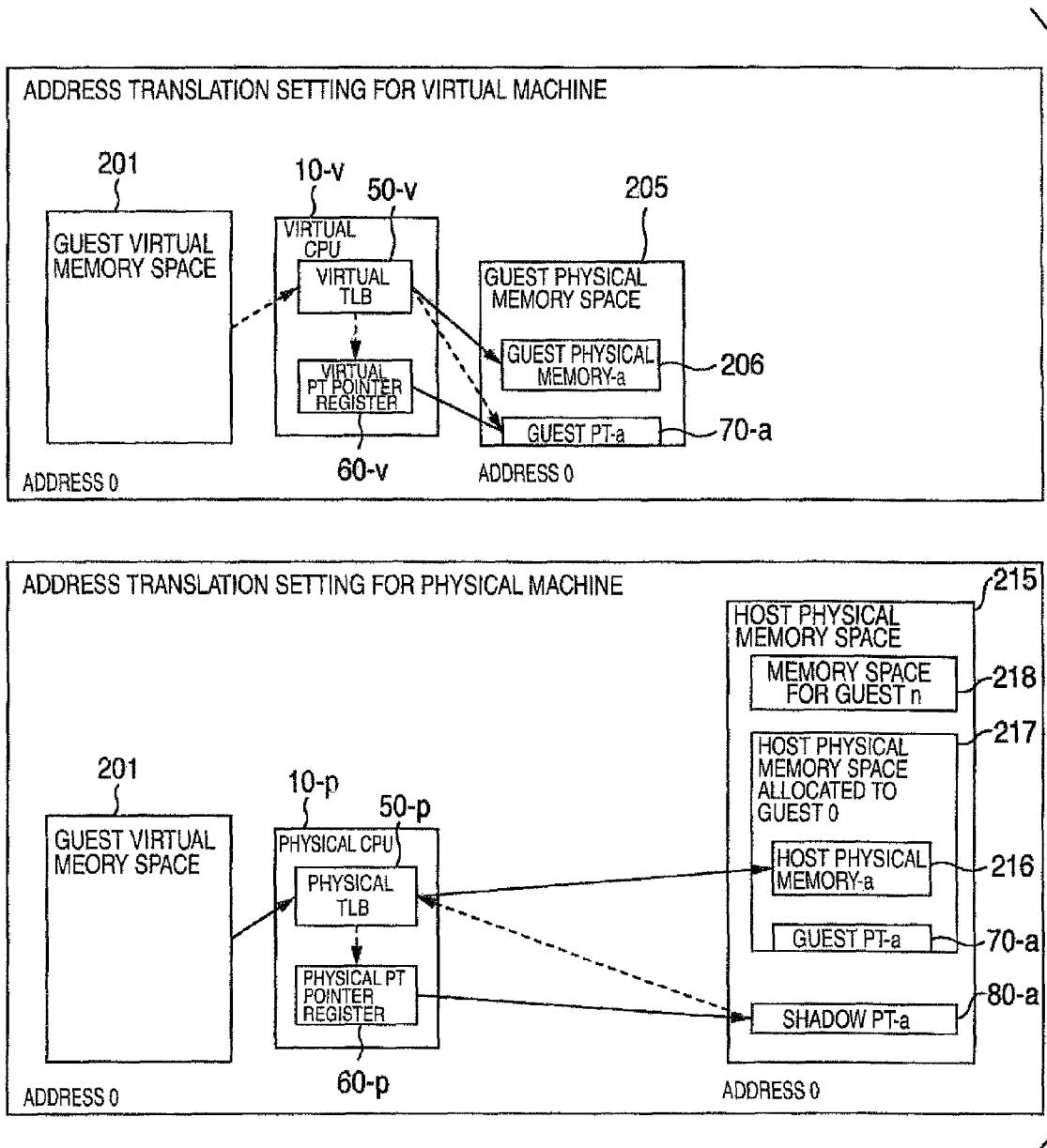
FIG. 2 is a conceptual diagram showing an address translation setting in a physical machine that corresponds to an address translation setting in a virtual machine.

Steps S104-S106 are the same as S104-S106 of FIG. 1 and free the shadow PTs that are not used, in order to increase the available memory.

Step S1604 sets a shadow PT entry corresponding to the added guest PT entry. Step 1605 resets a write enable bit for the shadow PT entry associated with a page containing the added guest PT entry, write-protecting the guest PT entry. Step 1606 checks for a deletion of a guest PT entry. If the CPU 10 is IA-32 (or Intel(R)64), this step checks for a decrease in the number of guest PT entries resulting from a change of P bit and PS bit. When the P bit in the guest PML4 (1101), guest PDP (1102) or guest PDE (1103) changes from 1 to 0, a lower-level table pointed by each entry becomes invalid and thus the number of guest PT entries decreases. Further, if the CR4.PSE is 1, when the PS bit in the PDE (1103) changes from 0 to 1, the PDE (1103) no longer points to the PTE table (1004), thus reducing the number of guest PT entries.

Step S1607 frees tables in the shadow PT that is no longer used to make the associated memory area available for reuse. Step S1608 resets an unnecessary write protect, if any, that is set on the removed guest PT entry. Only if the guest does not set the write protect on the page containing an entry of the deleted guest PT and if there are no other guest PT entries in that page, does the VMM 20 set a shadow PT entry write enable flag for that page and reset unnecessary write protect. Step S1609 updates a shadow PT entry corresponding to the guest PT entry to be updated, according to the content of the updated guest PT entry.

In step S1610 the VMM 20, acting for the guest, updates the guest PT entry according to a guest PT entry update request. This step is done because the guest PT entry is write-protected from the guest and can only be updated by the VMM 20. Step S1611 frees the shadow PT including the shadow PT entry of interest and disables the shadow PT entry of interest in the PT correspondence table. This procedure prevents the shadow PT holding the old content from being used again.

<4. Conclusion>

According to the embodiment 1 described above, when a guest PT is used repetitively by reusing the generated shadow PT, the process of setting the shadow PT can be omitted. Generally, the switching of the guest PTs is mostly to those guest PTs that have been previously used, so this embodiment can greatly reduce redundancy resulting from the processing invoked by the guest PT switching, increasing the speed of the guest PT address update.

Embodiment 2

In a second embodiment of this invention, the PT correspondence table of the embodiment 1 is extended so that the shadow PT management unit can hold a plurality of shadow PTs in different PT formats. Referring to the accompanying drawings, the embodiment 2 will be explained, centering on the difference from the embodiment 1.

<1. Hardware Configuration>

The hardware configuration of the embodiment 2 is as shown in FIG. 4, i.e., the same as that of the embodiment 1.

<2. Software Configuration>

The software configuration of this embodiment differs from that of the embodiment 1 only in the structure of the PT correspondence table that records the correspondence between a guest PT 70 and a shadow PT 80. The structure of the PT correspondence table 511 characteristic of the embodiment 2 is shown in FIG. 15. Each entry recorded in the PT correspondence table 511 has a valid bit 1801 signifying the validity of the entry, an identifier 1852 of the guest PT format, a guest PT address 1803 that a guest specified in the PT pointer register (60-v) and a shadow PT address 1804 that the VMM 20 specifies in the PT pointer register (60-p). When the guest updates the guest PT format and the guest PT address, the VMM searches through the PT correspondence table 511 for a shadow PT address 1804 corresponding to the updated guest PT format 1852 and the guest PT address 1803.

<3. Shadow PT Operation by VMM>

<3.1. Overview of Shadow PT Operation by VMM>

Figure 16:
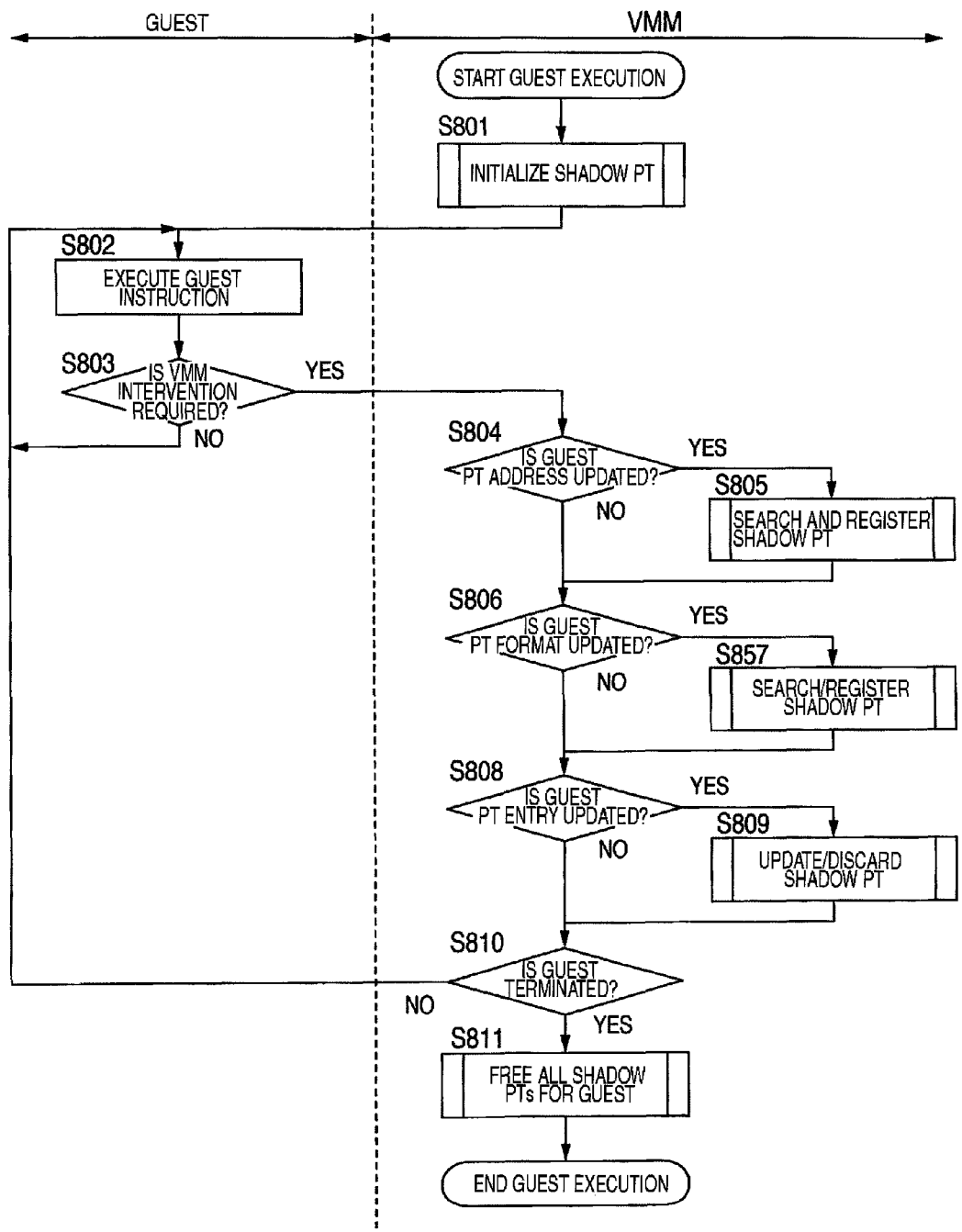
FIG. 16 is a flowchart showing an outline of actions of a guest and of a shadow PT operation performed by VMM in embodiment 2.

FIG. 16 is a flowchart showing overall processing when a guest is executed on the VMM 20, with the right side of a dashed line in the figure representing the operation performed by the VMM 20 and the left side representing the operation performed by the guest. Of these operations, only a portion performed following the detection of update of the guest PT format differs from the flowchart of the embodiment 1 shown in FIG. 10. In the event of a detection of the update of the guest PT format, the processing moves to step S857.

Step S857, upon receiving a request to change the guest PT format, searches through the PT correspondence table 511 of the VMM 20 for a shadow PT 80 corresponding to the updated guest PT 70. When the target shadow PT 80 exists, an address of the shadow PT 80 is registered with the PT pointer register 60. If the target shadow PT 80 is not found, S857 generates a shadow PT 80 corresponding to the updated guest PT 70, records the relation between the generated shadow PT 80 and the updated guest PT 70 in the PT correspondence table 511, and registers an address of the generated shadow PT 80 with the PT pointer register 60.

<3.2. Initialization of Shadow PT>

Figure 11:
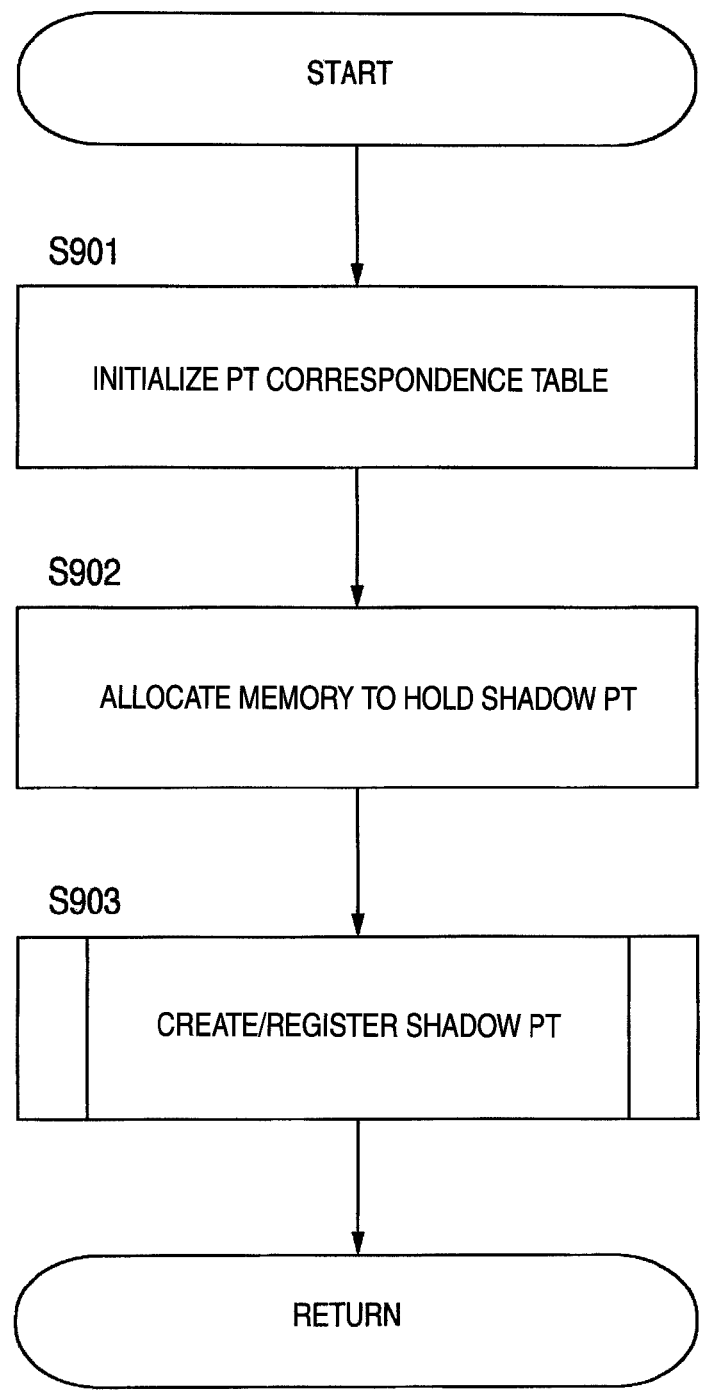
FIG. 11 is a flowchart showing a shadow PT initialization operation in embodiment 1 to 10.

The shadow PT is initialized as shown in FIG. 11, in the same way as in the embodiment 1.

<3.3. Search and Registration of Shadow PT>

Figure 17:
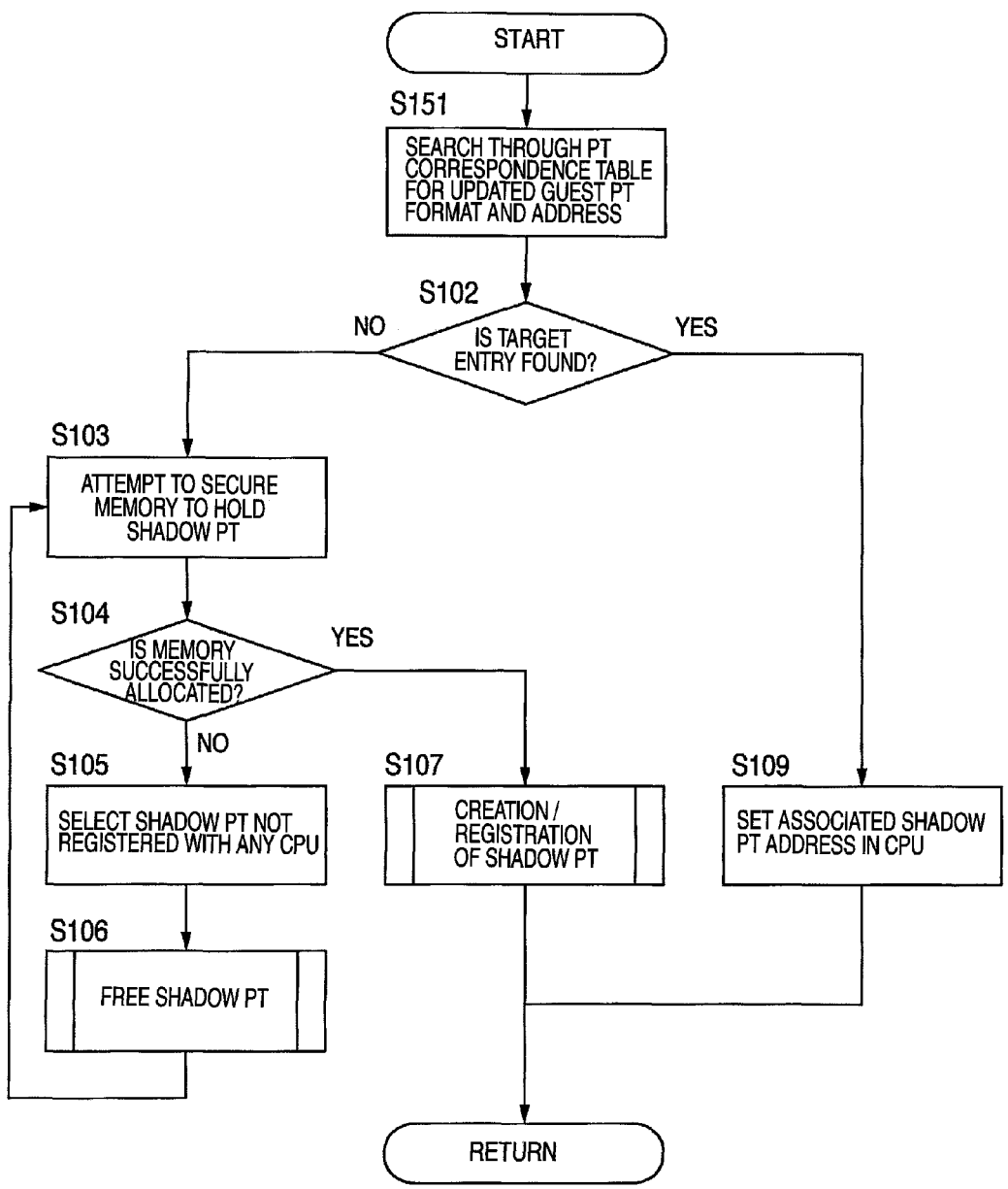
FIG. 17 is a flowchart showing a shadow PT search and registration operation in embodiment 2, 4, 6 and 8.

The search and registration of a shadow PT as performed by steps S805 and S857 of FIG. 16 will be explained by referring to FIG. 17. In FIG. 17, only S151 immediately following the start of the flowchart differs from the flow (FIG. 1) of shadow PT search and registration of the embodiment 1.

Step S151, in response to the updating of the guest PT address, searches through the PT correspondence table 511 for a valid entry containing the updated guest PT format and guest PT address. When there is a target entry, the processing moves to S109 as in the embodiment 1 where it registers a shadow PT corresponding to the updated guest PT with the CPU. If the target entry is not found, the processing moves to S103 as in the embodiment 1 where it generates and registers a shadow PT.

<3.4. Generation of Shadow PT>

Figure 18:
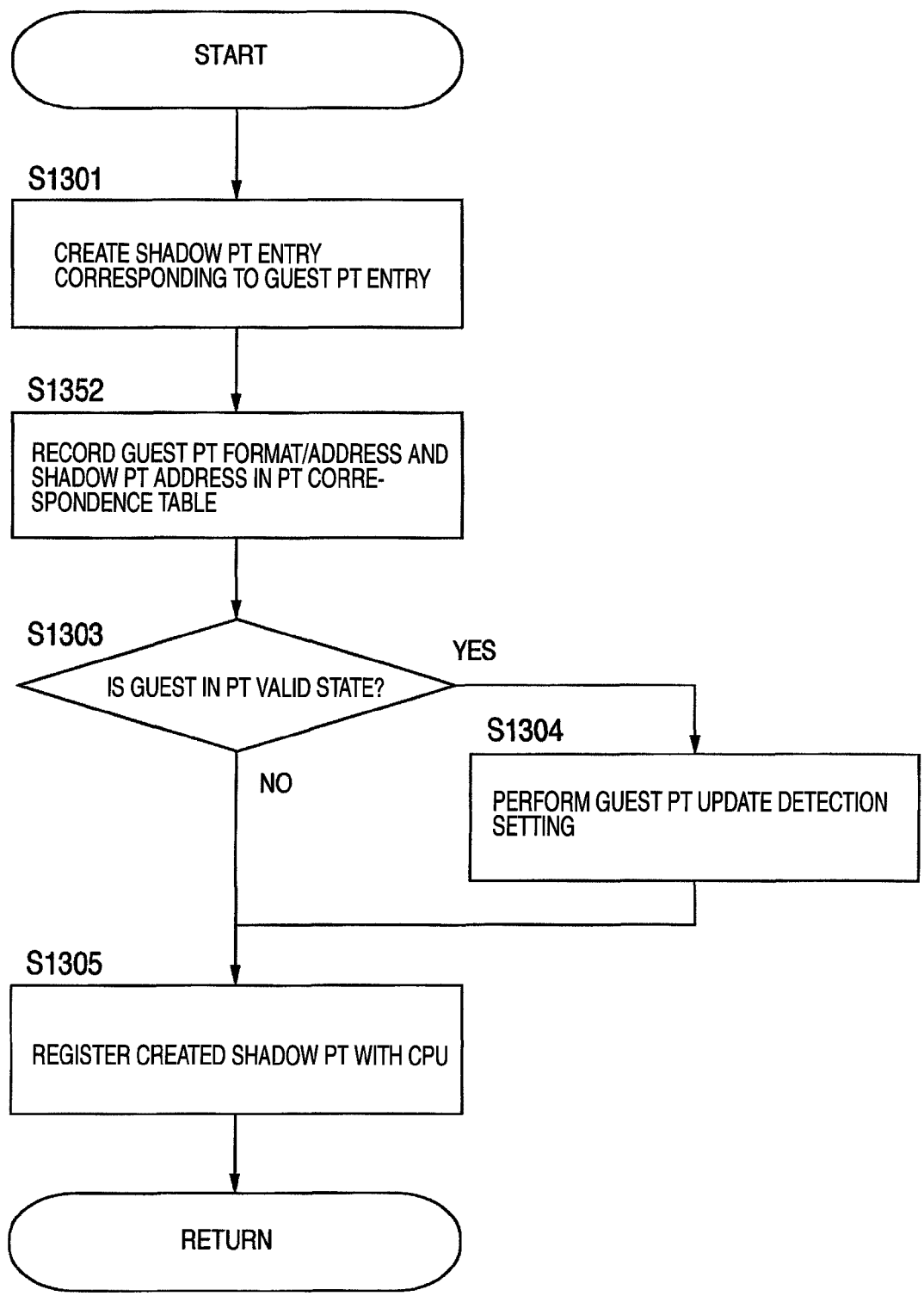
FIG. 18 is a flowchart showing a shadow PT creation operation in embodiment 2 and 4.

The generation of a shadow PT as performed by S107 of FIG. 17 and S902 of FIG. 11 will be explained by referring to FIG. 18. In FIG. 18, only step S1352 of updating the PT correspondence table 511 differs from the shadow generation flow of the embodiment 1 of FIG. 12.

Step S1352 records a correspondence between the guest PT 70 and the generated shadow PT 80 in the PT correspondence table 511. More specifically, a valid bit is set, and an address of the generated shadow PT and the guest PT format and guest PT address are recorded. It is noted that, if the guest is in a PT invalid state, 0 is recorded instead of the guest PT address.

<3.5. Freeing Shadow PT>

Figure 13:
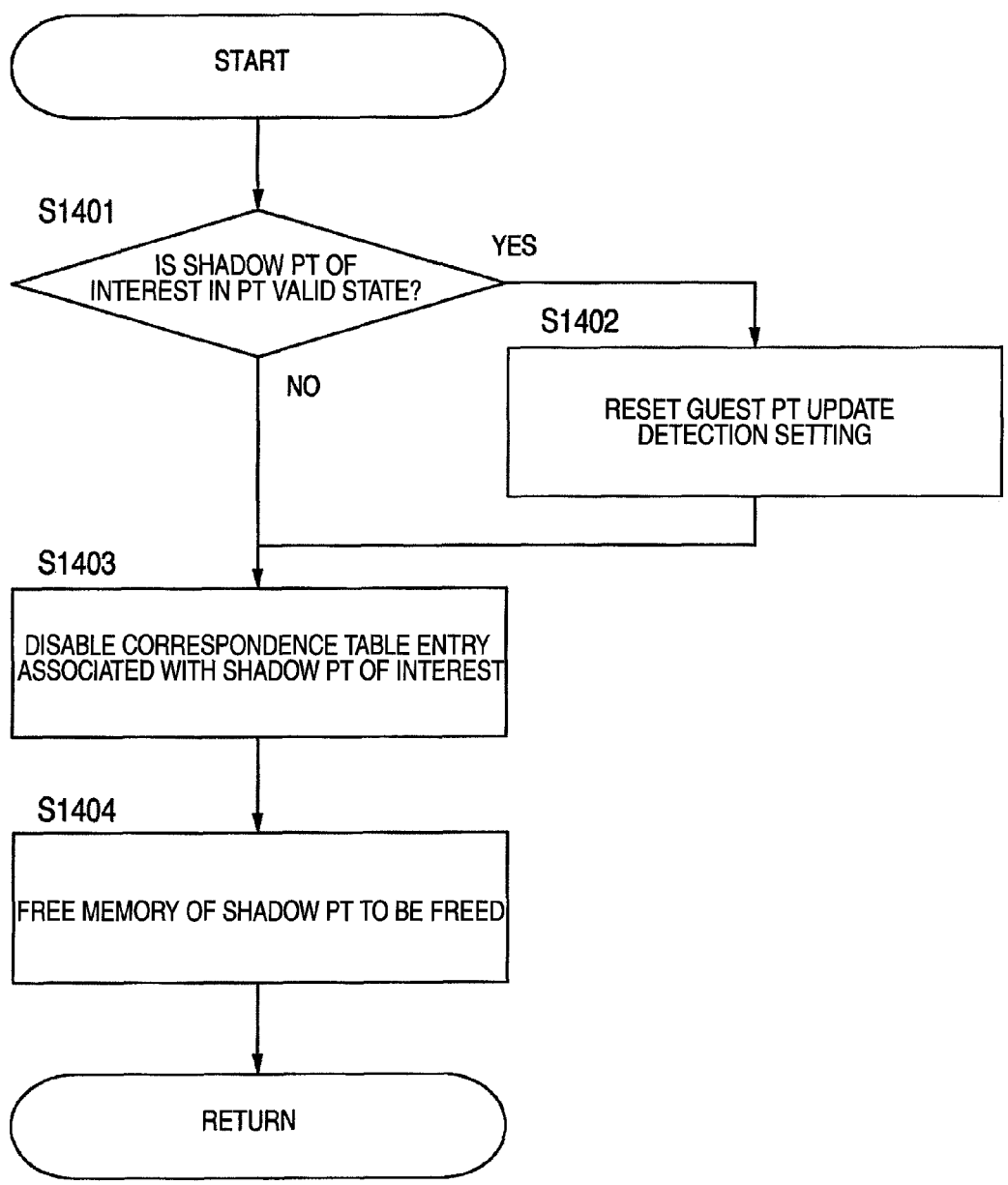
FIG. 13 is a flowchart showing a shadow PT freeing operation in embodiment 1 to 10.

A flowchart for freeing a shadow PT is shown in FIG. 13. That is, the freeing process is the same as in the embodiment 1. It is noted that there is some difference in step S1401, which will be explained below.

Step S1401 checks if the shadow PT 80 to be freed is the one for a PT valid state. Only when the shadow PT 80 is for the PT valid state, does the processing move to S1402. This decision is done by referring to the PT format identifier recorded in the PT correspondence table 511.

<3.6. Updating of Shadow PT Entry>

Figure 14:
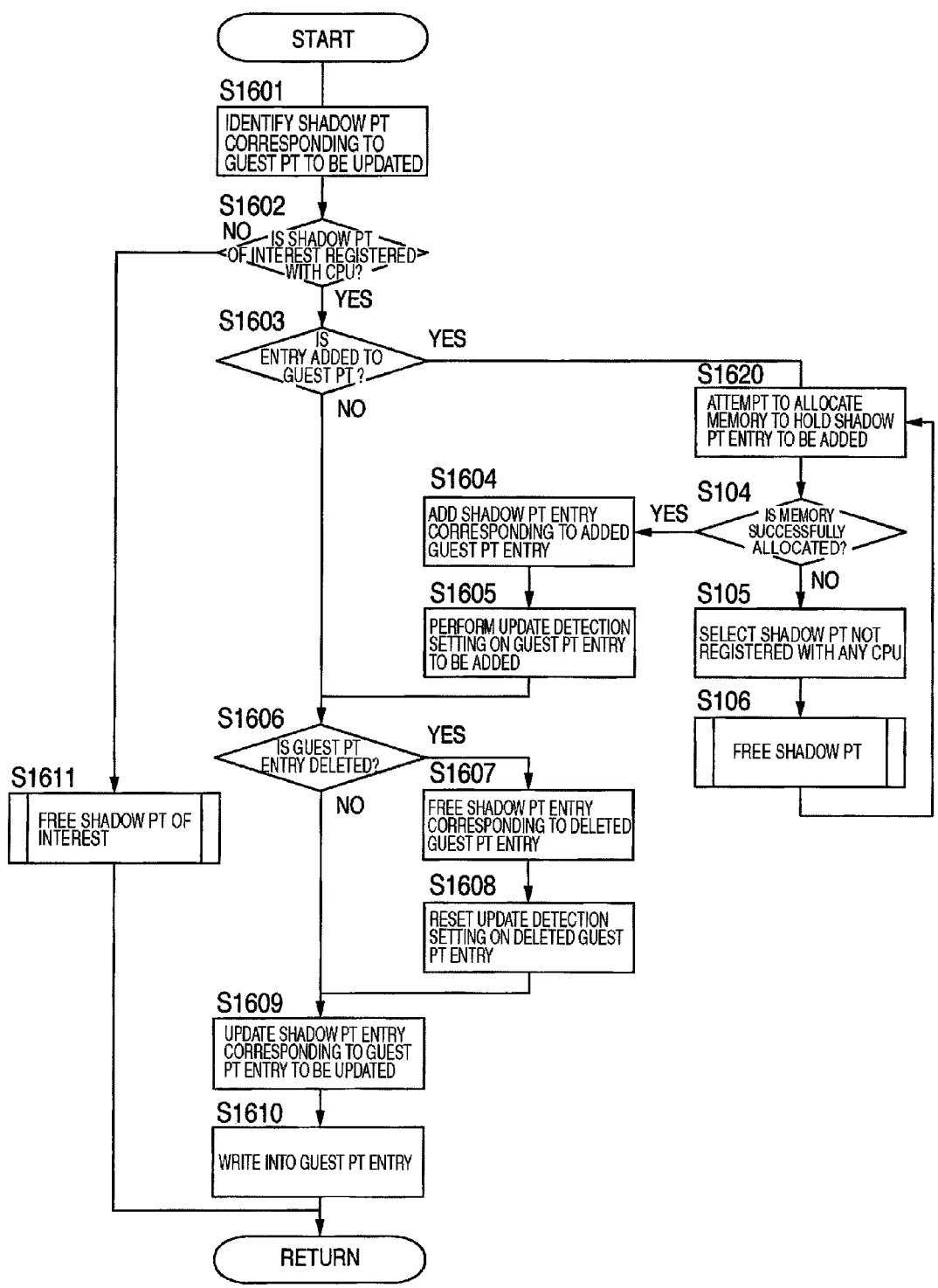
FIG. 14 is a flowchart showing a shadow PT entry updating operation in embodiment 1, 2, 3 and 4.

The updating of a shadow PT entry is as shown in FIG. 14 and is the same as in the embodiment 1.

<4. Conclusion>

Since the embodiment 2 described above allows the reuse of the generated shadow PT even when a guest PT format is changed, the updating of a guest PT address can be speeded up.

Embodiment 3

This embodiment is applied to a CPU having a PT correspondence table. As the CPU having the PT correspondence table, one that supports a VT-x (Intel Virtualization Technology for IA-32 Processors) function is used. The embodiment 3 will be described below centering on differences from the embodiment 1 by referring to the drawings.

<1. Hardware Configuration>

The hardware configuration is as shown in FIG. 4. That is, although the configuration is the same as that of the embodiment 1, the CPU 10 is limited to the one that supports the VT-x function.

<2. Software Configuration>

Since the VT-x function enables a part of the guest PT address update operation to be executed by the CPU 10, the software configuration differs from the embodiment 1 in only a module associated with the guest PT address updating.

Figure 19:
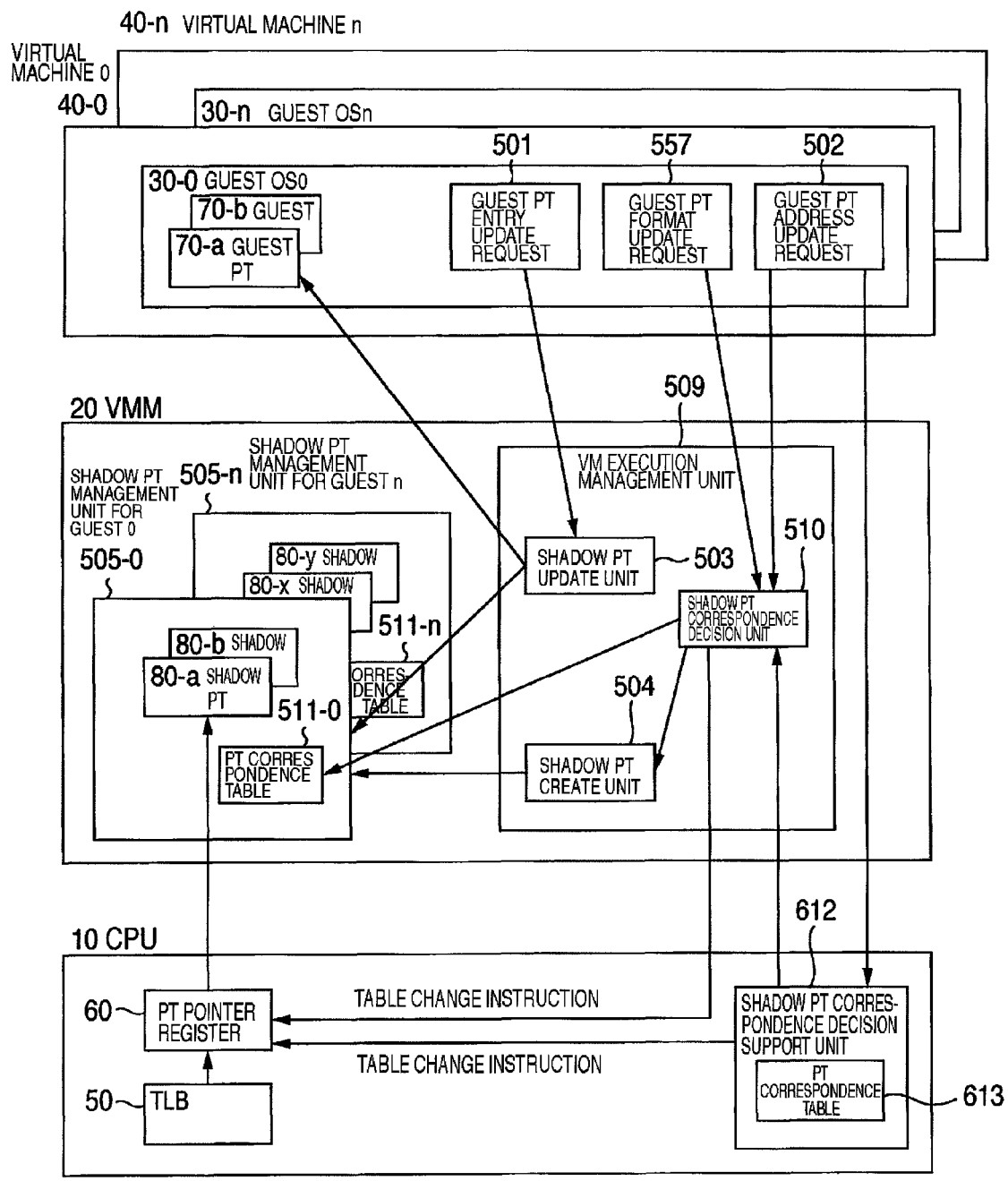
FIG. 19 is a block diagram showing essential portions of software and hardware of the virtual machine system in embodiment 3 and 4.

The guest PT address updating will be explained by referring to FIG. 19. The CPU that supports the VT-x function has a 4-entry PT correspondence table 613. It also has a shadow PT correspondence decision support unit 612 that searches for a shadow PT 80 corresponding to the guest PT 70 by using this PT correspondence table 613.

When a guest issues a guest PT address update request 502, the shadow PT correspondence decision support unit 612 in the CPU 10 searches for a shadow PT 80 corresponding to the updated guest PT 70 by using the PT correspondence table 613 in the CPU 10. If the target shadow PT 80 is found, the CPU 10 sets an address of the shadow PT 80 in the PT pointer register 60. If the target shadow PT does not exist, the CPU 10 notifies the shadow PT correspondence decision unit 510 in the VMM 20 of the guest PT address update request 502 and leaves the subsequent processing to the VMM 20. Upon receipt of the request, the VMM 20, as in the embodiment 1, performs search, generation and registration of the shadow PT 80 corresponding to the updated guest PT 70.

<3. Shadow PT Operation by VMM>

Next, an example of how the VMM operates a shadow PT in accordance with the action of a guest in the embodiment 3 will be described.

<3.1. Overview of Shadow PT Operation by VMM>

The outline of a shadow PT operation is as shown in FIG. 10, i.e., the same as in the embodiment 1.

<3.2. Initialization of Shadow PT>

The initialization of shadow PT is as shown in FIG. 11, i.e., the same as in the embodiment 1.

<3.3. Search and Registration of Shadow PT>

The shadow PT search and registration is as shown in FIG. 17, i.e., the same as in the embodiment 1.

<3.4. Generation of Shadow PT>

Figure 12:
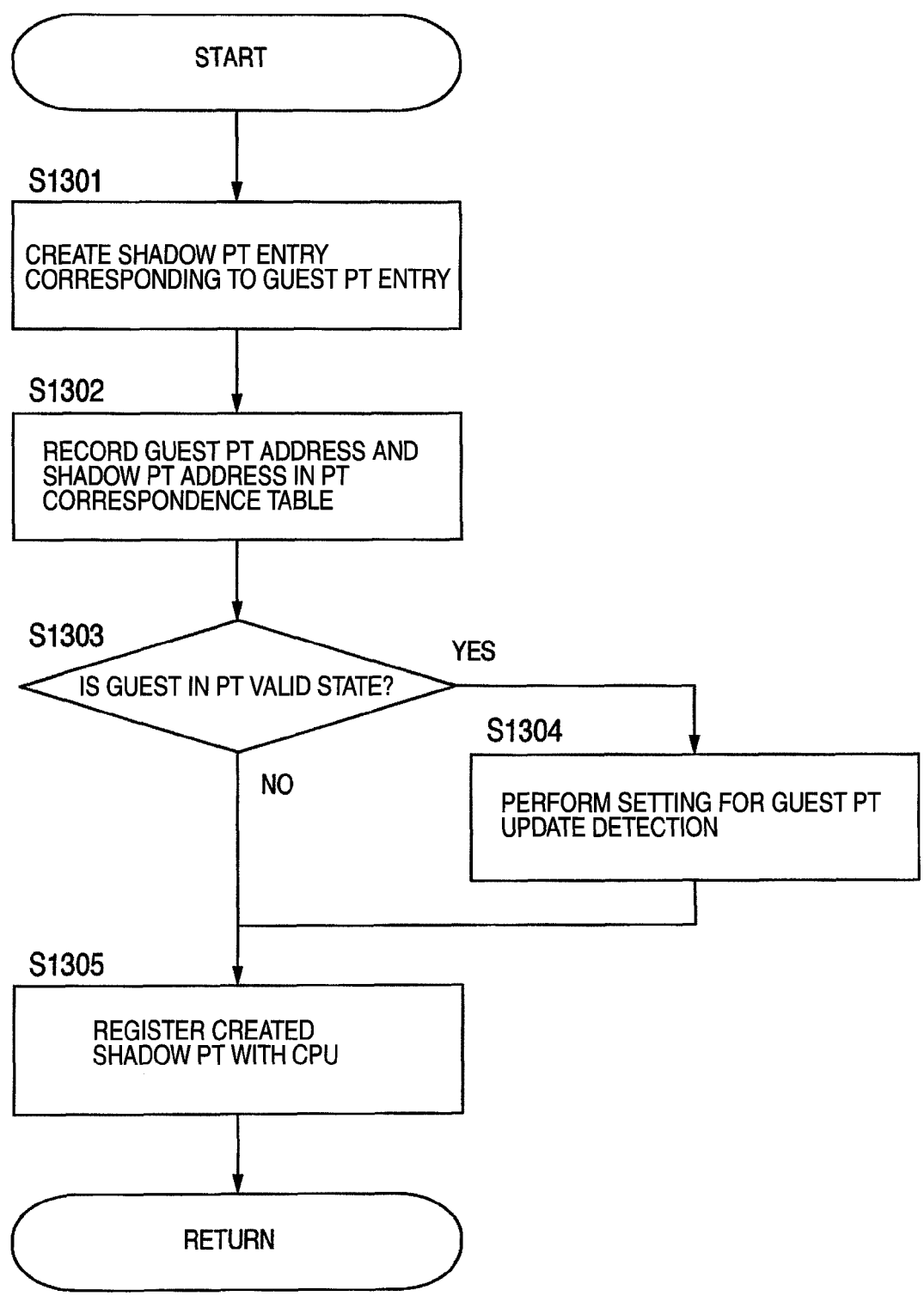
FIG. 12 is a flowchart showing a shadow PT creation operation in embodiment 1 and 3.

A process of generating a shadow PT is as shown in a flowchart of FIG. 12, i.e., the same as in the embodiment 1. It is noted, however, that there is some difference in step S1302, which will be explained below.

In the process of shadow PT generation in the embodiment 3, step S1302 records a correspondence between a guest PT and a generated shadow PT 80 in the PT correspondence table 613 of the CPU 10 as well as in the PT correspondence table 511 of the VMM. The step is similar to the embodiment 1 in that a valid bit is set and that the address of the generated shadow PT and the address of the guest PT are recorded. When the guest is in a PT invalid state, 0 is recorded instead of the guest PT address. This is also the same as in the embodiment 1.

<3.5. Freeing Shadow PT>

A process of freeing a shadow PT is as shown in a flowchart of FIG. 13, i.e., the same as in the embodiment 1. It is noted, however, that there is some difference in step S1403, which will be explained below.

Step S1403 disables entries in the PT correspondence table 511 of the VMM and in the PT correspondence table 613 of the CPU 10 that hold an address of the shadow PT to be freed, thus preventing the freed shadow PT 80 from being used again.

<3.6. Updating of Shadow PT Entry>

A process of updating a shadow PT entry is as shown in FIG. 14, i.e., the same as in the embodiment 1.

<4. Conclusion>

As described above, this embodiment can use the VT-x function to speed up the guest PT address updating process.

Embodiment 4

A fourth embodiment makes it possible to hold a plurality of shadow PTs in different PT formats as in the embodiment 2, with the CPU having a PT correspondence table. The following explanations will focus on differences from the embodiment 2.

<1. Hardware Configuration>

A hardware configuration is as shown in FIG. 4 and the same as in the embodiment 2. Further, as in the embodiment 3, the CPU 10 is limited to the ones supporting the VT-x function.

<2. Software Configuration>

Since the VT-x function allows the CPU 10 to execute a part of the guest PT address updating process, the software configuration differs from the embodiment 2 in only a module associated with the guest PT address update. The software configuration and the guest address update procedure are exactly the same as those of the embodiment 3 explained with reference to FIG. 19.

<3. Shadow PT Operation by VMM>

Next, an example of how the VMM operates a shadow PT in accordance with the action of a guest in the embodiment 4 will be described.

<3.1. Overview of Shadow PT Operation by VMM>

Figure 20:
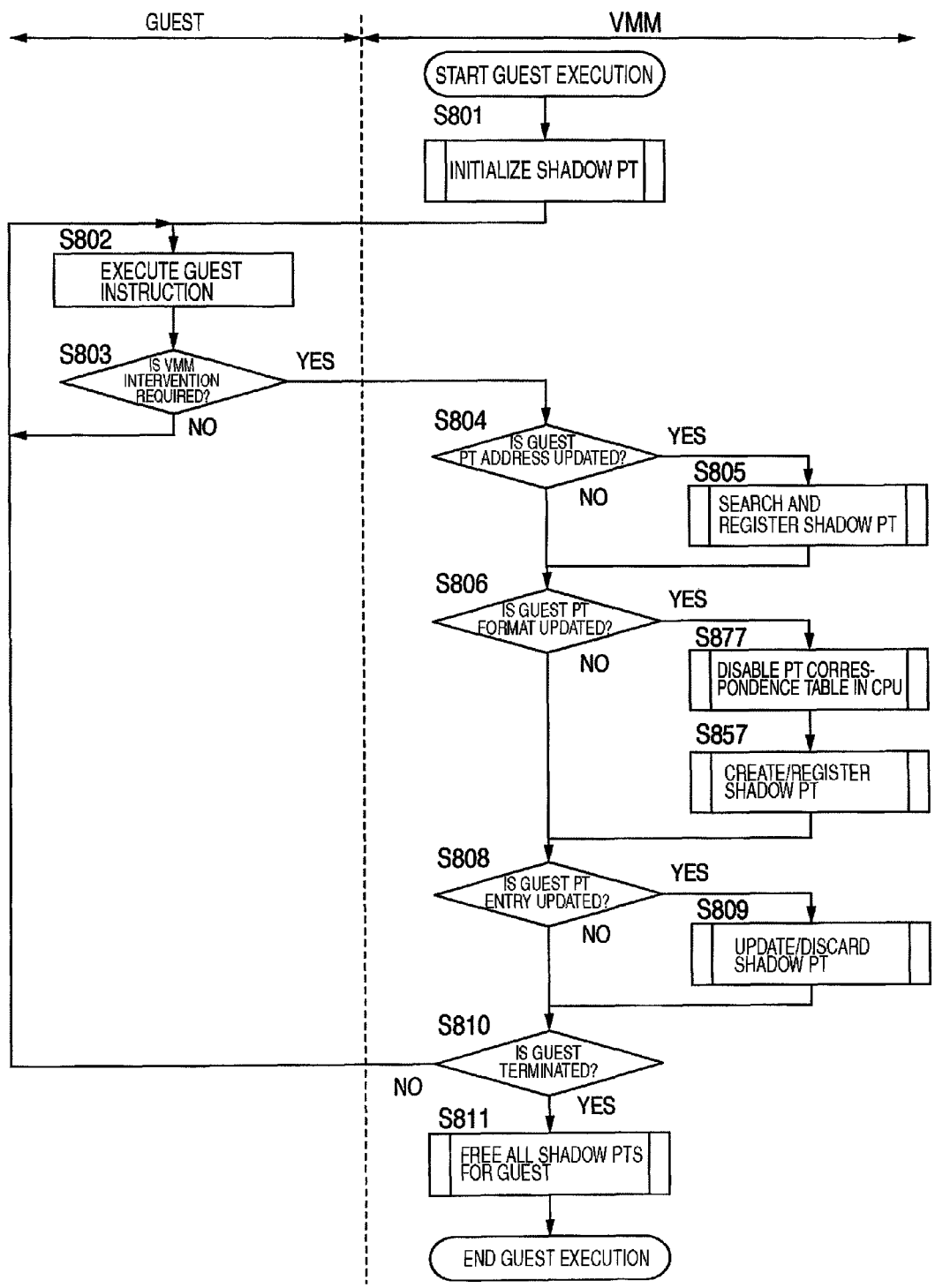
FIG. 20 is a flowchart showing an outline of actions of a guest and of a shadow PT operation performed by VMM in embodiment 4.

FIG. 20 is a flowchart showing overall processing when a guest is executed on the VMM, with the processing on the right side of a dashed line performed by the VMM and the processing on the left side performed by the guest.

FIG. 20 differs from the embodiment 2 only in the operation performed after the update of a guest PT format has been detected. If the update of the guest PT format is detected, the processing moves to step S877.

Step S877 disables all entries in the PT correspondence table 613 of the CPU 10. This step is taken to prevent the CPU 10 from inadvertently using a shadow PT 80 of different PT format. After S877, the processing moves to S857, as in the embodiment 2.

The shadow PT is initialized as shown in FIG. 11, i.e., the same as in the embodiment 2.

<3.3. Search and Registration of Shadow PT>

The shadow PT search and registration is as shown in FIG. 17, i.e., the same as in the embodiment 2.

<3.4. Generation of Shadow PT>

A process of generating a shadow PT is as shown in a flowchart of FIG. 18, i.e., basically the same as in the embodiment 2. It is noted, however, that there is some difference in step S1352, which records the guest PT format and address and the shadow PT address in the PT correspondence table 613 of the CPU as well as in the PT correspondence table 511 of the VMM.

<3.5. Freeing Shadow PT>

The process of freeing a shadow PT is almost the same as in the embodiment 2. More specifically, the procedure basically shown in the flowchart of FIG. 13 is executed but a decision in step S1401 is made by referring to a PT format identifier recorded in the PT correspondence table 511. It is noted, however, that the shadow PT freeing process is similar to that of the embodiment 3 in that the entries in the PT correspondence table 613 of the CPU are also disabled in step S1403.

<3.6. Updating of Shadow PT Entry>

A process of updating a shadow PT entry is as shown in FIG. 14, i.e., the same as in the embodiment 2.

<4. Conclusion>

With this embodiment, by reusing the generated shadow PT and utilizing the VT-x function, the guest PT address updating process can be speeded up even when a guest PT format is changed.

Embodiment 5

To reduce the overhead of generating a shadow PT in the embodiment 1, the embodiment 5 allows a separation between the guest PT and the shadow PT. More specifically, the overhead is reduced by delaying the setting of the shadow PT entry until it becomes necessary, thereby omitting unnecessary shadow PT entry setting. The embodiment 5 will be explained as follows, centering on differences from the embodiment 1.

<1. Hardware Configuration>

A hardware configuration of the embodiment 5 is as shown in FIG. 4 and therefore the same as that of the embodiment 1.

<2. Software Configuration>

Figure 21:
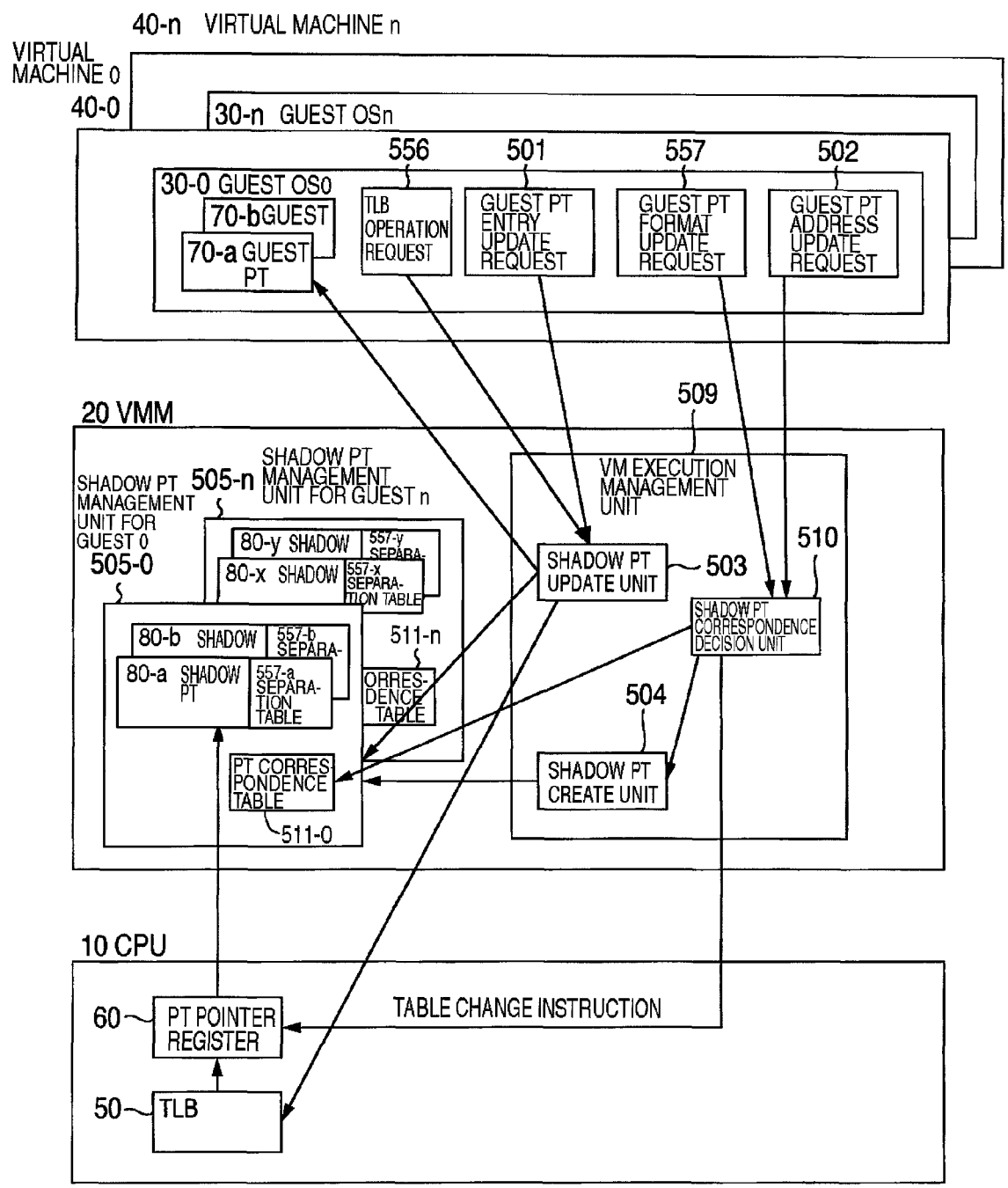
FIG. 21 is a block diagram showing essential portions of software and hardware of the virtual machine system in embodiment 5, 6 and 10.

Main portions of the software configuration that realizes virtual machines VM0-VMn on a physical machine are shown in FIG. 21. The software configuration of the embodiment 5 differs from that of the embodiment 1 (FIG. 5) in that the shadow PT management unit 505 includes a separation table 557 and in the operations of the shadow PT generation unit 504 and the shadow PT update unit 503. The separation table 557 is a table that records a state of separation between the shadow PT entry and the guest PT entry and holds them for each shadow PT 80.

When a shadow PT 80 not present in the shadow PT management unit 505 becomes necessary, the shadow PT generation unit 504 generates the shadow PT 80 with all entries disabled (P bit is 0) and a separation table 557 indicating that all entries of the shadow PT 80 are separated from a guest PT entry. The shadow PT update unit 503, upon receiving a guest PT entry update request 501, updates the guest PT entry and records the updated guest PT entry in the separation table 557 corresponding to the guest PT of interest. Further, upon receiving a TLB operation request 556 from the guest (a request to load the content of the guest PT 70 into the TLB 50), the shadow PT update unit 503 searches for the separation table 557 corresponding to the guest PT 70 to be loaded. If the guest PT entry to be loaded is found to be separate from the shadow PT entry, the shadow PT update unit 503 makes setting for the shadow PT entry, deletes information of the entry from the separation table 557 and then loads the shadow PT entry into the TLB 50. If the guest PT entry to be loaded is synchronized with (not separated from) the shadow PT entry, the shadow PT entry of interest is loaded into the TLB 50.

Figure 22:
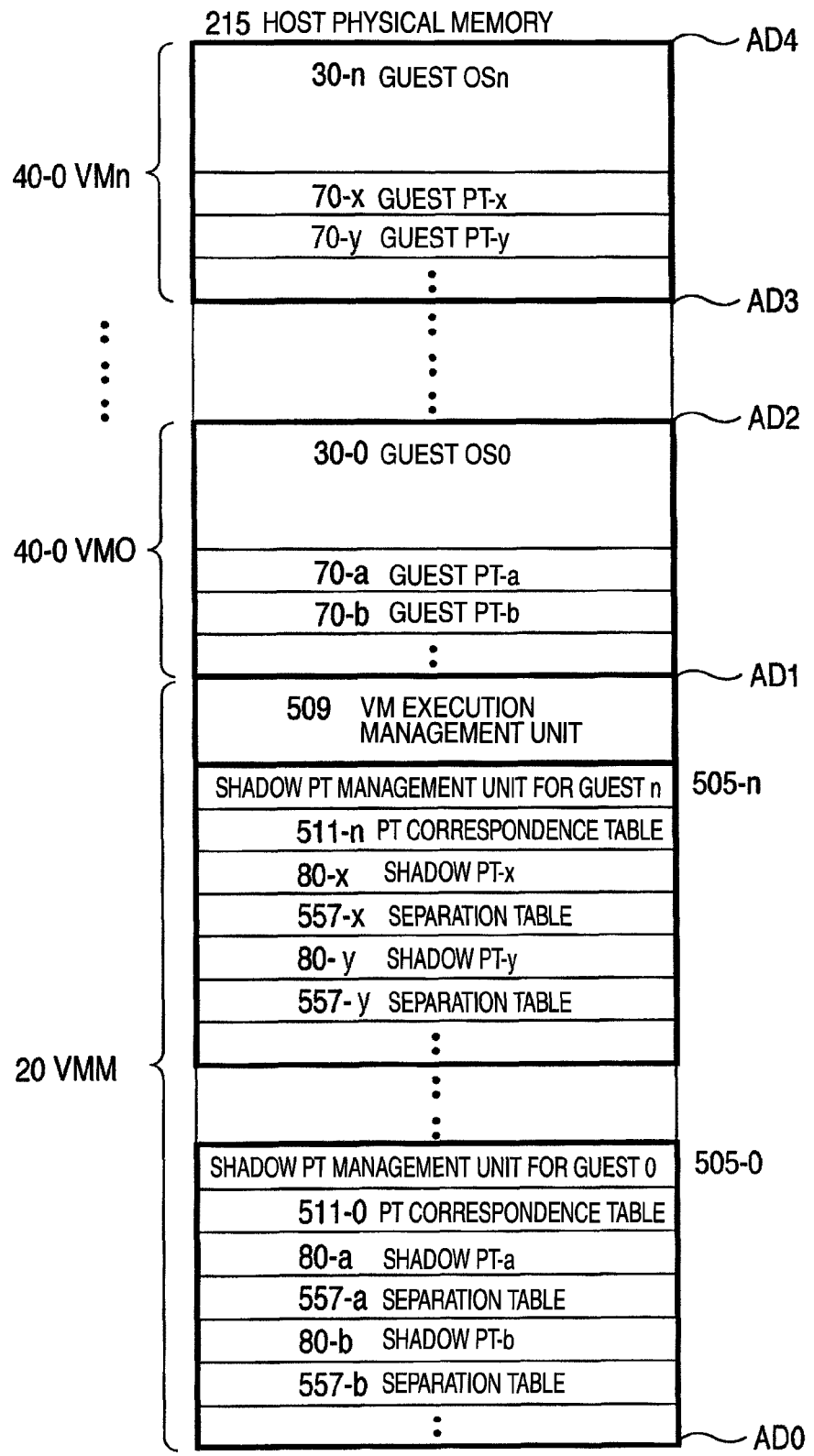
FIG. 22 illustrates a memory area map in embodiment 5, 6, 7, 8 and 10.

An example of host physical memory space managed by the VMM in the embodiment 5 is shown in FIG. 22. This differs from the embodiment 1 in that there is a separation table 557 associated with each shadow PT 80 in the shadow PT management unit 505.

A structure of the separation table is shown in FIG. 23. Each entry in the separation table 557 has a valid bit 2001 and a PT entry number (PT entry identifier) 2002. Only when the contents of the shadow PT entry and the guest PT entry are separate, is the separation table 557 recorded with the PT entry number 2002 of the PT entry of interest and set with the valid bit 2001.

<3. Shadow PT Operation by VMM>

Next, an example of how the VMM operates a shadow PT in accordance with the action of a guest will be described centering on differences from the embodiment 1, by referring to a flowchart.

<3.1. Overview of Shadow PT Operation by VMM>

Figure 24:
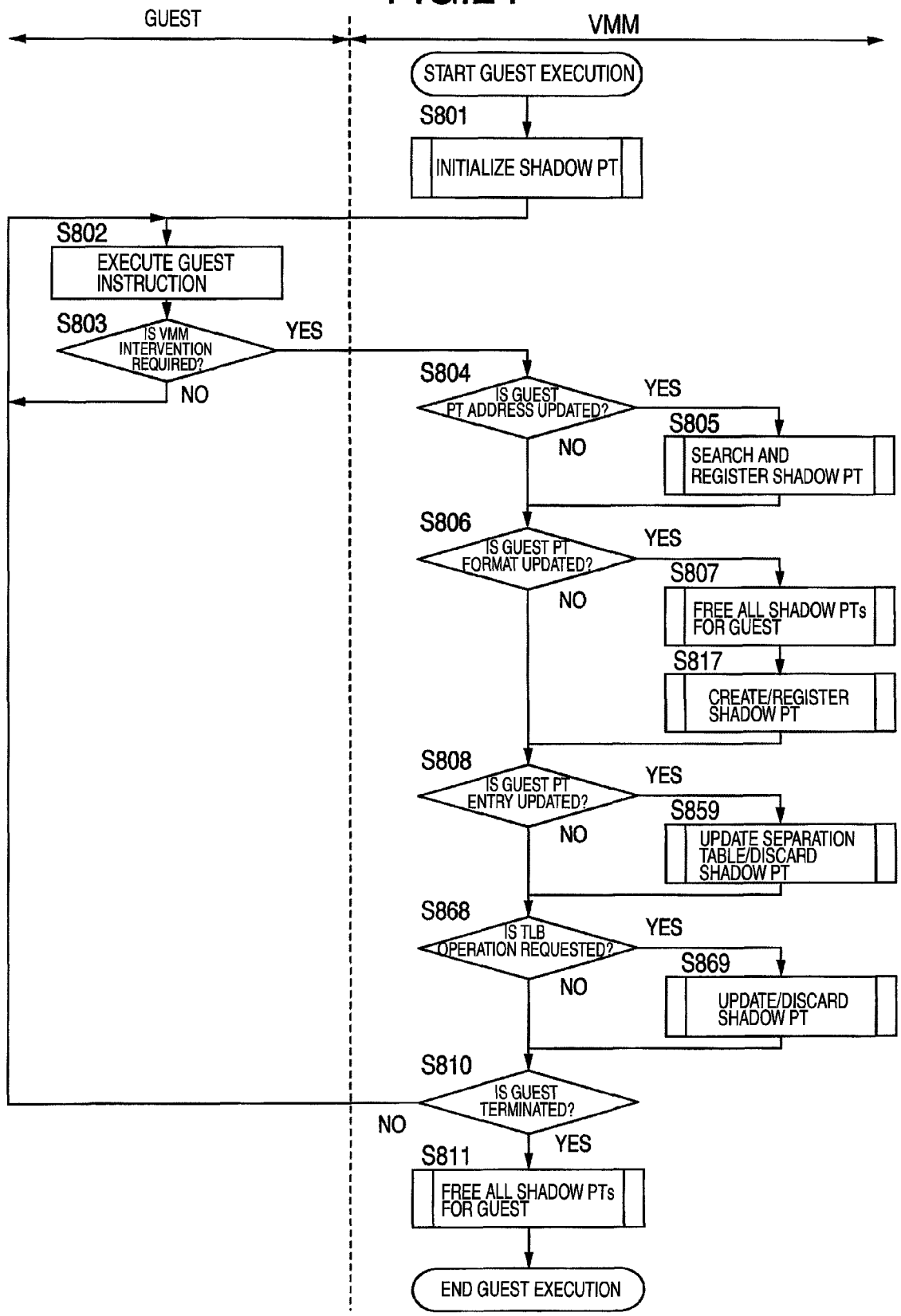
FIG. 24 is a flowchart showing an outline of actions of a guest and of a shadow PT operation performed by VMM in embodiment 5 and 7.

FIG. 24 is a flowchart showing overall processing when a guest is executed on the VMM, with the processing on the right side of a dashed line performed by the VMM and the processing on the left side performed by the guest. Of these processing, an operation performed following the detection of update of the guest PT entry and an operation following the detection of the TLB operation request differ from the embodiment 1.

In response to the guest PT entry update request from the guest, step 859 updates the guest PT entry of interest if the guest PT to be updated is referenced by the PT pointer register (60-v) of the virtual CPU (10-v), and then records the associated PT entry number in the corresponding separation table 557. If the guest PT 70 to be updated is not referenced by the PT pointer register (60-v) of the virtual CPU (10-v), the step S859 frees a shadow PT 80 corresponding to the guest PT 70 to be updated.

Step S868 detects a TLB operation request from the guest (to load the content of the guest PT entry into the TLB 50). The method of detection will be explained below. The TLB operation includes two operations: an execution of a TLB operation instruction and an execution of a memory access instruction using a shadow PT entry not loaded in the TLB 50. Since the execution of the TLB operation instruction requires a privilege, the method of detecting the execution of the TLB operation instruction involves running the guest at a non-privileged level and utilizing an exception that occurs when the guest running at the non-privileged level writes into the PT format register, a privileged register. The detection of execution of the memory access instruction that uses a shadow PT entry not loaded in the TLB 50 sets the P bit in the shadow PT entry not loaded in the TLB 50 to 0 and uses an exception that occurs when the shadow PT entry is loaded into the TLB 50.

Step S869 searches through the separation table 557 corresponding to the guest PT 70 to be operated to find an entry number of the guest PT entry. If the guest PT entry to be operated is separated, step S869 makes the setting again for the shadow PT entry, deletes the PT entry number from the separation table 557, and loads the content of the shadow PT entry into the TLB 50. If the PT entry to be operated is synchronized (not separated), the content of the shadow PT entry is simply loaded into the TLB 50.

<3.2. Initialization of Shadow PT>

An initialization of shadow PT is the same as in the embodiment 1, as shown in FIG. 11.

<3.3. Search and Registration of Shadow PT>

The shadow PT search and registration is as shown in the flowchart of FIG. 1 and thus basically the same as that of the embodiment 1. It is noted, however, that this process in the embodiment 5 differs from the embodiment 1 in that the memory securing step S103 also includes securing a memory for holding the separation table 557.

<3.4. Generation of Shadow PT>

The process of generating a shadow PT as performed in S107 of FIG. 1 and S902 of FIG. 11 will be explained by referring to FIG. 25. The flow of operation in FIG. 25 differs from the embodiment 1 in S1311 and S1312, both generating a shadow PT entry. Step S1311 registers all PT entry numbers with the separation table 557. Step S1312 disables all entries in the shadow PT 80 (by setting P bit to 0).

<3.5. Freeing Shadow PT>

The process of freeing a shadow PT is as shown in the flowchart of FIG. 13 and thus the same as that of the embodiment 1. It is noted, however, that step S1404 frees the memory area used by the shadow PT 80 to be freed and the separation table 557 to make the memory area available for reuse in holding the shadow PT for the guest.

<3.6. Updating of Shadow PT Entry>

In this embodiment, the updating of a shadow PT entry involves two operations: updating the separation table 557 in response to the updating of a guest PT entry and updating the shadow PT entry in response to the TLB operation request.

The process of updating the separation table 557 as performed by S859 in FIG. 24 will be explained by referring to FIG. 26. Step S2101 identifies a shadow PT 80 corresponding to the guest PT 70 to be updated. Step S2102 checks if the identified shadow PT 80 is registered with the CPU 10, i.e., if an address of the shadow PT is held in the PT pointer register 60. If so, the processing moves to step S2105. If not, the processing moves to S2111. Step S2105 registers a PT entry number of the guest PT entry to be updated with the separation table corresponding to the guest PT 70 to be updated. Step S2106 updates the guest PT entry of interest according to the request from the guest. This process is done by the VMM 20 because the guest PT entry is write-protected from the guest and only the VMM 20 can perform the updating. Step S2111 frees the identified shadow PT 80 and the separation table 557 and deletes the entry of interest from the PT correspondence table 511.

Figure 27:
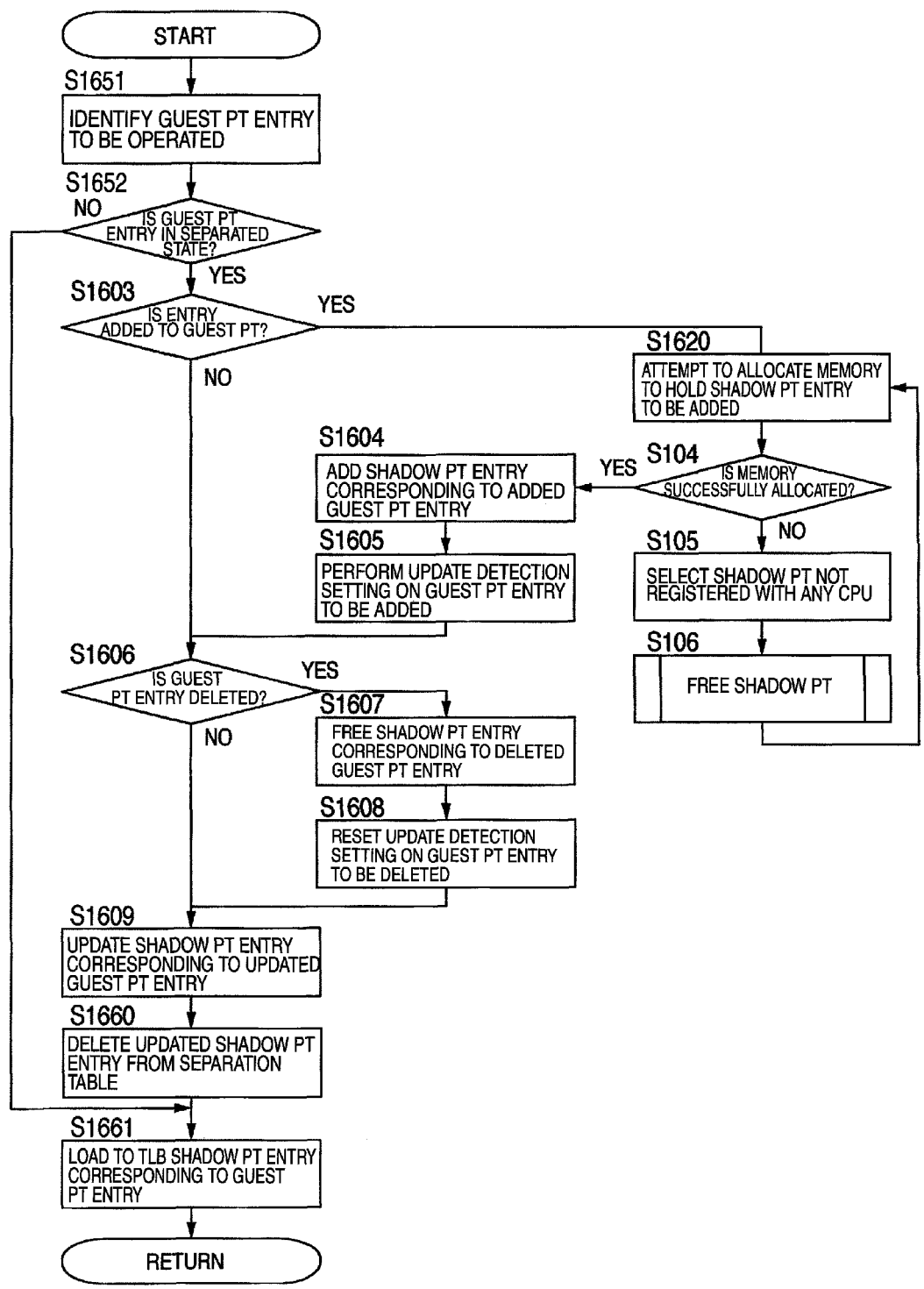
FIG. 27 is a flowchart showing a shadow PT entry updating operation in embodiment 5, 6, 7 and 8.

The updating of the shadow PT entry as performed by S869 of FIG. 24 will be explained by referring to FIG. 27. FIG. 27 is the same as FIG. 14 of the embodiment 1 except for steps S1651 and S1652, both preprocessing for the shadow PT updating, and steps S1660 and S1661, both post-processing for the shadow PT updating. So, only these differences will be explained. In FIG. 27, steps S1610 and S1611 are not provided. Step S1651 identifies a guest PT entry to be TLB-operated and also identifies a shadow PT entry corresponding to that guest PT entry. Step S1652 checks if the guest PT entry to be TLB-operated is registered with the separation table 557 and, only if it is found registered, moves to step S1603 to update the shadow PT. If the guest PT entry is found not registered, the processing moves to S1661. Step S1660, upon completion of the updating of the shadow PT entry, deletes the PT entry number from the separation table 557. Step S1661 loads the content of the shadow PT entry into the TLB 50 and has the CPU 10 perform the address conversion necessary for the execution of the guest.

<4. Conclusion>

With the above embodiment 5, the speed of the guest PT address updating can be enhanced by limiting the setting of the shadow PT entry to the minimum required level.

Embodiment 6

Embodiment 6 is implemented by modifying the embodiment 5 to enable the shadow PT management unit to hold a plurality of shadow PTs of different PT formats. Referring to the accompanying drawings, this embodiment will be explained as follows centering on differences from the embodiment 5.

<1. Hardware Configuration>

A hardware configuration of this embodiment is as shown in FIG. 4 and thus identical to that of the embodiment 5.

<2. Software Configuration>

A software configuration of this embodiment differs from that of the embodiment 5 only in the structure of the PT correspondence table 511. That is, precisely as in the embodiment 2 which is implemented by modifying the embodiment 1 to enable the shadow PT management unit to hold a plurality of shadow PTs of different PT formats, the PT correspondence table 511 of the embodiment 6 has the structure of FIG. 15.

<3. Shadow PT Operation by VMM>

Next, an example of how the VMM operates a shadow PT in accordance with the action of a guest in the embodiment 6 will be described by referring to a flowchart.

<3.1. Overview of Shadow PT Operation by VMM>

Figure 28:
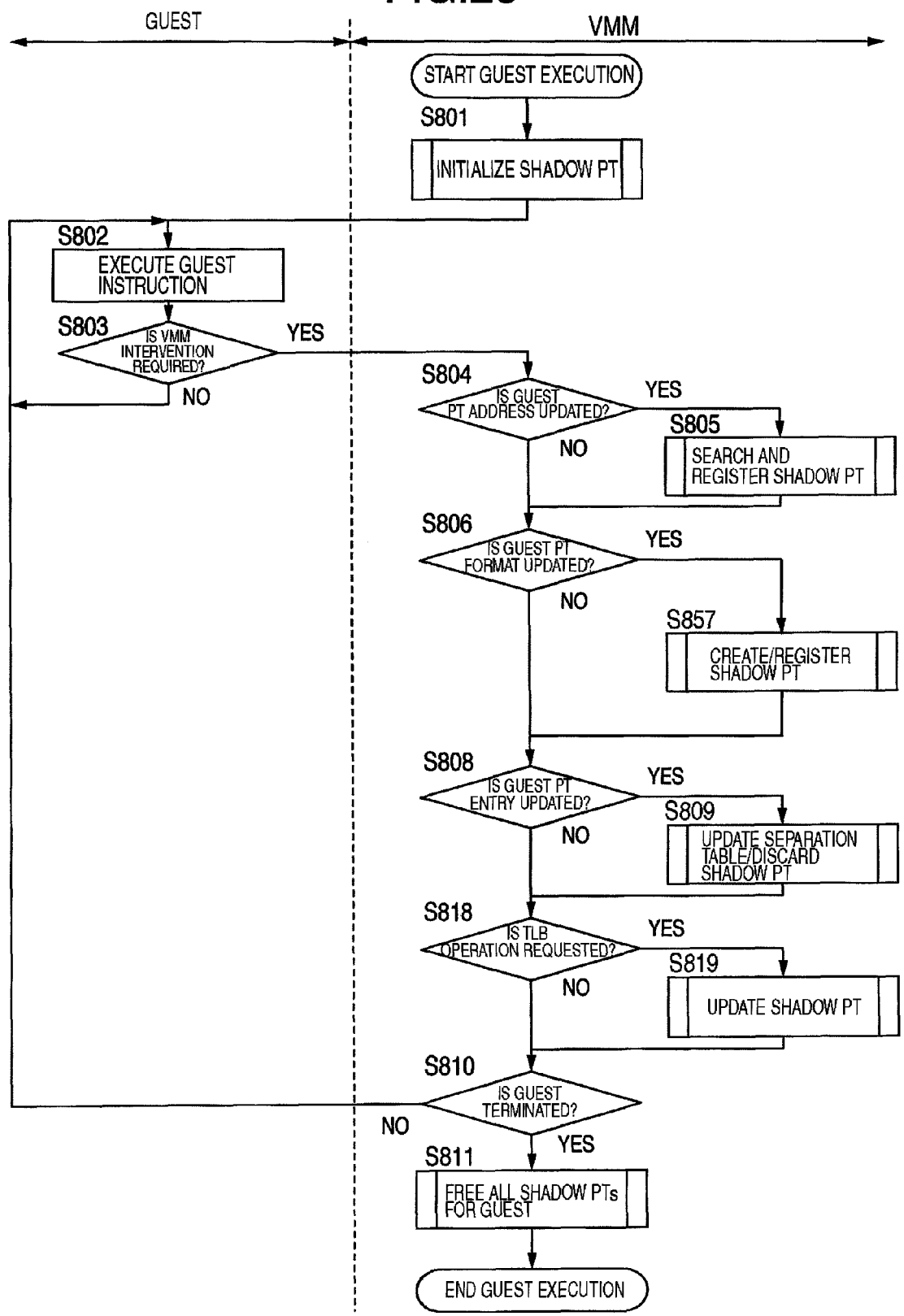
FIG. 28 is a flowchart showing an outline of actions of a guest and of a shadow PT operation performed by VMM in embodiment 6.

FIG. 28 is a flowchart showing overall processing when a guest is executed on the VMM 20, with the right side of a dashed line representing operations performed by the VMM 20 and the left side representing operations performed by the guest.

The flow in FIG. 28 differs from the embodiment 5 in only the operation following the detection of update of the guest PT format. When the guest PT format update is found, the processing proceeds to S857.

Upon receiving the guest PT format change request, step S857 searches through the PT correspondence table 511 of the VMM 20 for a shadow PT 80 corresponding to the changed guest PT 70. If the target shadow PT 80 exists, an address of the shadow PT 80 is registered with the PT pointer register 60. If the target shadow PT 80 is not found, step S857 generates a shadow PT 80 corresponding to the changed guest PT 70, records a relation between the generated shadow PT 80 and the changed guest PT 70 in the PT correspondence table

511, and registers an address of the generated shadow PT 80 with the PT pointer register 60.

<3.2. Initialization of Shadow PT>

An initialization of the shadow PT is the same as that of the embodiment 5, as shown in FIG. 11.

<3.3. Search and Registration of Shadow PT>

The shadow PT search and registration performed in steps S805 and S857 of FIG. 28 is as shown in the flowchart of FIG. 17. So this operation is identical with the shadow PT search and registration of the embodiment 2 and embodiment 4.

<3.4. Generation of Shadow PT>

The generation of a shadow PT performed by S107 of FIG. 17 and S902 of FIG. 11 will be explained by referring to FIG. 29. The flow shown in FIG. 29 differs from the embodiment 1 in only step S1352 of updating the PT correspondence table 511.

Step S1352 records a correspondence between the guest PT 70 and the generated shadow PT 80 in the PT correspondence table 511. More specifically, this step sets a valid bit and records an address of the generated shadow PT and the guest PT format and an address of the guest PT. It is noted, however, that if the guest is in a PT invalid state, 0 is recorded instead of the guest PT address.

<3.5. Freeing Shadow PT>

A flowchart for freeing a shadow PT is identical with that of the embodiment 5 shown in FIG. 13. However, there is some difference in step S1401, which will be explained as follows.

Step S1401 determines whether the shadow PT to be freed is the one for a PT valid state and, if so, moves to S1405. This decision is made by referring to a PT format identifier recorded in the PT correspondence table 511.

<3.6. Updating of Shadow PT Entry>

Figure 26:
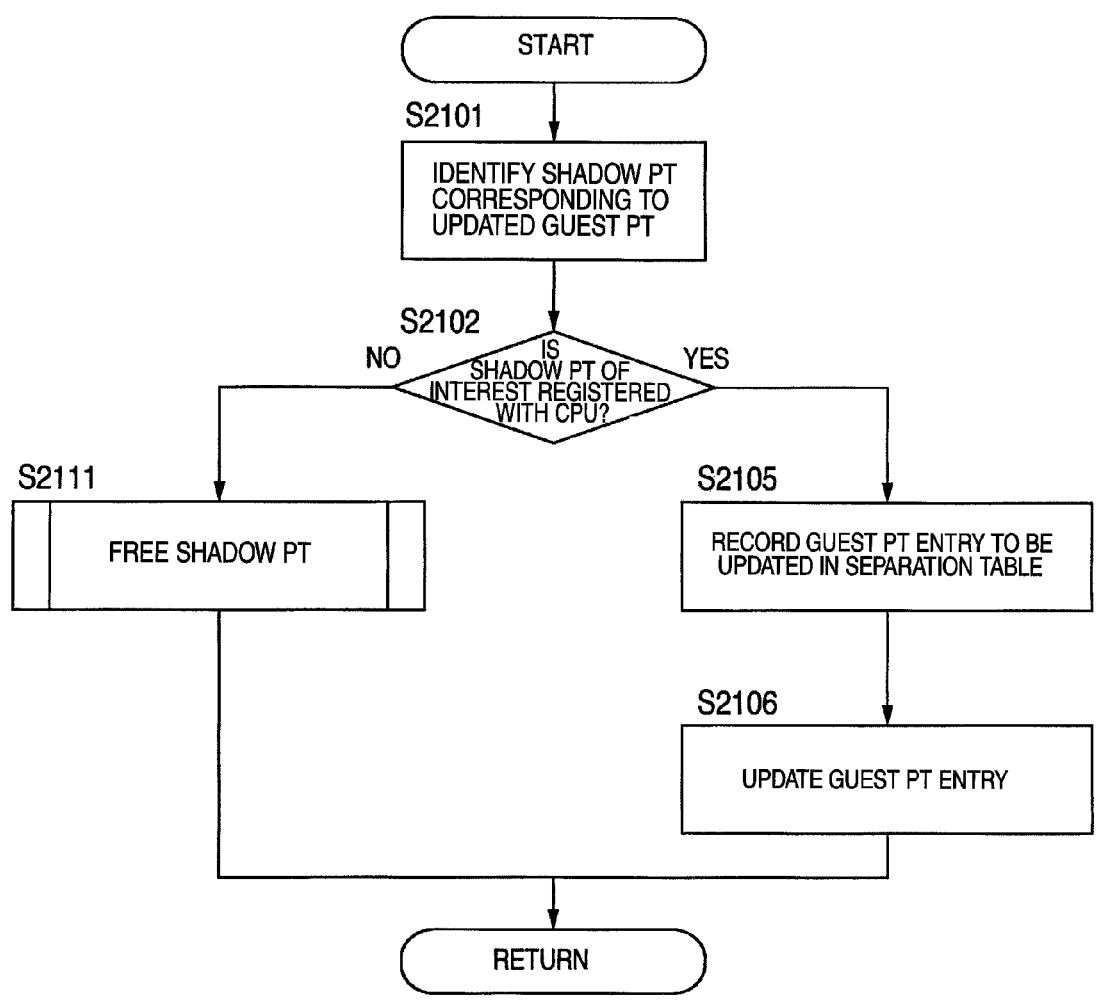
FIG. 26 is a flowchart showing an operation of updating a separation table that holds a state of separation between the content of a shadow PT entry and the content of a guest PT entry in embodiment 5, 6, 7, 8 and 10.

A process of updating a shadow PT entry is identical with that of the embodiment 5, as shown in FIG. 26 and FIG. 27.

<4. Conclusion>

With the above embodiment, since the generated shadow PT can be reused even when the guest PT format is changed and since the setting of the shadow PT entry can be limited to the minimum required level, the updating of the guest PT address can be speeded up.

Embodiment 7

Embodiment 7 is implemented by modifying the embodiment 5 and applying it to a CPU having a PT correspondence table. As the CPU having the PT correspondence table, one that supports a VT-x (Intel Virtualization Technology for IA-32 Processors) function is used.

<1. Hardware Configuration>

The hardware configuration is as shown in FIG. 4. That is, although the configuration is the same as that of the embodiment 5, the CPU 10 is limited to the one that supports the VT-x function.

<2. Software Configuration>

Since the VT-x function enables a part of the guest PT address update operation to be executed by the CPU 10, the software configuration differs from the embodiment 5 in only a module associated with the guest PT address updating.

The guest PT address updating will be explained by referring to FIG. 30. The CPU that supports the VT-x function has a 4-entry PT correspondence table 613. It also has a shadow PT correspondence decision support unit 612 that searches for a shadow PT 80 corresponding to the guest PT 70 by using this PT correspondence table 613.

When a guest issues a guest PT address update request 502, the shadow PT correspondence decision support unit 612 in the CPU 10 searches for a shadow PT 80 corresponding to the updated guest PT 70 by using the PT correspondence table 613 in the CPU 10. If the target shadow PT 80 exists, the CPU 10 sets an address of the shadow PT 80 in the PT pointer register 60. If the target shadow PT does not exist, the CPU 10 notifies the shadow PT correspondence decision unit 510 in the VMM 20 of the guest PT address update request 502 and leaves the subsequent processing to the VMM 20. Upon receipt of the request, the VMM 20, as in the embodiment 5, performs search, generation and registration of the shadow PT 80 corresponding to the updated guest PT 70.

<3. Shadow PT Operation by VMM>

Next, an example of how the VMM operates a shadow PT in accordance with the action of a guest will be described centering on differences from the embodiment 5, by referring to a flowchart.

<3.1. Overview of Shadow PT Operation by VMM>

The outline of a shadow PT operation is as shown in FIG. 24 and thus identical with the embodiment 5.

<3.2. Initialization of Shadow PT>

The initialization of shadow PT is as shown in FIG. 11 and identical with the embodiment 5.

<3.3. Search and Registration of Shadow PT>

The shadow PT search and registration is as shown in FIG. 1 and identical with the embodiment 5.

<3.4. Generation of Shadow PT>

Figure 25:
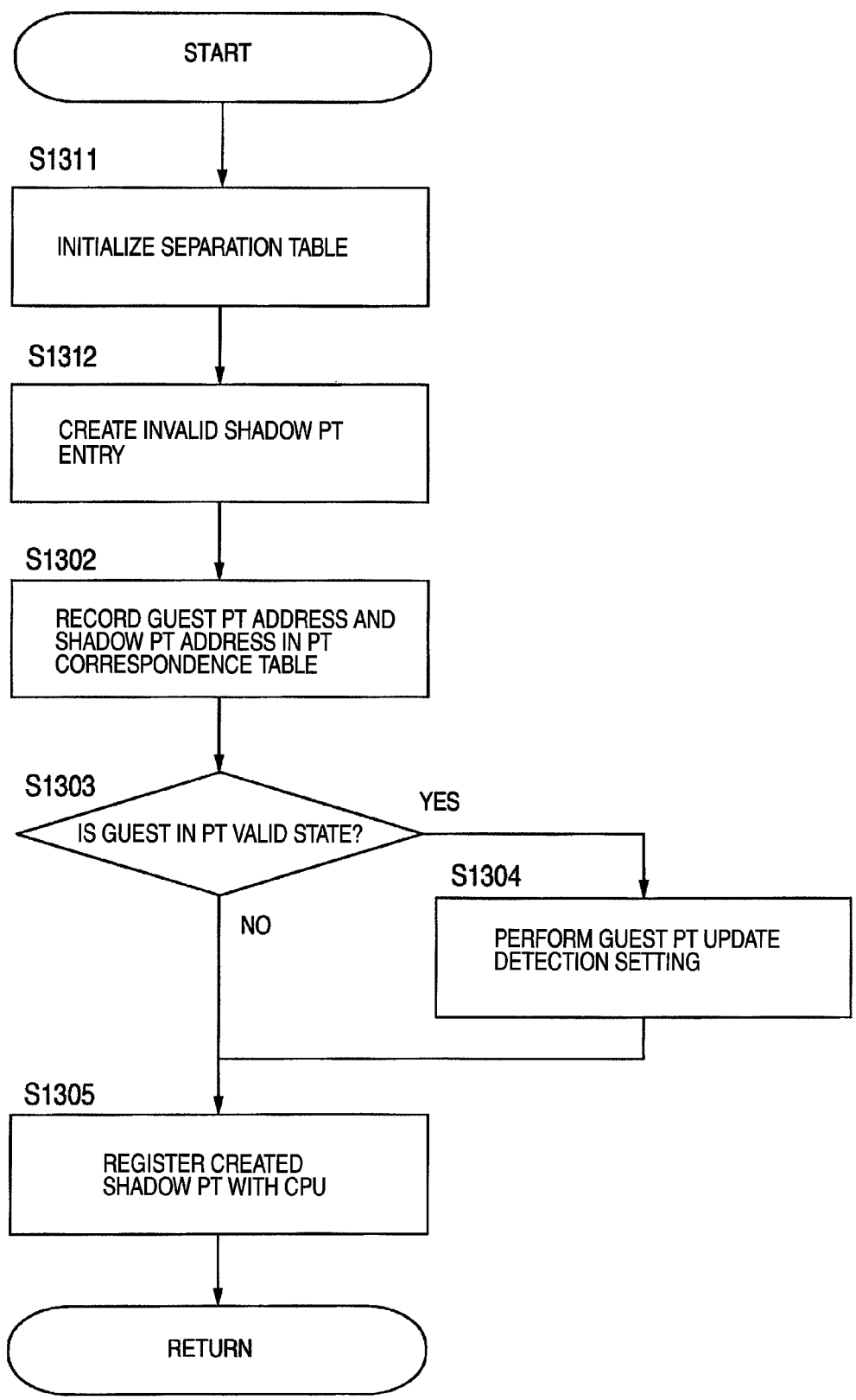
FIG. 25 is a flowchart showing a shadow PT creation operation in embodiment 5 and 7.

A process of generating a shadow PT is as shown in a flowchart of FIG. 25 and identical with the embodiment 5. It is noted, however, that there is some difference in step S1302. This is exactly the same as in the embodiment 3 that applies the CPU supporting the VT-x function. So, its explanation is omitted.

<3.5. Freeing Shadow PT>

A process of freeing a shadow PT is as shown in a flowchart of FIG. 13 and identical with the embodiment 1. It is noted, however, that there is some difference in step S1403, which will be explained below.

Step S1403 disables entries in the PT correspondence table 511 of the VMM and in the PT correspondence table 613 of the CPU 10 that hold an address of the shadow PT to be freed, thus preventing the freed shadow PT 80 from being used again.

<3.6. Updating of Shadow PT Entry>

A process of updating a shadow PT entry is as shown in FIG. 26 and FIG. 27 and identical with the embodiment 5.

<4. Conclusion>

With the above embodiment, the updating of the guest PT address can be speeded up since the VT-x function can be used and the setting of the shadow PT entry can be limited to the minimum required level.

Embodiment 8

Embodiment 8 is implemented by modifying the embodiment 6 and applied to a CPU having a PT correspondence table. As the CPU having the PT correspondence table, one that supports a VT-x (Intel Virtualization Technology for IA-32 Processors) function is used. The CPU supporting the VT-x function has a PT correspondence table shown in FIG. 18 that does not have a field of PT format.

<1. Hardware Configuration>

The hardware configuration is as shown in FIG. 4. That is, although the configuration is the same as that of the embodiment 6, the CPU 10 is limited to the one that supports the VT-x function.

<2. Software Configuration>

Figure 30:
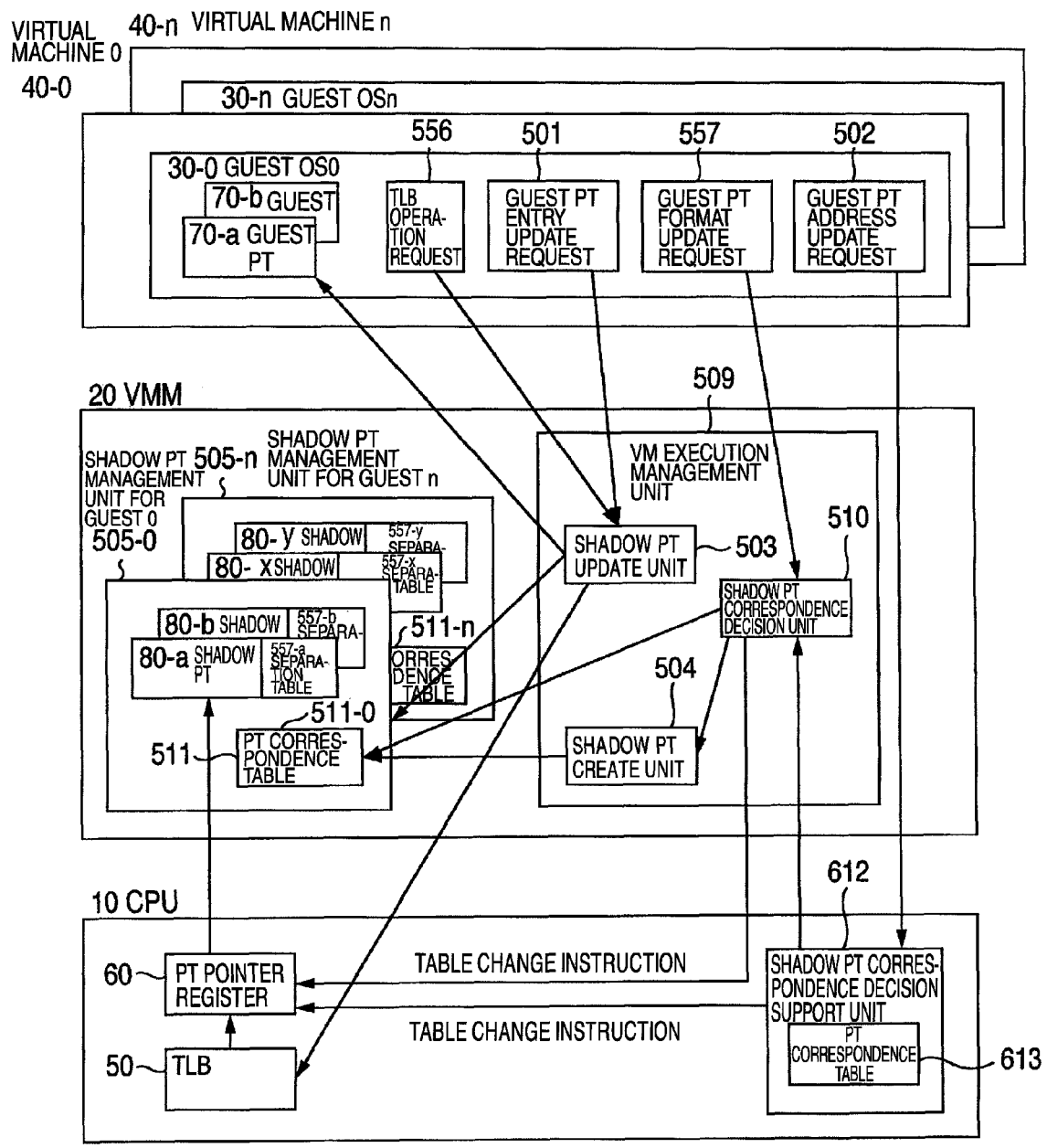
FIG. 30 is a block diagram showing essential portions of software and hardware of the virtual machine system in embodiment 7 and 8.

Because of the application of the CPU supporting the VT-x function, only a module associated with the guest PT address update operation is modified as shown in FIG. 30, as in the case with the embodiment 7.

<3. Shadow PT Operation by VMM>

Next, an example of how the VMM operates a shadow PT in accordance with the action of a guest will be described centering on differences from the embodiment 6, by referring to a flowchart.

<3.1. Overview of Shadow PT Operation by VMM>

Figure 31:
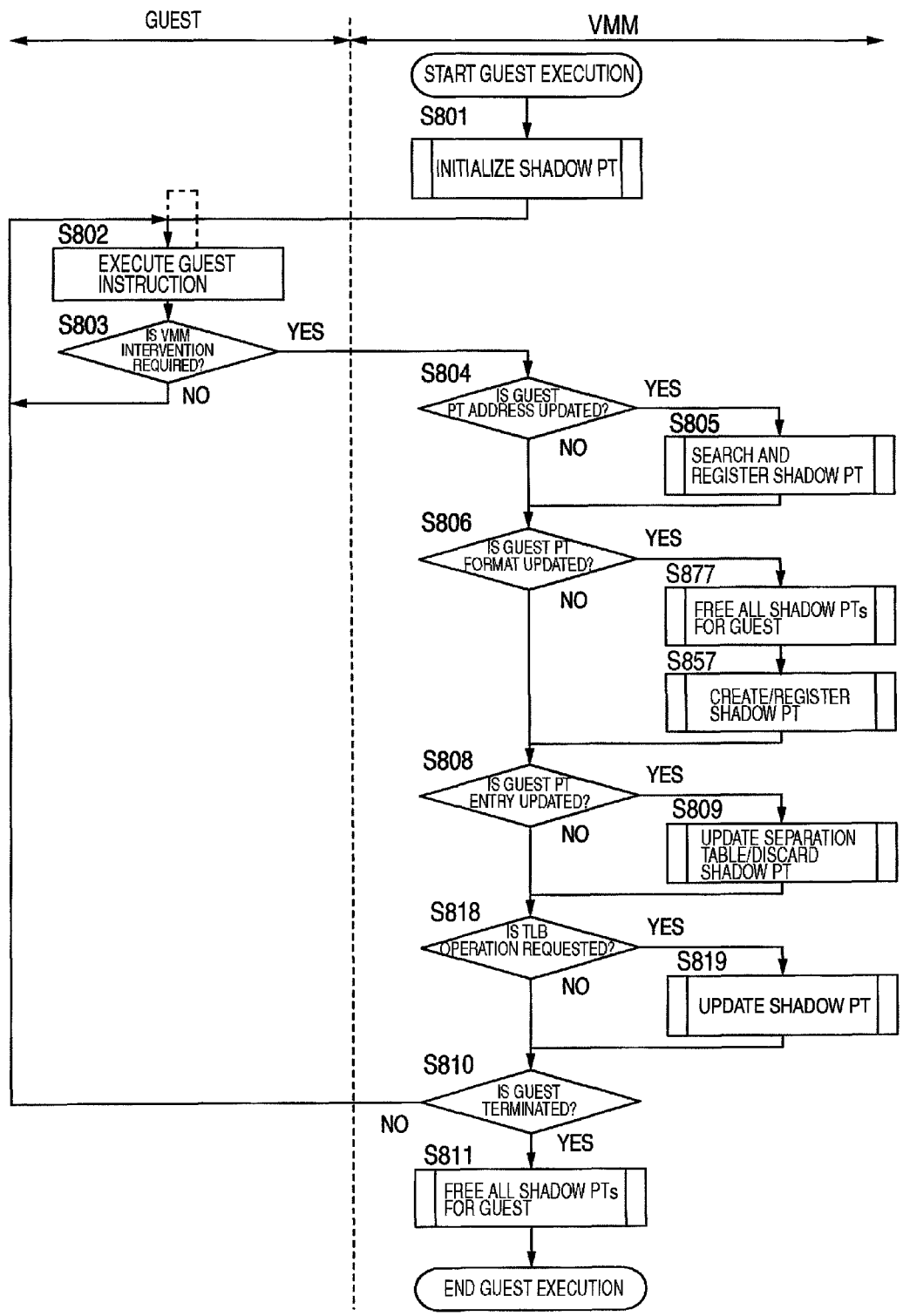
FIG. 31 is a flowchart showing an outline of actions of a guest and of a shadow PT operation performed by VMM in embodiment 8.

FIG. 31 is a flowchart showing overall processing when a guest is executed on the VMM, with the right side of a dashed line representing the operation performed by the VMM and the left side representing the operation by the guest.

The flow shown in FIG. 31 differs from the embodiment 6 in only the operation performed following the detection of an update of the guest PT format. When the update of a guest PT format is detected, the processing moves to step S877. Step S877 disables or invalidates all entries in the PT correspondence table 613 of the CPU 10. This invalidation operation is performed to prevent the CPU 10 from erroneously reusing a shadow PT 80 of different PT format. After S877, the processing moves to S857, as in the embodiment 6.

<3.2. Initialization of Shadow PT>

The initialization of shadow PT is as shown in FIG. 11 and identical with that of the embodiment 6.

<3.3. Search and Registration of Shadow PT>

The shadow PT search and registration is as shown in FIG. 17 and identical with the embodiment 6.

<3.4. Generation of Shadow PT>

Figure 29:
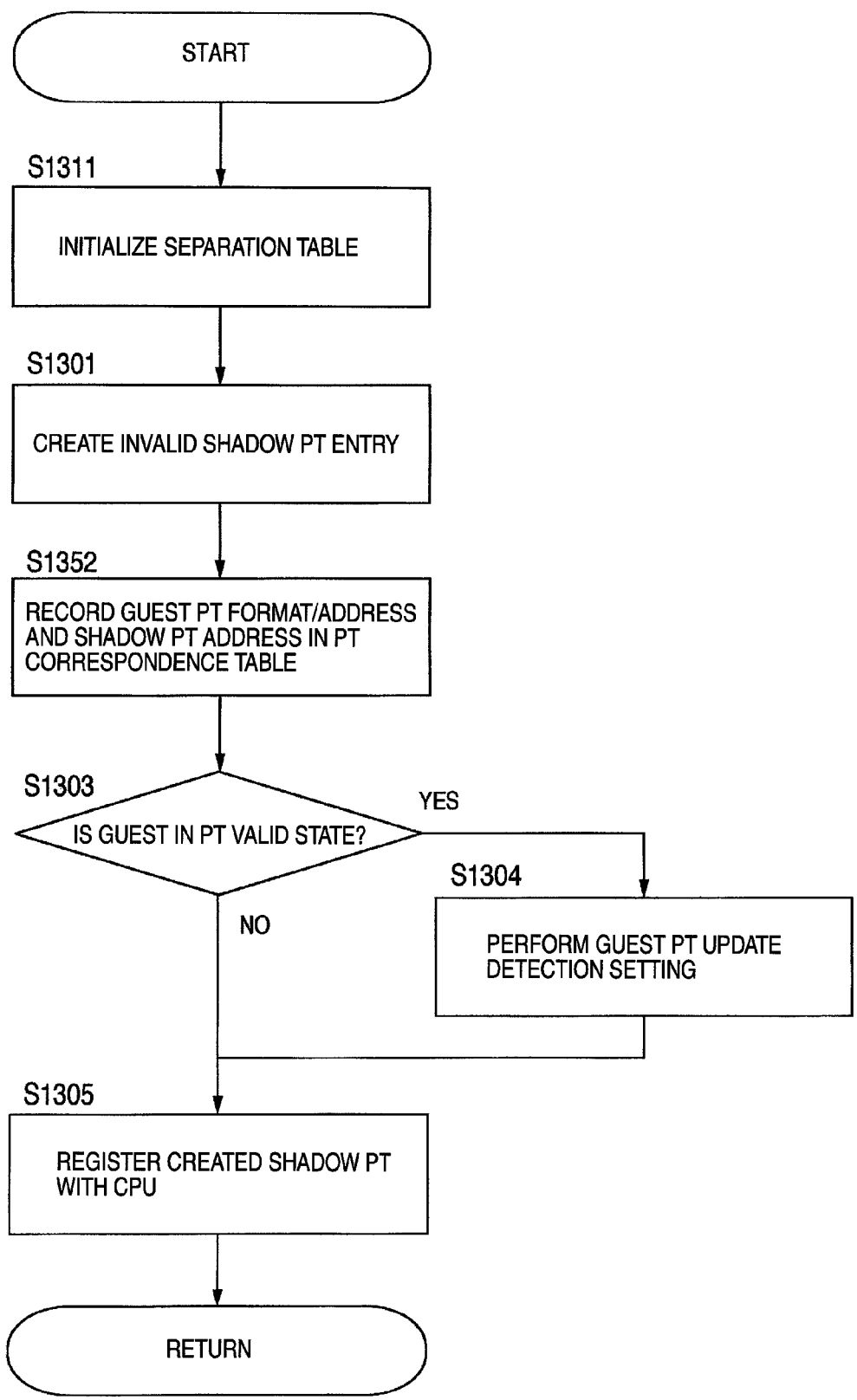
FIG. 29 is a flowchart showing a shadow PT creation operation in embodiment 6 and 8.

A process of generating a shadow PT is as shown in a flowchart of FIG. 29 and is the same as in the embodiment 6. It is noted, however, that there is some difference in step S1302, as in the case with the embodiment 3 and embodiment 7.

<3.5. Freeing Shadow PT>

A process of freeing a shadow PT is as shown in a flowchart of FIG. 13 and is the same as in the embodiment 6. It is noted, however, that there is some difference in step S1403. This is the same as in the preceding embodiment and its explanation will be omitted.

<3.6. Updating of Shadow PT Entry>

A process of updating a shadow PT entry is as shown in FIG. 26 and FIG. 27 and is the same as in the embodiment 6.

<4. Conclusion>

With this embodiment, the process of updating a guest PT address can be speeded up even when the guest PT format is changed, by reusing the generated shadow PT, by using the VT-x function and by limiting the shadow PT entry setting to a minimum required level.

Embodiment 9

Embodiment 9 is implemented by modifying the embodiment 1 and applied to an IPF (Itanium Processor Family) CPU.

<1. Hardware Configuration>

A hardware configuration of the embodiment 9 is as shown in FIG. 4 and therefore the same as that of the embodiment 1. It is noted, however, that the CPU 10 is limited to IPF.

<2. Software Configuration>

Since IPF uses a PT different from that used in IA-32 (or Intel(R)64), the software configuration differs from the embodiment 1 in the guest/shadow PT format and in the structure of the PT correspondence table.

Figure 32:
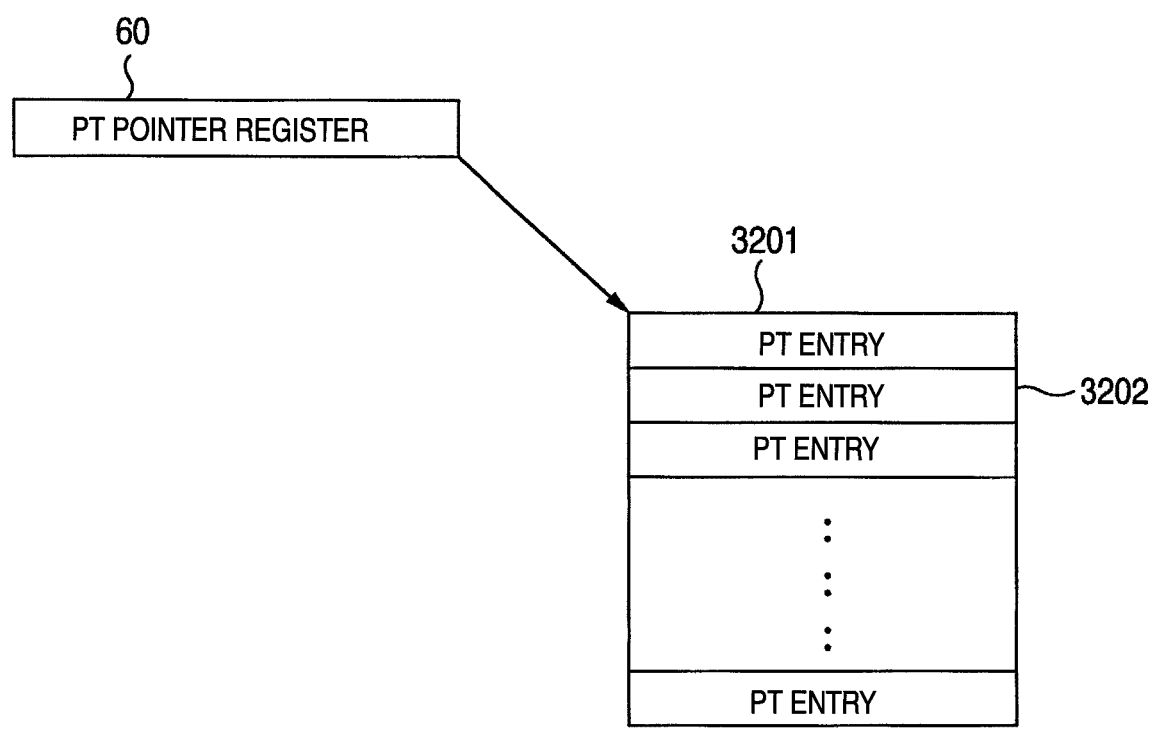
FIG. 32 is a block diagram showing a PT structure of IPF.

The shadow PT 80 and the guest PT 70 are identical in their structure and, if the CPU 10 is IPF, they have a structure shown in FIG. 32. PT3201 is composed of a series of PT entries 3202, with the PT pointer register 60 holding a start address of the PT3201. Each PT entry 3202 has address translation information for physical memory address. When retrieving address translation information from the PT 3201, the CPU 10 performs a hash calculation using a virtual address, identifies a PT entry number to be referenced, and reads information recorded in that entry.

Figures 33, 34:
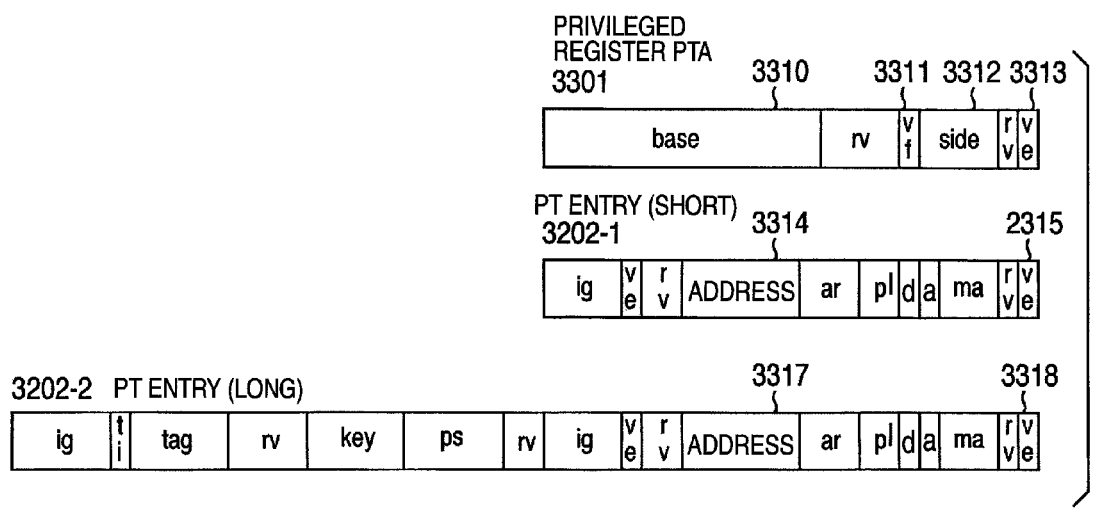
FIG. 33 illustrates a PT entry format of IPF.
FIG. 34 illustrates a structure of a PT correspondence table showing a correspondence between a guest PT and a show PT in embodiment 9 and 10.

Regarding the PT of IPF, a format of a privileged register PTA (Page Table Address) defining the PT format and a format of the PT entry are shown in FIG. 33.

The PTA has a base field 3310, a vf field 3311, a size field 3312 and a ve field 3313. The base field 3310 holds a start address of the PT and is equivalent to the PT pointer register 60. The vf field 3311 specifies one of two PT entry formats supported by the IPF. The IPF applies the same format to all PT entries in the PT. The size field 3312 defines the size of the PT. The ve field 3313 defines a validity of the PT.

There are two kinds of PT entry format: a short 3202-1 and a long 3202-2. Both of them have an address field (3314, 3317) to hold a physical memory address and a p field (3315, 3318) to specify a valid/invalid state of the entry.

The structure of the PT correspondence table 511 defining the correspondence between the guest PT 70 and the shadow PT 80 is shown in FIG. 34. Since the address and format of a PT are uniquely identified by only the PTA, the IPF uses a PTA set value in identifying the guest PT and the shadow PT. In each entry of the PT correspondence table 511 are recorded a valid bit 3401, a guest PTA set value 3403 and a PTA (PTA set value 3404 of a shadow PT) that the VMM 20 sets in a physical machine. When a guest updates a guest PTA, the VMM 20 searches through the PT correspondence table 511 for a PTA set value 3404 of a shadow PT corresponding to the updated guest PTA set value 3403.

Since the PTA set value includes a PT address, the operation of searching for a shadow PT by using a PTA set value includes a step of comparing the PT addresses for matching.

<3. Shadow PT Operation by VMM>

Next, an example of how the VMM operates a shadow PT in accordance with the action of a guest will be described centering on differences from the embodiment 1 by referring to a flowchart.

<3.1. Overview of Shadow PT Operation by VMM>

Figure 35:
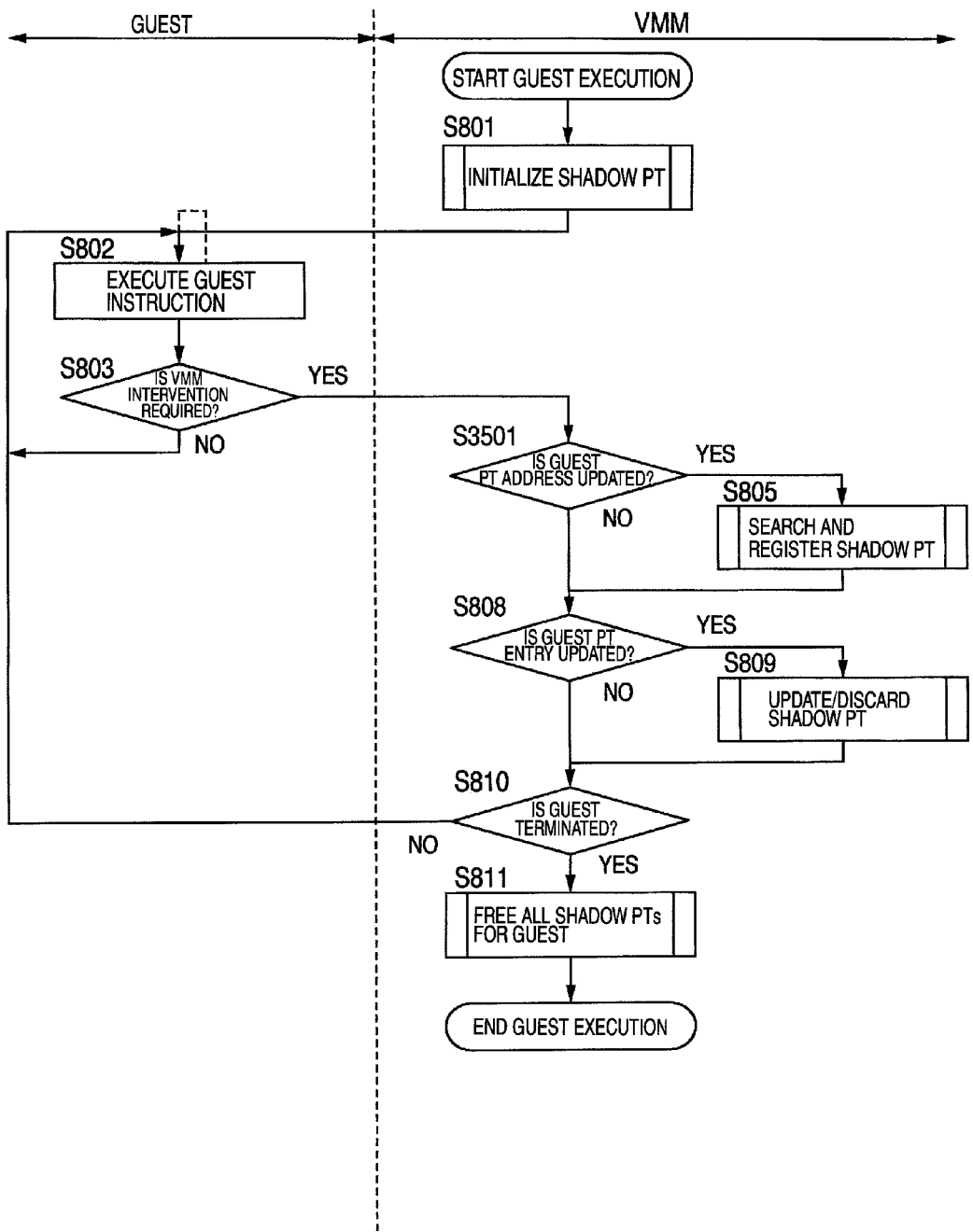
FIG. 35 is a flowchart showing an outline of actions of a guest and of a shadow PT operation performed by VMM in embodiment 9.

FIG. 35 is a flowchart showing overall processing when a guest is executed on the VMM 20, with the processing on the right side of a dashed line performed by the VMM 20 and the processing on the left side performed by the guest.

The flow in FIG. 35 differs from the embodiment 1 in the detection of update of a guest PT format and a guest PT address and in subsequent operations.

Step S3501 checks if the guest PTA is updated. Since in IPF the guest PT format and the guest PT address are held in the guest PTA, this step can check for changes in the guest PTA format and guest PT address at once. If the guest PTA is updated, the processing moves to step S805. If not, it moves to S808.

Step S805, upon receiving a guest PTA change request, searches through the PT correspondence table 511 for a shadow PT 80 corresponding to the changed guest PT 70. If there is the target shadow PT 80, an address of the shadow PT 80 is registered with the PT pointer register 60. If the target shadow PT 80 does not exist, the VMM generates a shadow PT 80 corresponding to the changed guest PT 70, records a relation between the generated shadow PT 80 and the changed guest PT 70 in the PT correspondence table 511, and registers an address of the generated shadow PT 80 with the PT pointer register 60.

<3.2. Initialization of Shadow PT>

An initialization of shadow PT is as shown in FIG. 11 and identical with the embodiment 1

The shadow PT search and registration as performed by S805 in FIG. 35 will be explained by referring to FIG. 36. The flow in FIG. 36 differs from the embodiment 1 in only S3601 immediately after the start of the flowchart.

Step S3601, in response to the update of the guest PTA, searches through the PT correspondence table 511 for a valid entry containing the updated guest PTA set value. If the entry of interest is found, the processing moves to step S109, as in the embodiment 1, where it registers the shadow PT corresponding to the updated guest PT with the CPU. If the entry of interest does not exist, the processing moves to step S103, as in the embodiment 1, where it generates and registers a shadow PT.

<3.4. Generation of Shadow PT>

The generation of a shadow PT as performed by S107 of FIG. 36 and S902 of FIG. 11 will be explained by referring to FIG. 37. The flow in FIG. 37 differs from the embodiment 1 in only step S3702 of updating the PT correspondence table 511.

Step S3702 records a correspondence between the guest PT 70 and the generated shadow PT 80 in the PT correspondence table 511. More specifically, it sets a valid bit and records a PTA set value for the generated shadow PT and a guest PTA set value. If the guest is in a PT invalid state, the step S3702 changes the base field of the guest PTA set value to 0 before recording the set values.

<3.5. Freeing Shadow PT>

The process of freeing a shadow PT is as shown in FIG. 13 and identical with the embodiment 1.

<3.6. Updating of Shadow PT Entry>

Figure 38:
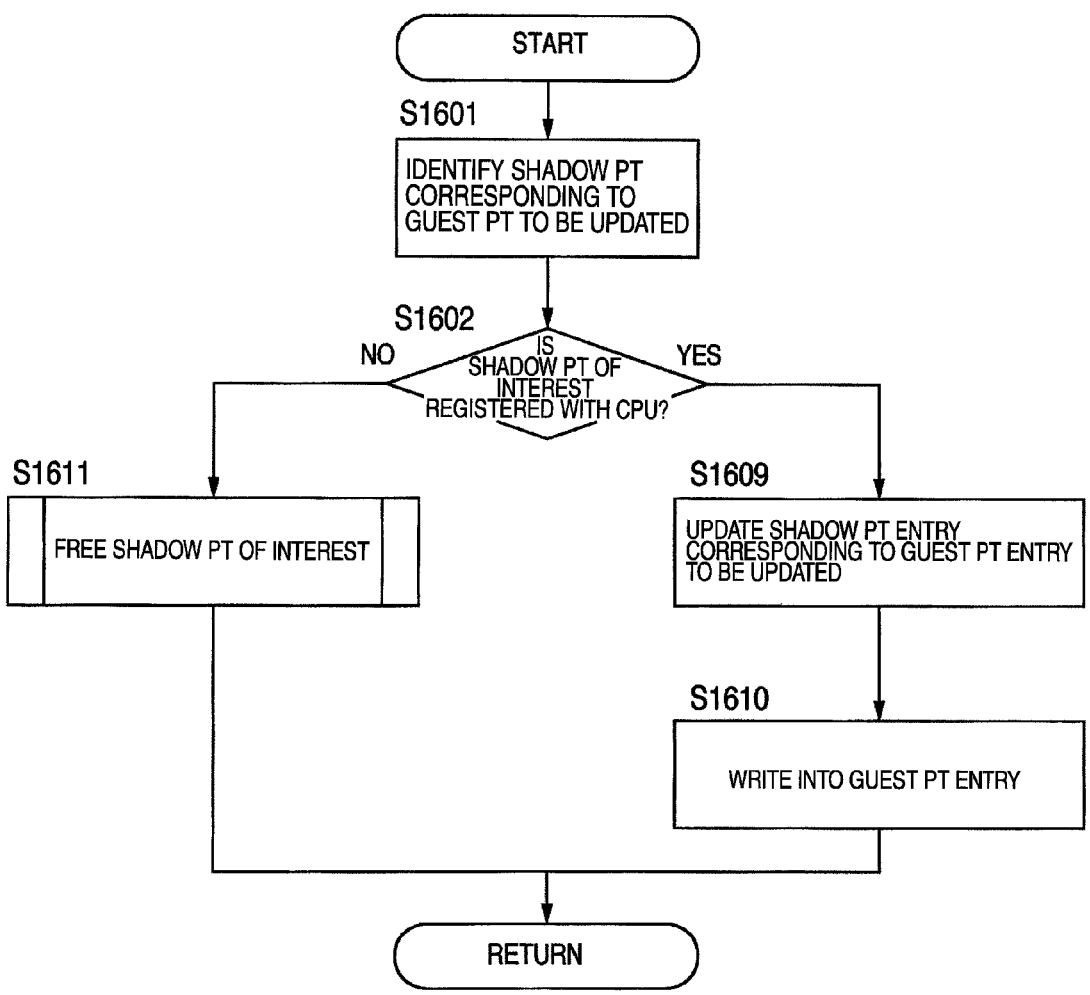
FIG. 38 is a flowchart showing a shadow PT entry update operation in embodiment 9.

The updating of a shadow PT entry as performed by step S809 in FIG. 35 will be explained by referring to FIG. 38. The flow in FIG. 38 is the same as in the embodiment 1, except that an operation is not provided which increases or decreases the number of shadow PT entries according to an increase or decrease in the number of guest PT entries. The reason that the increase/decrease operation is not required is that the PT of IPF is composed of only 1-tier tables rather than multi-tier tables.

In this flowchart, when an update is detected for the guest PT entry corresponding to the shadow PT being used in S1602, the processing moves to S1609.

<4. Conclusion>

Where the guest PT is used repetitively, the above embodiment allows the setting operation of the shadow PT to be omitted by reusing the generated shadow PT even if the CPU is IPF. Generally, the switching of the guest PTs is mostly to those guest PTs that have been previously used, so this embodiment can greatly reduce redundancy resulting from the processing invoked by the guest PT switching, increasing the speed of the guest PT address update.

Embodiment 10

The embodiment 10 is implemented by modifying the embodiment 9 to allow the separation between the guest PT and the shadow PT in order to reduce overhead of shadow PT generation. More specifically, the embodiment 10 reduces overhead by delaying the shadow PT entry setting until it becomes necessary, thereby omitting unnecessary setting operations of shadow PT entry, as in the embodiment 5.

<1. Hardware Configuration>

A hardware configuration is as shown in FIG. 4 and identical with that of the embodiment 9.

<2. Software Configuration>

Main portions of the software configuration that realizes virtual machines VM0-VMn on a physical machine are shown in FIG. 21. The software configuration of the embodiment 10 is thus similar to that of the embodiment 5. It only differs from that of the embodiment 9 in that the shadow PT management unit 505 includes a separation table 557 and in the operations of the shadow PT generation unit 504 and the shadow PT update unit 503.

The host physical memory space managed by the VMM is as shown in FIG. 22 and exactly the same as that explained in the embodiment 5. That is, it only differs from the embodiment 9 in that the separation table 557 corresponding to each shadow PT exists in the shadow PT management unit 505. The structure of the separation table is also identical with what has been described in the embodiment 5.

<3. Shadow PT Operation by VMM>

Next, an example of how the VMM operates a shadow PT in accordance with the action of a guest will be described centering on differences from the embodiment 9, by referring to a flowchart.

<3.1. Overview of Shadow PT Operation by VMM>

Figure 39:
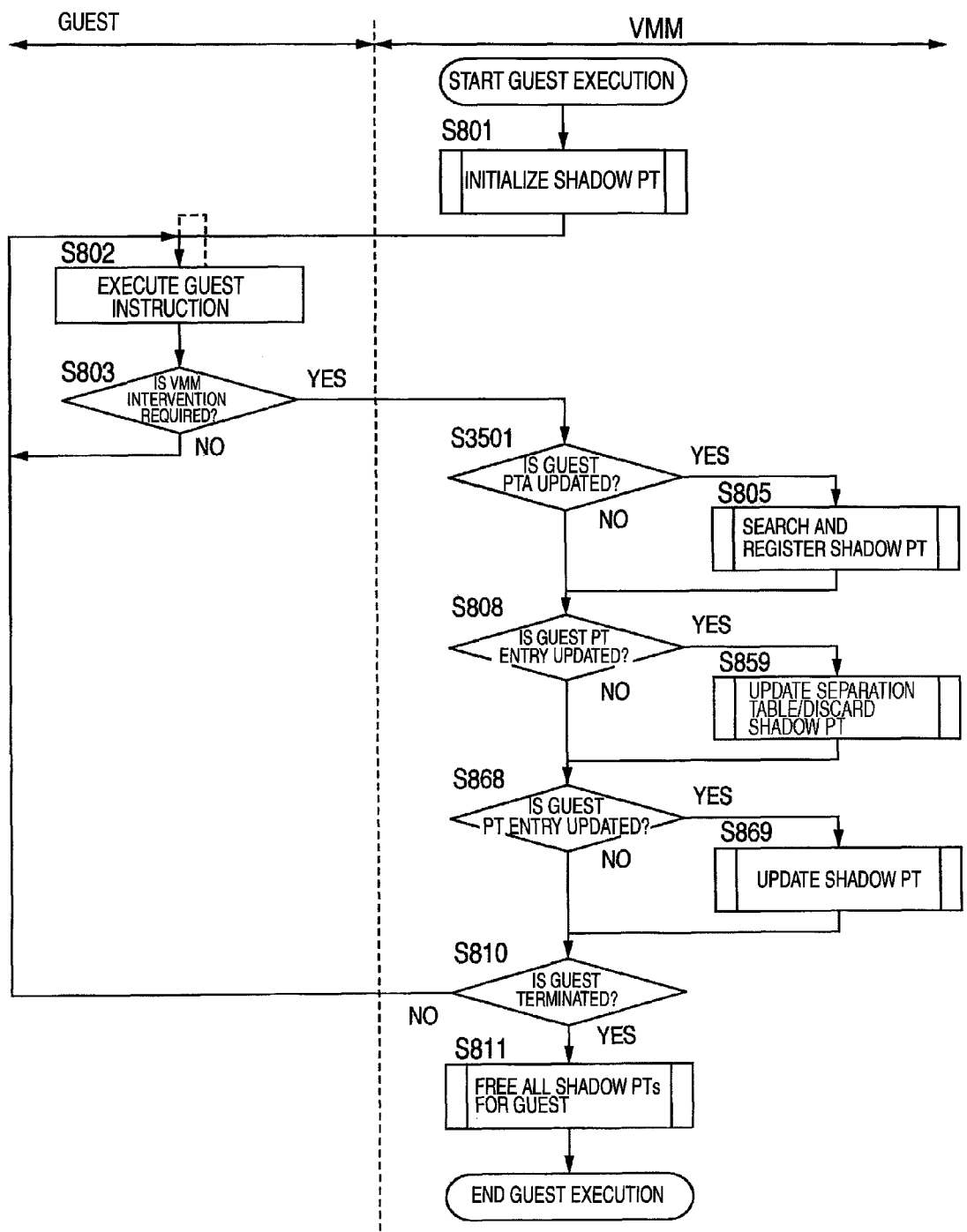
FIG. 39 is a flowchart showing an outline of actions of a guest and of a shadow PT operation performed by VMM in embodiment 10.

FIG. 39 is a flowchart showing overall processing when a guest is executed on the VMM 20, with the processing on the right side of a dashed line performed by the VMM 20 and the processing on the left side performed by the guest.

The flow in FIG. 39 only differs from the embodiment 9 in operations after a guest PT entry update is detected and in operations following the detection of a TLB operation request.

In response to a guest PT entry update request from a guest, step S859 updates the guest PT entry of interest if the guest PT 70 to be updated is referenced by the PT pointer register (60-$v$) of the virtual CPU (10-$v$), and then records an entry number of that PT in the associated separation table 557. If the guest PT 70 to be updated is not referenced by the PT pointer register (60-$v$) of the virtual CPU (10-$v$), the step S859 frees a shadow PT 80 corresponding to the guest PT 70 to be updated.

Step S868 detects a TLB operation request from the guest (to load the content of the guest PT entry into the TLB 50). The detection method will be explained below. The TLB operation includes two operations: an execution of a TLB operation instruction and an execution of a memory access instruction using a shadow PT entry not loaded in the TLB 50. Since the execution of the TLB operation instruction requires a privilege, the method of detecting the execution of the TLB operation instruction involves running the guest at a non-privileged level and utilizing an exception that occurs when the guest running at the non-privileged level writes into the PT format register, a privileged register. The detection of execution of the memory access instruction that uses a shadow PT entry not loaded in the TLB 50 sets the P bit in the shadow PT entry not loaded in the TLB 50 to 0 and uses an exception that occurs when the shadow PT entry is loaded into the TLB 50.

Step S869 searches through the separation table 557 corresponding to the guest PT 70 to be operated to find an entry number of the guest PT entry. If the guest PT entry to be operated is separated, step S869 makes the setting again for the shadow PT entry, deletes the PT entry number from the separation table 557, and loads the content of the shadow PT entry into the TLB 50. If the PT entry to be operated is synchronized (not separated), the content of the shadow PT entry is simply loaded into the TLB 50.

<3.2. Initialization of Shadow PT>

An initialization of shadow PT is as shown in FIG. 11 and identical with the embodiment 1.

<3.3. Search and Registration of Shadow PT>

Figure 36:
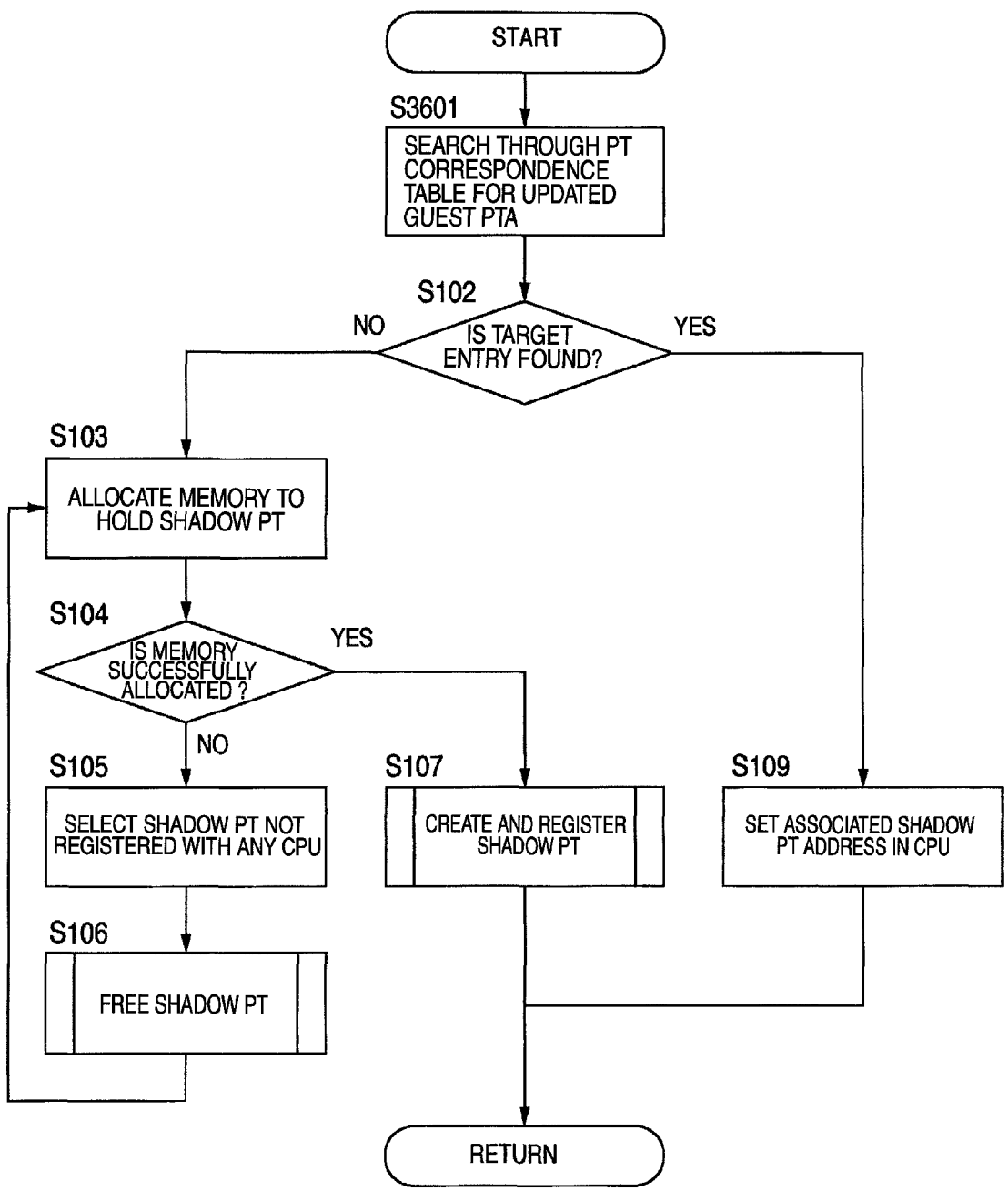
FIG. 36 is a flowchart showing a shadow PT search and registration operation in embodiment 9 and 10.
Figure 37:
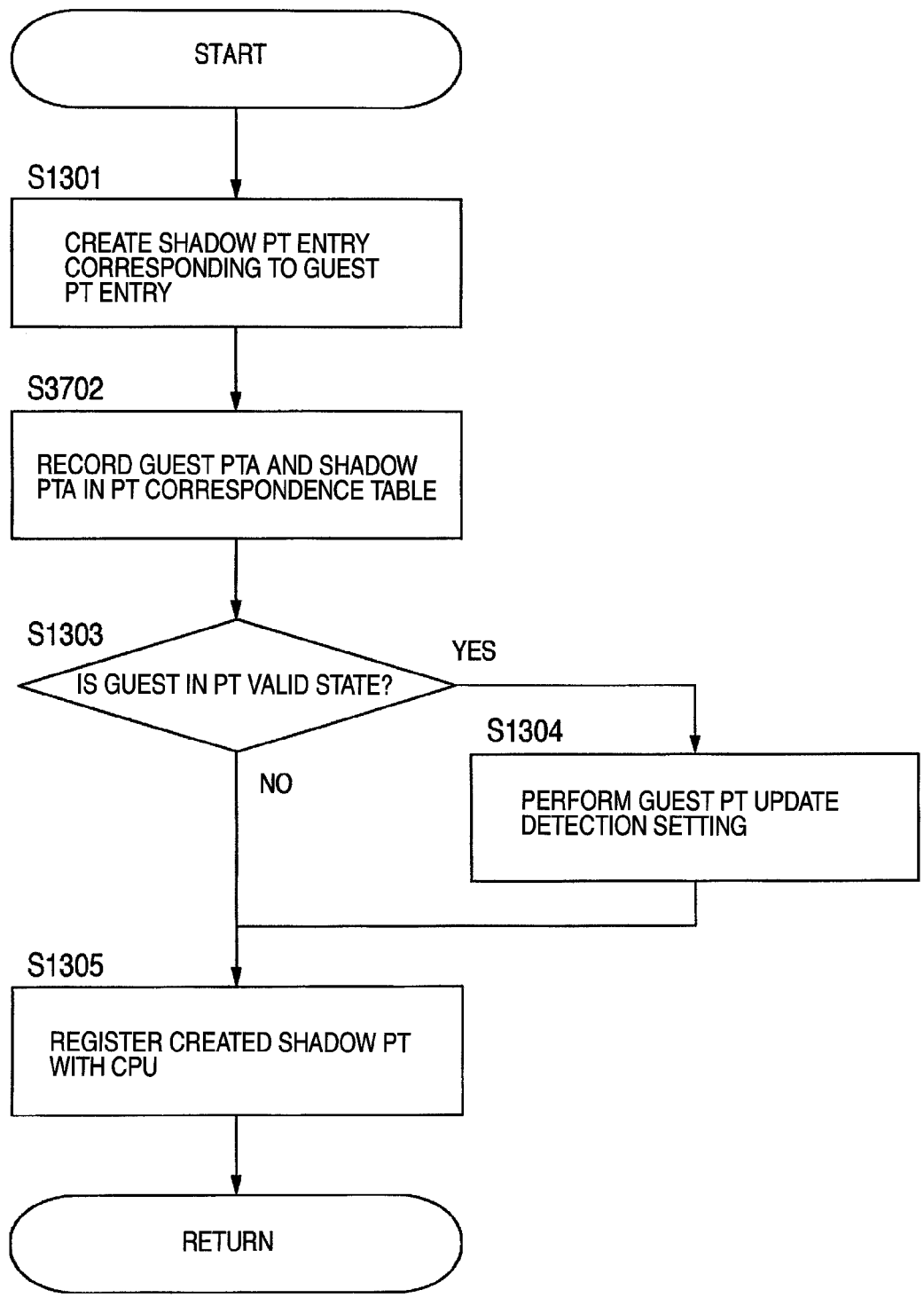
FIG. 37 is a flowchart showing a shadow PT creation operation in embodiment 9.

The shadow PT search and registration is as shown in the flowchart of FIG. 36 and is similar to the embodiment 9, except that there is some difference in step S103. This difference will be explained below. Step S103 attempts to allocate from the shadow PT management unit 505 for the guest a memory for holding a new shadow PT and a memory for holding the separation table 557.

<3.4. Generation of Shadow PT>

Figure 40:
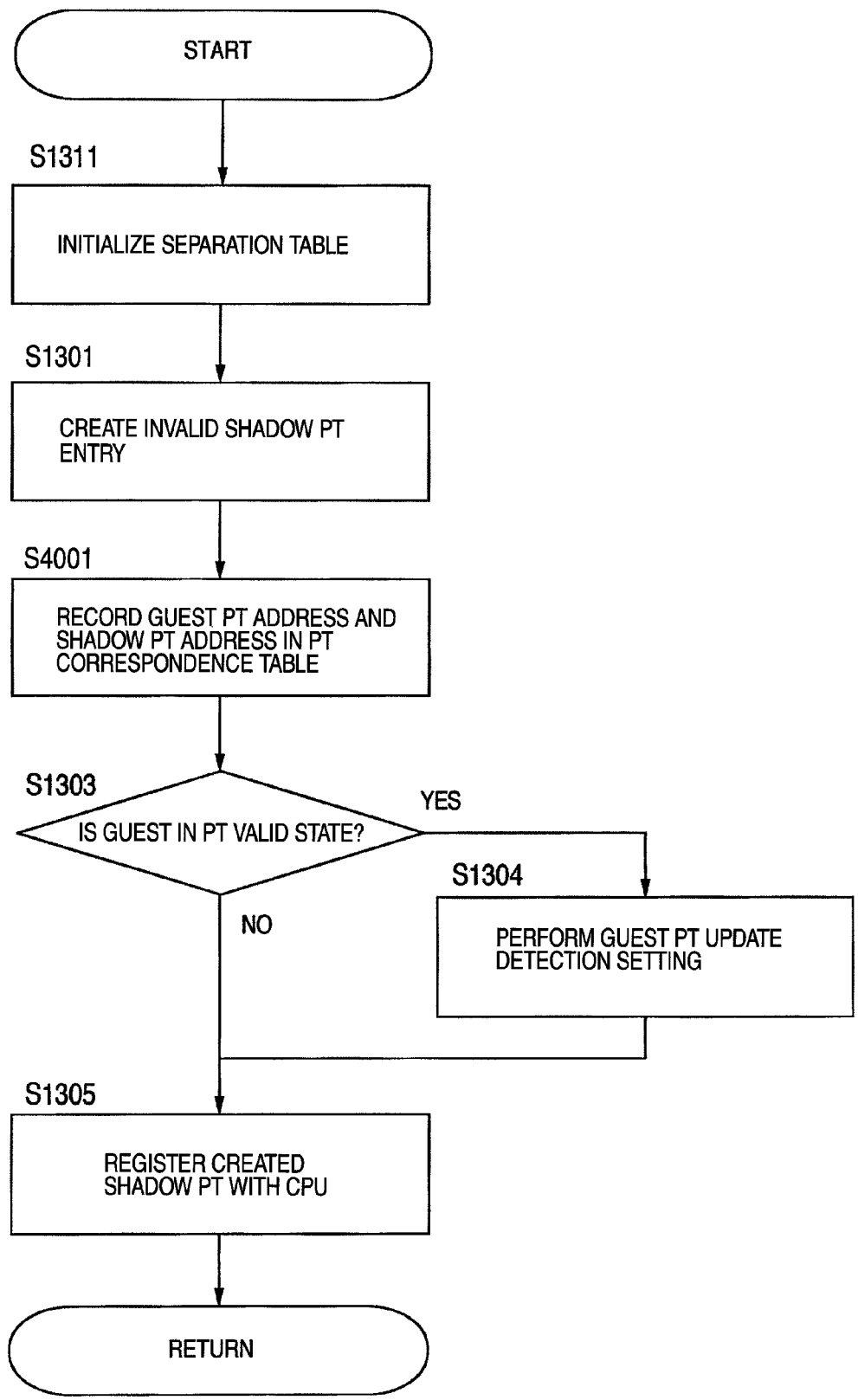
FIG. 40 is a flowchart showing a shadow PT creation operation in embodiment 10.

The generation of shadow PT as performed in the step S107 of FIG. 36 and in step S902 of FIG. 11 will be explained by referring to FIG. 40. The flow in FIG. 40 only differs from the embodiment 1 in steps S1311 and S1312 of generating a shadow PT entry.

Step S1311 registers all PT entry numbers with the separation table 557. Step S1312 disables all entries of shadow PT 80 (P bit=0).

<3.5. Freeing Shadow PT>

A flow of freeing a shadow PT is identical with the embodiment 9, as shown in FIG. 13. It is noted, however, that there is some difference in step S1404, which will be explained as follows.

Step S1404 frees a memory area that the shadow PT 80 to be freed and the separation table 557 were using, thereby allowing the memory area of interest to be reused for holding shadow PT for the guest.

<3.6. Updating of Shadow PT Entry>

In this embodiment, the updating of a shadow PT entry involves two operations: updating the separation table 557 in response to the updating of a guest PT entry and updating the shadow PT entry in response to the TLB operation request.

The operation of updating the separation table 557 as performed in step S859 of FIG. 39 will be explained by referring to FIG. 26. Step S2101 identifies a shadow PT 80 corresponding to the guest PT 70 to be updated. Step S2102 checks whether the identified shadow PT 80 is registered with the CPU 10, i.e., whether an address of the identified shadow PT 80 is held in the PT pointer register 60. If so, the step moves to S2105. If not, it moves to S2111. Step S2105 registers a PT entry number of the guest PT entry to be updated with the separation table associated with the guest PT 70. Step S2106 updates the guest PT entry of interest according to the request from the guest. This process is done by the VMM 20 because the guest PT entry is write-protected from the guest and only the VMM 20 can perform the updating. Step S2111 frees the identified shadow PT 80 and the separation table 557 and deletes the entry of interest from the PT correspondence table 511.

Figure 41:
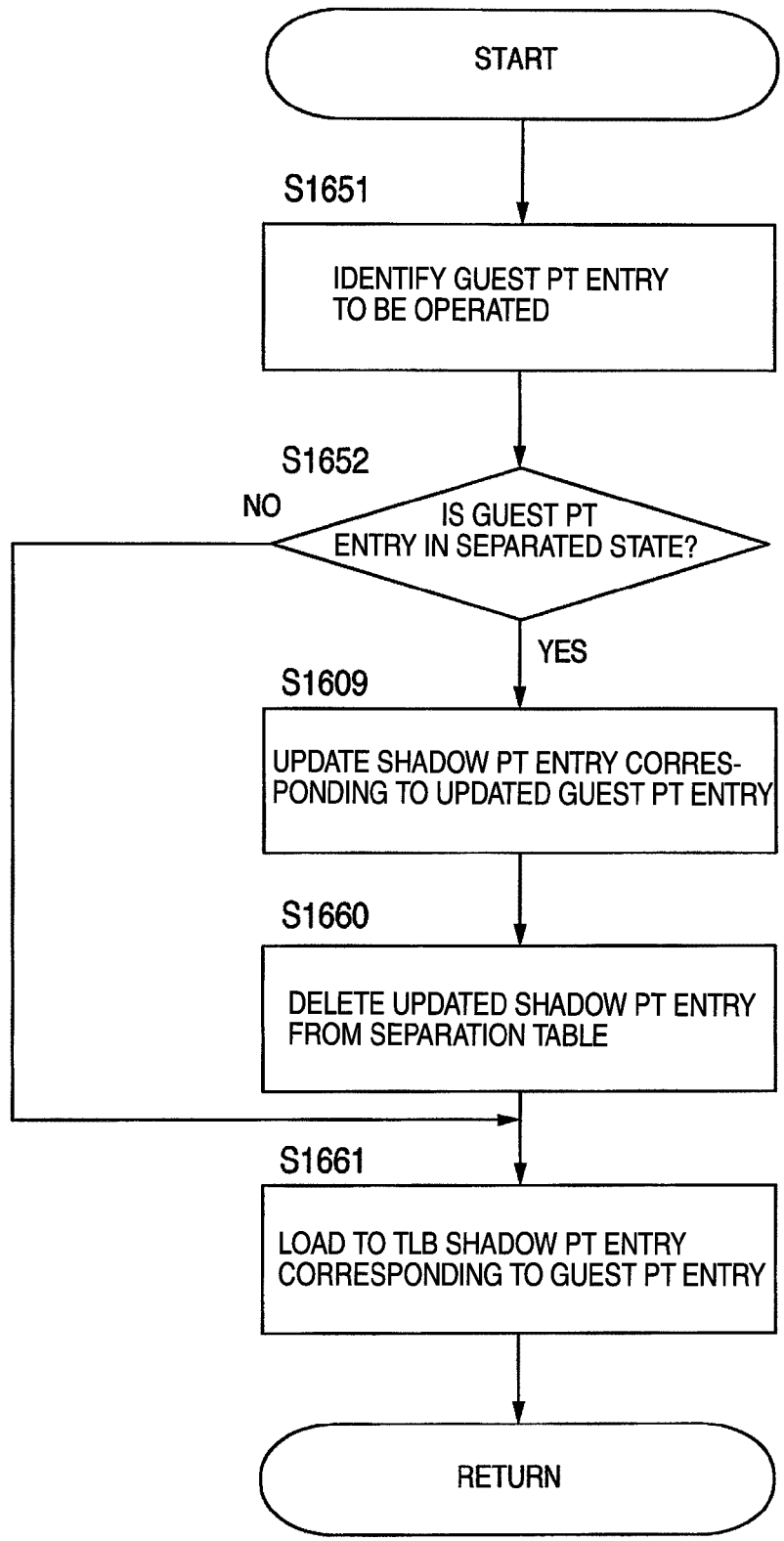
FIG. 41 is a flowchart showing a shadow PT entry update operation in embodiment 10.

The updating of the shadow PT entry as performed by S869 of FIG. 39 will be explained by referring to FIG. 41. FIG. 41 is similar to FIG. 38 of the embodiment 9 except for steps S1651 and S1652, both preprocessing for the shadow PT updating, and steps S1660 and S1661, both post-processing for the shadow PT updating. So, only these differences will be explained. In FIG. 41, steps S1610 and S1611 are not provided. Step S1651 identifies a guest PT entry to be TLB-operated and also identifies a shadow PT entry corresponding to that guest PT entry. Step S1652 checks if the guest PT entry to be TLB-operated is registered with the separation table 557 and, only if it is found registered, moves to step S1609 to update the shadow PT. If the guest PT entry is found not registered, the processing moves to S1661. Step S1660, upon completion of the updating of the shadow PT entry, deletes the PT entry number from the separation table 557. Step S1661 loads the content of the shadow PT entry into the TLB 50 and has the CPU 10 perform the address conversion necessary for the execution of the guest.

<4. Conclusion>

With the above embodiment, the speed of the guest PT address updating can be enhanced by limiting the setting of the shadow PT entry to the minimum required level.

As described above, the present invention can be applied to a virtual computer system having IA-32 (or Intel(R)64) and IPF.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual machine control program running on a computer system having a processing unit and a memory coupled to the processing unit, and for controlling execution of a plurality of operating systems each managing at least one virtual memory space based on information of a first address translation table stored in a first region of the memory that is allocated to a respective one of the operating systems, the virtual machine control program comprising:

means for creating, in a second region of the memory that is dedicatedly used by the virtual machine control program, second address translation tables each defining address conversion information indicating correspondence between said at least one virtual memory space and a physical memory space of the memory on the basis of said first address translation tables;

means for maintaining a correspondence table having information indicating correspondences between the first and second address translation tables;

means for detecting an operation, by one of the operating systems, to switch address translation tables set in the processing unit from one of said first address translation tables to another of said first translation tables, and for searching through the correspondence table to obtain one of said second address translation tables corresponding to the another first address translation table; and means for setting the second address translation table corresponding to the another first address translation table to said processing unit so that the processing unit performs address translation in accordance with the second address translation table corresponding to the another first address translation table.

2. The virtual machine control program according to claim 1,
wherein if a result of said searching by said means for detecting is that the second address translation table corresponding to the another first address translation table does not exist in the correspondence table, said means for setting generates the second address translation table corresponding to the another first translation table, and records correspondence between the another first address translation table and the generated second address translation table in the correspondence table.

3. The virtual machine control program according to claim 2,
wherein, when the memory is found to have insufficient capacity to hold the generated second address translation table, the means for setting discards a second address translation table not set in the processing unit and secures a memory to hold the generated second address translation table.

4. The virtual machine control program according to claim 1,
wherein said means for detecting detects an update of any one of the first address translation tables.

5. The virtual machine control program according to claim 4, further comprising:
means for setting a write prohibit attribute in a memory area of a first region of the memory that stores said any one of the first address translation tables in order to detect the update of said any one of the first address translation tables.

6. The virtual machine control program according to claim 4, further comprising:
means for updating an entry in a second address translation table that is affected by the update if the update of said any one of the first address translation tables is detected.

7. The virtual machine control program according to claim 4, further comprising:
means for disabling a second address translation table corresponding to said any one of the first address translation tables if the update of said any one of the first address translation tables is detected.

8. The virtual machine control program according to claim 4, further comprising:
means for setting an entry identifier identifying an entry in a second address translation table that is affected by the update in a separation table held in the second region of the memory if the update of said any one of the first address translation tables is detected; and
means for updating the entry in the second address translation table identified by the entry identifier and for deleting the entry identifier set in the separation table, when the entry in the second address translation table identified by the entry identifier is referenced by the processing unit.

9. The virtual machine control program according to claim 1,
wherein each entry in the correspondence table has an address of one of the first address translation tables and an address of one of the second address translation tables with a correspondence to the one of the first address translation tables; and
wherein said means for detecting searches an entry holding the address of the another first address translation table when searching through the correspondence table.

10. A computer comprising:
a processing unit;
a memory coupled to the processing unit; and
a virtual machine control program for running a plurality of operating systems, each of which maintains at least one first address translation table stored in a first region of the memory that is allocated to a respective operating system to manage at least one virtual memory space, and causing the computer to perform functions including:
creating, in a second region of the memory that is dedicatedly used by the virtual machine control program, a second address translation table defining address conversion information indicating correspondence between one of said at least one virtual memory space and a physical memory space of the memory on the basis of said first address translation table which manages the one of said at least one virtual memory space;
maintaining a correspondence table having information for managing a plurality of pairs of the first and the second address translation tables;
detecting an operation, by one of the operating systems, to switch address translation tables set in the processing unit from one of said first address translation tables to another of said first translation tables, and for searching through the correspondence table to obtain a second address translation table corresponding to the another first address translation table; and
setting the second address translation table corresponding to the another first address translation table to said processing unit so that the processing unit performs address translation in accordance with the second address translation table corresponding to the another first address translation table.

11. A virtual machine control method for running a plurality of operating systems on a computer having a processing unit and a memory coupled to the processing unit, wherein each one of the operating systems maintains at least one first address translation table, which is stored in a first region of the memory that is allocated to respective operating systems, to manage at least one virtual memory space, the virtual machine control method comprising:
a step of creating, in a second region of the memory that is dedicatedly used for the virtual machine control method, a second address translation table defining information indicating correspondence between one of said at least one virtual memory space and a physical memory space of the memory on the basis of a first address translation table related to the one of said at least one virtual memory space;
a step of registering information on a pair of the first address translation tables related to the one of said at least one virtual memory space and the created second address translation table with a correspondence table which holds information indicating correspondences between the first and second address translation tables;
a step of detecting an operation, one of the operating systems, to switch address translation tables set in the processing unit from one of said first address translation tables to another of said first translation tables, and for searching through the correspondence table to obtain a second address translation table corresponding to the another first address translation table; and
a step of searching through the correspondence table in response to a detection of the operation to switch the address translation tables set in the processing unit to obtain a second address translation table corresponding to the another first address translation table; and a step of setting the second address translation table corresponding to the another first address translation table to said processing unit so that the processing unit performs address translation in accordance with the second address translation table corresponding to the another first address translation table.

12. The virtual machine control method according to claim 11, further including:
  if a result of said searching is that the second address translation table corresponding to the another first address translation table does not exist in the correspondence table,
  generating a second address translation table corresponding to the another first address translation table; and
  additionally recording correspondence between the another first address translation table and the generated second address translation table in the correspondence table.

13. The virtual machine control method according to claim 12, further including:
  if, when the second address translation table is generated, the memory is found to have insufficient capacity to hold the generated second address translation table,
  a step of discarding a second address translation table not set in the processing unit; and
  a step of securing a memory to hold the generated second address translation table.

14. The virtual machine control method according to claim 11, including:
  a step of detecting an update of any one of the first address translation tables.

15. The virtual machine control method according to claim 14, including:
  a step of setting a write prohibit attribute in a memory area of a first region of the memory that stores said any one of the first address translation tables in order to detect the update of said any one of the first address translation tables.

16. The virtual machine control method according to claim 14, including:
  a step of updating an entry in a second address translation table that is affected by the update if the update of said any one of the first address translation tables is detected.

17. The virtual machine control method according to claim 14, including:
  a step of disabling a second address translation table corresponding to said any one of the first address translation tables if the update of said any one of the first address translation tables is detected.

18. The virtual machine control method according to claim 14, including:
  a step of setting an entry identifier identifying an entry in a second address translation table that is affected by the update in a separation table held in the second region of the memory if the update of said any one of the first address translation tables is detected; and
  a step of updating the entry in the second address translation table identified by the entry identifier and deleting the entry identifier set in the separation table, when the entry in the second address translation table identified by the entry identifier is referenced by the processing unit.

19. The virtual machine control method according to claim 11,
  wherein each entry in the correspondence table has an address of one of the first address translation tables and an address of one of the second address translation tables corresponding to the one of the first address translation tables; and
  wherein the searching function includes searching an entry holding the address of the another first address translation table when the searching through the correspondence table.

* * * * *